United States Patent [19]
Yamada et al.

[11] Patent Number: 5,940,548
[45] Date of Patent: Aug. 17, 1999

[54] GUIDED-WAVE CIRCUIT WITH OPTICAL CHARACTERISTICS ADJUSTING PLATE, METHOD FOR PRODUCING IT, AND APPARATUS FOR PRODUCING OPTICAL CHARACTERISTICS ADJUSTING PLATE

[75] Inventors: Hiroaki Yamada, Hitachinaka; Yasuyuki Inoue, Mito; Kazumasa Takada, Mito; Seiko Mitachi, Mito; Makoto Abe, Tokorozawa, all of Japan

[73] Assignee: Nippon Telegraph and Telephone Corporation, Tokyo, Japan

[21] Appl. No.: 08/890,653

[22] Filed: Jul. 8, 1997

[30] Foreign Application Priority Data

Jul. 10, 1996 [JP] Japan .................................. 8-180436
Apr. 18, 1997 [JP] Japan .................................. 9-101552

[51] Int. Cl.$^6$ ...................................................... G02B 6/12
[52] U.S. Cl. .............................................. 385/14; 385/15
[58] Field of Search ................................... 385/14, 15, 17, 385/18, 24, 31

[56] References Cited

U.S. PATENT DOCUMENTS 5,546,483  8/1996  Inoue et al. ................................ 385/14

FOREIGN PATENT DOCUMENTS

| 1-42628 | 2/1989 | Japan . |
| 5-5811 | 1/1993 | Japan . |
| 7-209090 | 8/1995 | Japan . |
| 7-333447 | 12/1995 | Japan . |

OTHER PUBLICATIONS

Masayuki Okuno et al., "Silica–based Thermo–optic Switches", Nov. 1994, pp. 1289–1298.

H. Takahashi et al., "Arrayed–Waveguide Grating for Wavelength Division Multi/Demultiplexer with Nanometre Resolution", Jan. 1990, pp. 87–88.

K. Takada et al., "Measurement of phase error distributions in silica–based arrayed–waveguide grating multiplexers by using Fourier transform spectroscopy", Sep. 1994, pp. 1671–1672.

H. Yamada et al., "Statically–phase–compensated 10GHz–spaced arrayed–waveguide grating", Aug. 1996, pp. 1580–1581.

H. Yamada et al., "10GHz–spaced arrayed–waveguide grating multiplexer with phase–error–compensating thin–film heaters", Mar. 1995, pp. 360–361.

*Primary Examiner*—John D. Lee
*Assistant Examiner*—Juliana K. Kang
*Attorney, Agent, or Firm*—Venable; Robert J. Frank; Catherine M. Voorhees

[57] ABSTRACT

A guided-wave circuit with a phase adjusting plate which adjusts optical path length errors, occurring during the manufacture of PLC, by an additional processing performed after the production of the PLC; and a method for producing the guided-wave circuit. A guided-wave circuit with an amplitude adjusting plate which adjusts the amplitude characteristics of light by an additional processing performed after the production of the PLC; and a method for producing the guided-wave circuit. A guided-wave circuit with a birefringence adjusting plate which adjusts the birefringence of light by an additional processing subsequent to the manufacture of the PLC; as well as a method for producing the guided-wave circuit. The guided-wave circuit includes a groove crossing a plurality of waveguides constituting the optical waveguides, a plate having optical characteristics spatially changed so as to adjust the optical characteristics at the intersections of the plate with the optical waveguides when the plate is inserted into the groove, and an adhesive for fixing the plate in the groove. The guided-wave circuit also includes both a phase adjusting plate and an amplitude adjusting plate to achieve further improvement in the optical characteristics. An apparatus for producing these optical characteristics adjusting plates is also included.

27 Claims, 66 Drawing Sheets

GUIDED-WAVE CIRCUIT WITH OPTICAL CHARACTERISTICS ADJUSTING PLATE, METHOD FOR PRODUCING IT, AND APPARATUS FOR PRODUCING OPTICAL CHARACTERISTICS ADJUSTING PLATE

BACKGROUND OF THE INVENTION

1. Field of the Invention

The present invention relates to a guided-wave circuit for use in the field of optical communication or optical information processing. More specifically, the invention concerns a guided-wave circuit with an optical characteristics adjusting plate which uses the optical characteristics adjusting plate to adjust errors inevitably occurring between the optical characteristic values on the input side and the optical characteristic values on the output side of a plurality of optical waveguides formed on the chip of the guided-wave circuit; a method for producing the guided-wave circuit; and an apparatus for producing the optical characteristics adjusting plate.

Examples of the guided-wave circuit are double beam interferometers and multiple beam interferometers composed of optical waveguides formed on a flat plane. Examples of the optical characteristics are the phase and amplitude of light propagating through the plurality of optical waveguides, as well as the birefringence of the optical waveguides.

2. Description of the Prior Art

In recent years, energetic studies have been conducted on planar lightwave circuits (PLC's) constructed, for example, by silica-based optical waveguides formed on a silicon substrate. These circuits employ double beam interferometers or multiple beam interferometers such as Mach-Zehnder interferometers or arrayed-waveguide grating multi/demultiplexers to achieve the switching or multiplexing/demultiplexing function.

Thermo-optic switches utilizing the Mach-Zehnder interferometer are described in detail in Okuno et al., "Silica-based Thermo-optic Switches", NTT R&D, vol. 143, No. 11, pp. 1289–1298, November 1994. This type of switch realizes the switching function by thermally controlling the difference between the optical path lengths of the two arm waveguides by means of thin-film heaters formed on the surface of the waveguides.

FIG. 1 shows the outline of the configuration of the PLC, and FIG. 2 shows an enlarged sectional view taken on line II—II of FIG. 1.

In FIG. 1, the numerals 101-$a$ and 102-$a$ represent input ports, 103 is a silicon substrate, 104-1 is the first arm waveguide, 104-2 is the second arm waveguide, 105 is a thin-film heater, 109 is a cladding layer, and 114 is a core layer.

The characteristics of an example of a 2×2 thermo-optic switch produced are shown in FIG. 3, in which the horizontal axis represents electric power applied to the thin-film heater, while the vertical axis represents the through-port (101-$a$→101-$b$) transmittance of light. The transmittance varies with the electric power applied to the thin-film heater. By alternating between P1 and P2 as the electric power at certain time intervals, this circuit acts as a 2×2 optical switch.

The two arm waveguides 104-1 and 104-2 shown in FIG. 1 are designed to have the same length. Thus, when the through-port transmittance is minimal, no electric power should be applied. In other words, P1 should be zero.

However, because of the error in the production of the waveguide, an optical path length difference of the order of 0.1 $\mu$m occurs between the lengths of the two arm waveguides 104-1 and 104-2, so that P1 is not zero. This optical path length error of 0.1 $\mu$m is about 10% of the optical wavelength, and thus the value of P1 is not negligible compared with the switch power (P2−P1). Furthermore, the optical path length error of the order of 0.1 $\mu$m is an error corresponding to about $10^{-5}$ for the arm waveguides 104-1 and 104-2 measuring about 10 mm. Markedly decreasing this value is difficult with the manufacturing technology.

The power P1 increases the electric consumption of the switch, and should preferably be zero in value.

With an arrayed-waveguide grating wavelength multi/demultiplexer, the optical wavelength multi/demultiplexing effect is achieved by interferences of a plurality of optical beams propagating through about 30 to 100 arm waveguides arranged in parallel and different in the optical path length from one another by n×ΔL where n denotes the effective refractive index of the waveguide, and ΔL represents a value of about 10 to 100 $\mu$m. The details are described in H. Takahashi et al., "Arrayed Waveguide Grating for Wavelength Division Multi/demultiplexer with Nanometer Resolution," Electron. Lett., vol. 26, No. 2, pp. 87–88, 1990.

FIG. 4 shows the outline of the circuit configuration of this multi/demultiplexer. In FIG. 4, the numeral 110 represents input waveguides, 111 output waveguides, 112 slab waveguides, 113 arrayed waveguides, and 103 a silicon substrate.

FIG. 5 shows the wavelength-transmission characteristics of transmitted light from the central input port to the central output port of the arrayed waveguide grating wavelength division multi/demultiplexer shown in FIG. 4. As shown in FIG. 5, only particular wavelengths are transmitted from the central input port to the central output port, while light of other wavelengths is blocked.

For the moment, the crosstalk, expressed as the ratio of the transmittance for the blocked wavelengths to the transmittance for the transmitted wavelengths, is about −30 dB.

Decreasing this crosstalk is a very important task of the wavelength division multi/demultiplexing function. The first cause of the crosstalk being restricted to about −30 dB is that the optical path length difference n×ΔL set in the arrayed-waveguide fluctuates on the order of 0.1 $\mu$m owing to the manufacturing error, thereby arousing errors in the phases of light passing through the respective arrayed waveguides.

The second cause for the restriction is that the amplitude of transmitted light from each path after distribution to the respective arrayed waveguides at the branching portion and recombination at the multiplexing portion deviates from the designed value because of the nonuniformity of the waveguide loss; namely, an amplitude error occurs.

With an optical circuit in which the waveguides account for a large area, an arrayed waveguide grating with a narrow channel spacing is provided. Moreover, variations in birefringence occur in the optical waveguides constituting such an optical circuit. Thus, the phase distribution differs depending on the polarization of the optical waveguide, so that the polarization dependency of the characteristics arises.

As described above, the optical path length error on the order of 0.1 $\mu$m during the manufacture of the PLC brings about deterioration of the characteristics of a double beam or multiple beam interferometer. If this optical path length error can be adjusted, the characteristics of the interferometer can be improved.

Another error which occurs during the manufacture of the PLC is the deviation, from the designed value, of the amplitude of transmitted light from each path after distribution to the plurality of channel waveguides at the branching portion and recombination at the multiplexing portion. This deviation also causes deterioration of the characteristics of a double beam or multiple beam interferometer. If this deviation in amplitude from the designed value can be adjusted, the characteristics of the interferometer can be improved. By adjusting the amplitude and phase characteristics to the desired values, moreover, it becomes possible to add the functions of flattening the wavelength pass band and controlling the dispersion.

Moreover in an optical circuit in which the waveguides occupy a large area, the polarization dependency of the characteristics occur owing to variations in birefringence of the optical waveguides constituting the optical circuit. If the variations in birefringence can be controlled, a high performance optical circuit can be prepared without relying on the polarization state.

SUMMARY OF THE INVENTION

In the light of the above-described problems, an object of the present invention is to provide a guided-wave circuit with a phase adjusting plate which adjusts the optical path length error, occurring during the manufacture of the PLC, by an additional processing performed after the production of the PLC; and a method for producing the guided-wave circuit. Another object of the invention is to provide a guided-wave circuit with an amplitude adjusting plate which adjusts the amplitude characteristics of light by an additional processing performed after the production of the PLC; and a method for producing the guided-wave circuit. Still another object of the invention is to provide a guided-wave circuit with a birefringence adjusting plate which adjusts the birefringence of light by an additional processing subsequent to the manufacture of the PLC; as well as a method for producing the guided-wave circuit. The present invention also includes a configuration in which both a phase adjusting plate and an amplitude adjusting plate are provided in the same guided-wave circuit to achieve a further improvement in the optical characteristics. The present invention further includes an apparatus for producing such optical characteristics adjusting plates.

To attain the foregoing object, the guided-wave circuit with optical characteristics adjusting plate of the present invention has a plurality of optical waveguides on a substrate, wherein the guided-wave circuit has a groove crossing all of the plurality of optical waveguides, and a plate for adjusting the optical characteristics of the guided-wave circuit is mounted in the groove.

In the guided-wave circuit of the present invention, the optical characteristics of the optical waveguide may be the phase of light propagating through the optical waveguide, and the optical characteristics adjusting plate may be a phase adjusting plate.

In the inventive guided-wave circuit, the phase adjusting plate may be a film having a uniform refractive index and processed so as to have projections and depressions in the longitudinal direction.

In the inventive guided-wave circuit, the refractive index of the phase adjusting plate may be different from the refractive indices of the plurality of waveguides.

In the inventive guided-wave circuit, the depressions of the film constituting the phase adjusting plate may be filled up with a transparent material.

In the inventive guided-wave circuit, the refractive index of the film and the refractive index of the transparent material filling up the depressions of the film may be different from each other.

In the inventive guided-wave circuit, the optical characteristics of the optical waveguide may be the amplitude of light propagating through the optical waveguide, and the optical characteristics adjusting plate may be an amplitude adjusting plate.

In the inventive guided-wave circuit, the amplitude adjusting plate may be a film having a uniform absorption coefficient and processed so as to have projections and depressions in the longitudinal direction.

In the inventive guided-wave circuit, the depressions of the film constituting the amplitude adjusting plate may be filled up with a transparent material.

In the inventive guided-wave circuit, the refractive index of the film and the refractive index of the transparent material filling up the depressions of the film may be the same.

In the inventive guided-wave circuit, the amplitude adjusting plate may be composed of a film having a constant thickness, and a metal film formed on the film and varying in thickness in the longitudinal direction of the film.

In the inventive guided-wave circuit, the optical characteristics of the optical waveguide may be the phase and amplitude of light propagating through the optical waveguide, and the optical characteristics adjusting plate may be a phase/amplitude adjusting plate.

In the inventive guided-wave circuit, the optical characteristics of the optical waveguide may be the birefringence of light propagating through the optical waveguide, and the optical characteristics adjusting plate may be a birefringence adjusting plate.

In the inventive guided-wave circuit, the gap between the inner wall of the groove and the optical characteristics adjusting plate is filled with an optically transparent adhesive.

In the inventive guided-wave circuit, the optical characteristics adjusting plate may be a phase adjusting plate, and the refractive index of the phase adjusting plate and the refractive index of the adhesive may be different from each other.

In the inventive guided-wave circuit, the optical characteristics adjusting plate may be an amplitude adjusting plate, and the refractive index of the amplitude adjusting plate and the refractive index of the adhesive may be the same.

In the inventive guided-wave circuit, the optical characteristics adjusting plate may be a birefringence adjusting plate, and one of the refractive indices of the birefringence adjusting plate and the refractive index of the adhesive may be the same.

In the inventive guided-wave circuit, at least two of the grooves are formed, the optical characteristics adjusting plate disposed in one of the grooves may be a phase adjusting plate, while the optical characteristics adjusting plate disposed in the other groove may be an amplitude adjusting plate.

A method for producing a guided-wave circuit with an optical characteristics adjusting plate of the present invention comprises a groove formation step for forming a groove in a guided-wave circuit, the guided-wave circuit having a plurality of optical waveguides on a substrate, and the groove crossing all of the plurality of optical waveguides; an optical characteristics adjustment amount determination step for measuring the optical characteristics values on the input side and the output side of each optical waveguide when light propagates through the plurality of optical waveguides, and determining the amount of optical characteristics adjustment necessary for each optical waveguide based on the error between the optical characteristics value on the input side and the optical characteristics value on the output side; an optical characteristics adjusting plate preparation step for preparing an optical characteristics adjusting plate locally varying in the optical characteristics value in response to each optical characteristics adjustment amount; and an optical characteristics adjusting plate mounting step for mounting the optical characteristics adjusting plate in the groove.

In the method for production of the present invention, the optical characteristics of the optical waveguide may be the phase of light propagating through the optical waveguide, the optical characteristics adjusting plate may be a phase adjusting plate, and the optical characteristics adjusting plate preparation step may comprise a step of forming projections and depressions, adapted to the amount of phase adjustment of each optical waveguide, in the longitudinal direction of a film having a uniform refractive index.

In the inventive method for production, the optical characteristics adjusting plate preparation step for preparing the phase adjusting plate may further include a film flattening step for filling up the depressions of the film with a transparent material, the film having a uniform refractive index and having the projections and depressions formed therein, and the transparent material having a refractive index different from the refractive index of the film, thereby to flatten the film.

In the inventive method for production, the optical characteristics of the optical waveguide may be the amplitude of light propagating through the optical waveguide, the optical characteristics adjusting plate may be an amplitude adjusting plate, and the optical characteristics adjusting plate preparation step may comprise a step of forming projections and depressions, adapted to the amount of amplitude adjustment of each optical waveguide, in the longitudinal direction of a film having a uniform absorption coefficient.

In the inventive method for production, the optical characteristics adjusting plate preparation step for preparing the amplitude adjusting plate may further include a film flattening step for filling up the depressions of the film with a transparent material, the film having a uniform absorption coefficient and having the projections and depressions formed therein, and the transparent material having the same refractive index as the refractive index of the film, thereby to flatten the film.

In the inventive method for production, the optical characteristics of the optical waveguide may be the amplitude of light propagating through the optical waveguide, the optical characteristics adjusting plate may be an amplitude adjusting plate, and the optical characteristics adjusting plate preparation step may comprise a step of forming a metal film on a film, the film having a uniform absorption coefficient and having a constant thickness, and the metal film having thickness changes in the longitudinal direction which are adapted to the amount of amplitude adjustment of each optical waveguide.

In the inventive method for production, the optical characteristics of the optical waveguide may be the phase and amplitude of light propagating through the optical waveguide, the optical characteristics adjusting plate may be a phase/amplitude adjusting plate, and the optical characteristics adjusting plate preparation step may comprise a step of forming projections and depressions, adapted to the amount of phase adjustment of each optical waveguide, in the longitudinal direction of a film having a uniform refractive index, and also forming a metal film on the film, the metal film having thickness changes in the longitudinal direction which are adapted to the amount of amplitude adjustment of each optical waveguide.

In the inventive method for production, an adhesive filling step for filling an optically transparent adhesive into the gap between the inner wall of the groove and the optical characteristics adjusting plate may be provided after the optical characteristics adjusting plate mounting step.

In the inventive method for production, the optical characteristics adjusting plate may be a phase adjusting plate, and the refractive index of the phase adjusting plate and the refractive index of the adhesive may be different from each other.

In the inventive method for production, the optical characteristics adjusting plate may be an amplitude adjusting plate, and the refractive index of the amplitude adjusting plate and the refractive index of the adhesive may be the same.

In the inventive method for production, at least two grooves are formed by the groove formation step, a phase adjusting plate as the optical characteristics adjusting plate may be mounted in one of the grooves, while an amplitude adjusting plate as the optical characteristics adjusting plate may be mounted in the other groove.

The present invention also provides an apparatus for producing an optical characteristics adjusting plate to be mounted in a groove of a guided-wave circuit, the guided-wave circuit having a plurality of optical waveguides on a substrate, the groove crossing all of the plurality of optical waveguides, and the optical characteristics adjusting plate being adapted to adjust the error between the optical characteristics value on the input side and the optical characteristics value on the output side of each of the plurality of optical waveguides; the apparatus including an error measurement means for measuring the errors between the optical characteristics on the input side and the output side of the plurality of optical waveguides of the guided-wave circuit; an adjustment value calculation means for calculating optical characteristics adjustment values on the basis of the error values obtained by the error measurement means; and an optical characteristics adjusting plate preparation means for changing the optical characteristics distribution in the longitudinal direction of a plate material having optical characteristics on the basis of the adjustment values for the plurality of optical waveguides to obtain the optical characteristics adjusting plate.

DETAILED DESCRIPTION OF THE PREFERRED EMBODIMENTS

Figure 1:
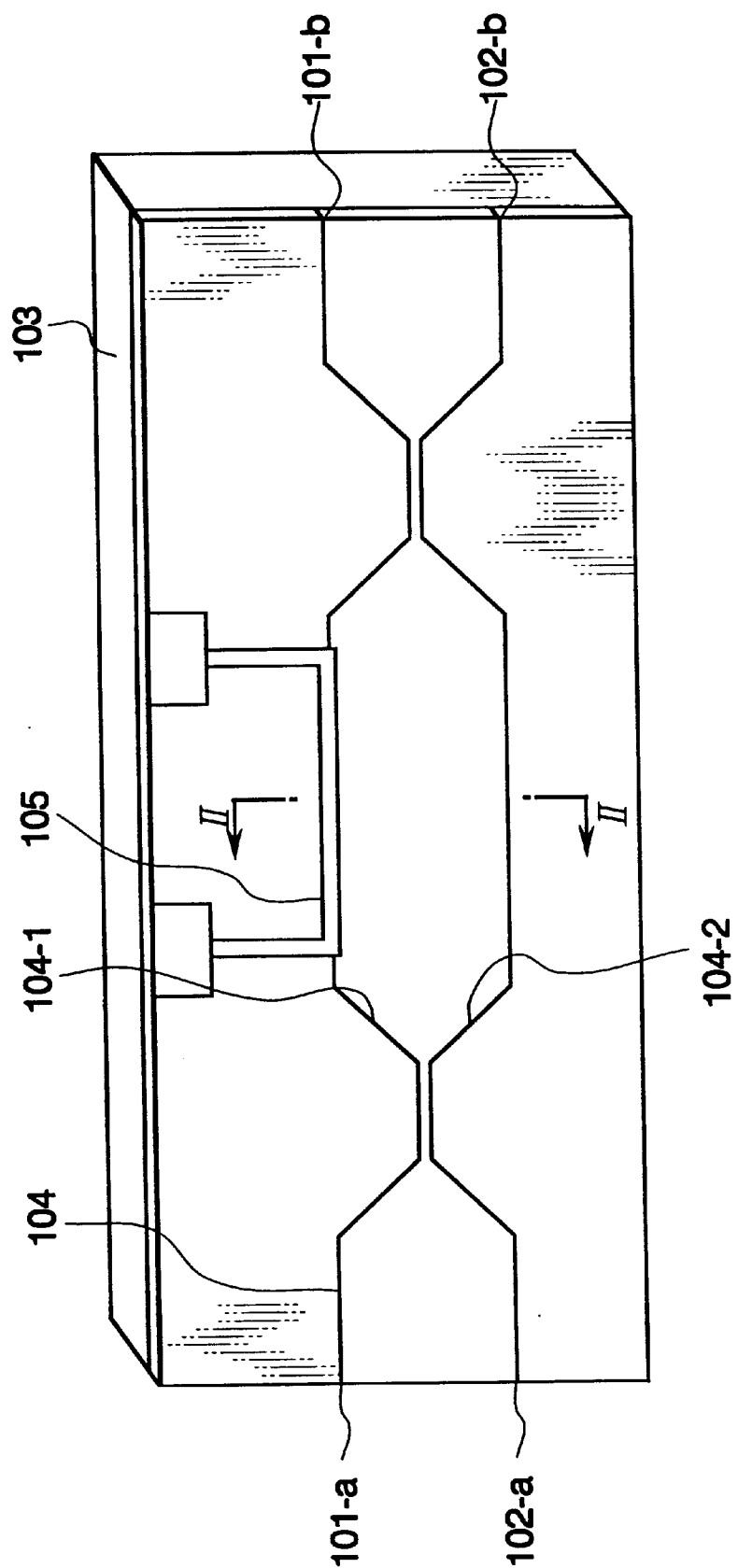
FIG. 1 shows a Mach-Zehnder interferometer type 2×2 switch.

Embodiments of the present invention will now be described.

A guided-wave circuit according to the present invention is composed of a groove crossing a plurality of optical waveguides constituting the guided-wave circuit, a plate having optical characteristics spatially changed so as to adjust the optical characteristics of its intersections with the optical waveguides when the plate is inserted into the groove, and an adhesive for fixing the groove and the plate to each other.

Hereinbelow, the above plate processed so as to be capable of adjusting the optical characteristics of its intersections with the optical waveguides when the plate is inserted into the groove is called an optical characteristics adjusting plate in the present invention.

In accordance with this constitution, the optical characteristics of light propagating through the plurality of waveguides vary with the optical characteristics of the optical characteristics adjusting plate at its intersections with the waveguides.

Thus, the optical characteristics of the plurality of waveguides are measured, and then the optical characteristics adjusting plate processed so as to adjust their optical characteristics are fixed in the groove by means of an adhesive, whereby the optical characteristics of the plurality of waveguides can be adjusted to have desired values.

The sites of the optical circuit to be adjusted may be the multiplexing/demultiplexing portions of linear waveguides, curved waveguides, interference optical paths of interference optical circuits, 3 dB couplers, or slab waveguides. The present invention is effective for these multiplexing/demultiplexing portions as well.

When the optical characteristics to be adjusted is the phase of light and the optical characteristics adjusting plate is a phase adjusting plate, light propagating through the plurality of waveguides is given different phase changes in response to the optical thicknesses of the phase adjusting plate at its intersections with the waveguides. Consequently, the errors in the optical path lengths of the optical waveguides which may be an interferometer optical circuit can be adjusted, and the characteristics of the optical circuit can be improved markedly.

When the optical characteristics to be adjusted are the amplitude of light and the optical characteristic adjusting plate is an amplitude adjusting plate, light propagating through the plurality of waveguides is given different losses in response to the losses of the amplitude adjusting plate at its intersections with the waveguides. Consequently, the amplitude distributions of the optical waveguides constituting, say, an interferometer optical circuit can be adjusted, and the characteristics of the optical circuit can be improved markedly.

When the optical characteristics to be adjusted are the birefringence of light and the optical characteristics adjusting plate is a birefringence adjusting plate, light propagating through the plurality of waveguides are given different birefringences in response to the optical thicknesses of the birefringence adjusting plate at its intersections with the waveguides. Consequently, errors in the birefringence of the optical waveguides which may be, an interferometer optical circuit can be adjusted, and the characteristics of the optical circuit can be improved markedly.

The preferred embodiments of the present invention will be described as illustrating, not limiting, the invention.

Embodiment 1

Figure 6:
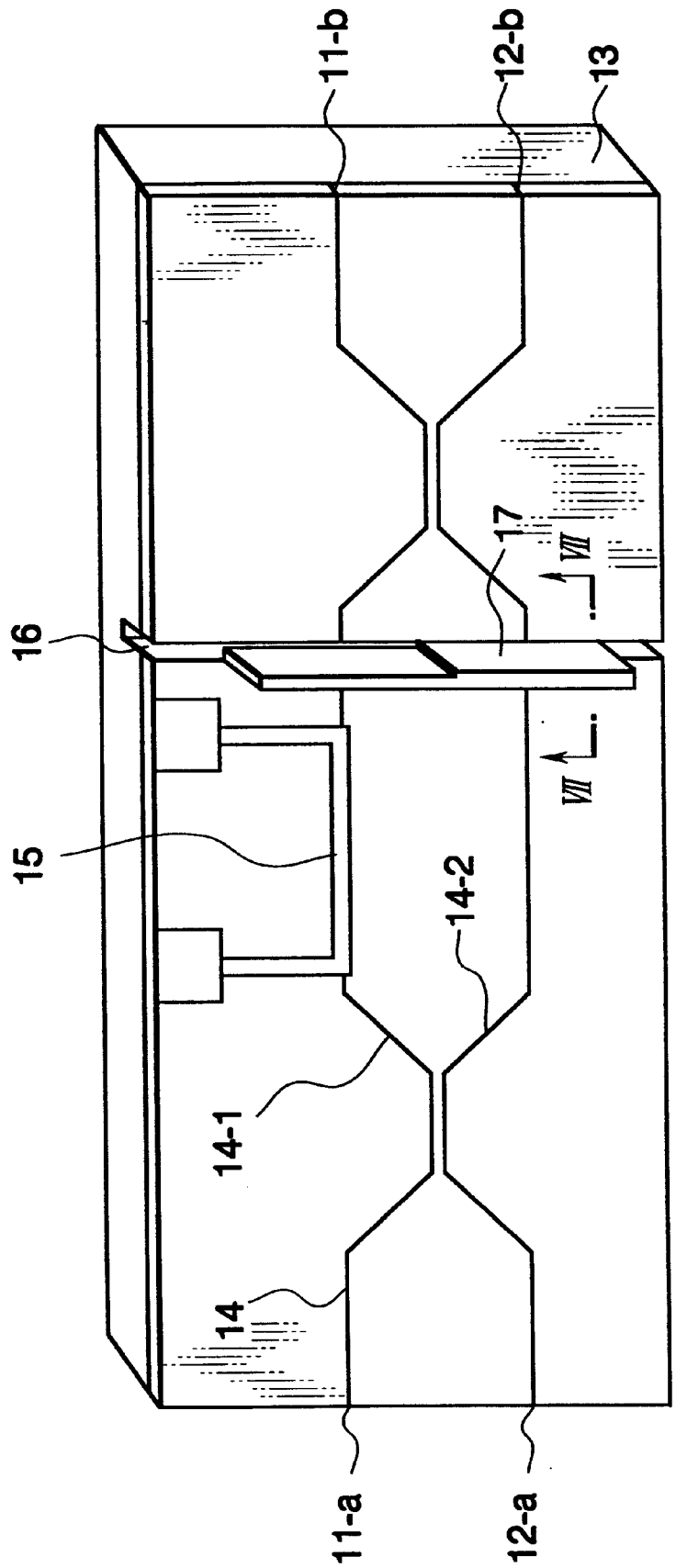
FIG. 6 shows a Mach-Zehnder interferometer type 2×2 optical switch as a first embodiment of the present invention.
Figure 7:
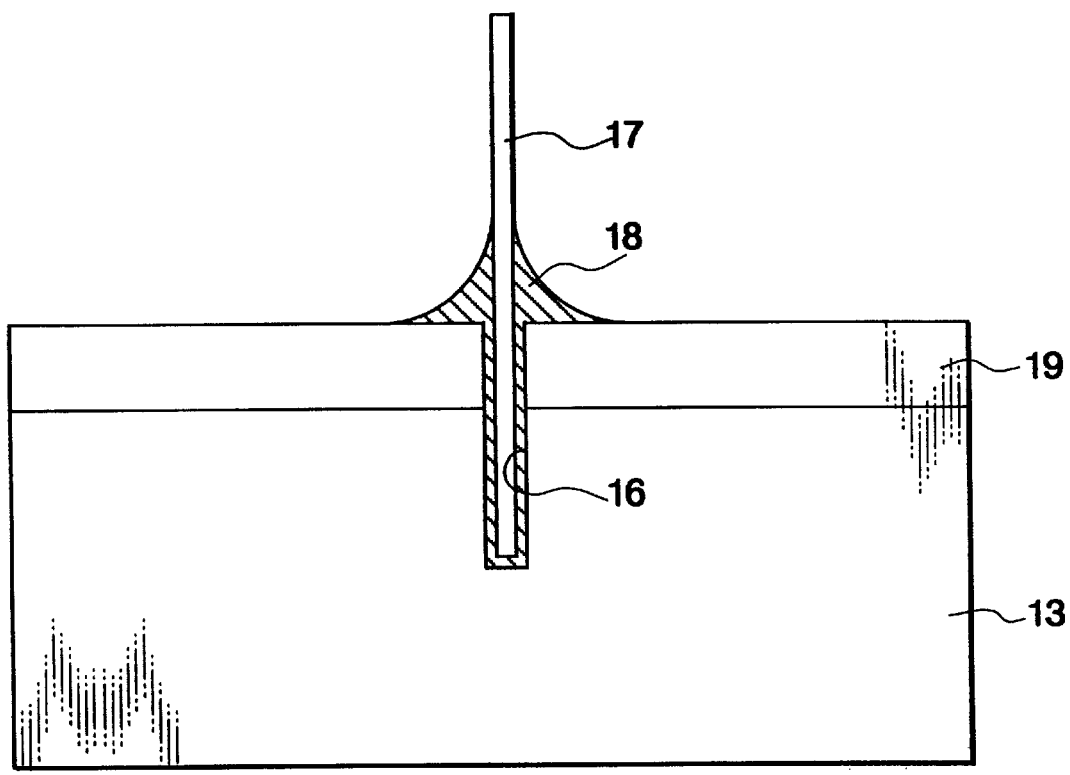
FIG. 7 is an enlarged sectional view taken along line VII—VII of FIG. 6.

FIG. 6 shows a Mach-Zehnder interferometer type 2×2 optical switch as a first embodiment of the present invention. In FIG. 6, the numerals 11-*a* and 12-*a* represent input ports, 11-*b* and 12-*b* denote output ports, 13 is a silicon substrate, 14-1 represents a first arm waveguide, 14-2 represents a second arm waveguide, 15 is a thin-film heater, 16 is a groove, and 17 denotes a phase adjusting plate. FIG. 7 is an enlarged sectional view taken along line VII—VII of FIG. 6.

In the instant embodiment, a conventional Mach-Zehnder interferometer type 2×2 optical switch was processed to have a constant-width groove 16 intersecting the arm waveguides of the optical switch. Then, a phase adjusting plate 17 with spatially changed thicknesses and a constant in-plane refractive index (FIG. 8) was inserted into the groove 16.

To fix the phase adjusting plate 17 in the groove 16, an adhesive 18 was filled into the groove 16 as shown in FIG. 7.

Let the in-plane refractive index of a film 17*a* constituting the phase adjusting plate 17 be $n_1$, and the refractive index of the adhesive 18 be $n_2$. The optical path lengths of the groove 16 in the two arm waveguides 14-1 and 14-2 would be given as follows:

Optical path length of groove in first arm waveguide 14-1=

$$n_1 \times w_1 + n_2 \times (w_0 - w_1)$$

Optical path length of groove in second arm waveguide 14-2=

$$n_1 \times w_1 + n_2 \times (w_0 - w_2)$$

where $n_1$ is the in-plane refractive index of the film, $n_2$ is the refractive index of the adhesive, $w_1$ is the film thickness intersecting the first arm waveguide 14-1, $w_2$ is the film thickness intersecting the second arm waveguide 14-2, and $w_0$ is the width of the groove 16.

Thus, the relative optical path length difference would be $(n_1-n_2) \times (w_2-w_1)$.

In the instant embodiment, the refractive index difference $(n_1-n_2)$ between the in-plane refractive index of the film and the refractive index of the adhesive, and the difference in film thickness $(w_2-w_1)$ are given suitably, thereby adjusting the optical path length difference between the arm waveguides caused by the manufacturing error.

The Mach-Zehnder interferometer type 2×2 optical switch according to the instant embodiment was prepared by the following procedure:

(i) Prepare a Mach-Zehnder interferometer on a silicon substrate by flame deposition and reactive ion etching using the same technique as the conventional one.

(ii) Form the groove 16 having a width of 20 μm and a depth of 150 μm with a dicing saw.

(iii) Fill the groove 16 with the adhesive 18 having the refractive index $n_2$.

Figure 10:
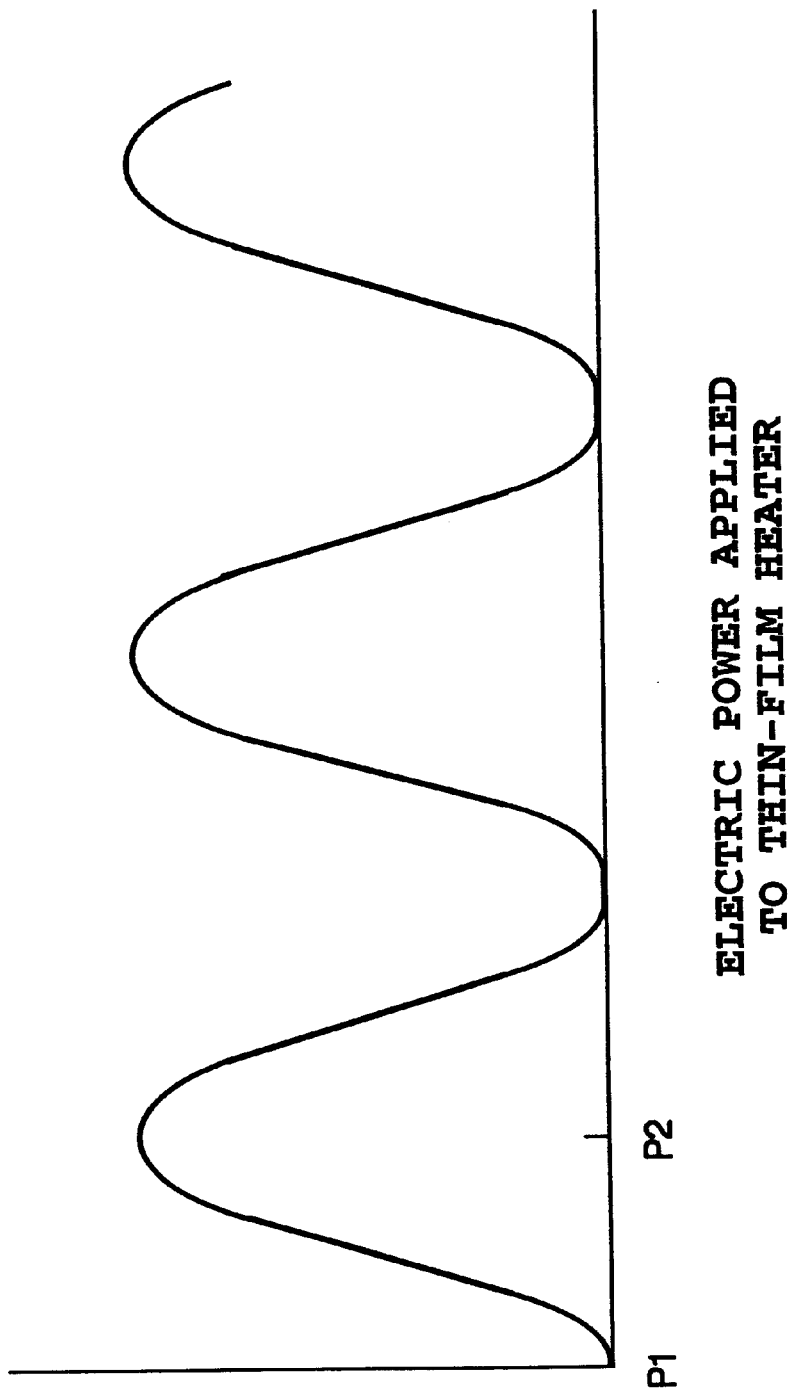
FIG. 10 is a graph showing changes in the optical transmittance versus electric power applied to a thin-film heater before insertion of a phase adjusting plate in the Mach-Zehnder interferometer shown in FIG. 6.

(iv) In this condition, measure changes in the optical transmittance versus the electric power applied to the thin film heater as illustrated in FIG. 10 to determine P1 and P2.

(v) Seek the film thickness difference $(w_2-w_1)$ satisfying the equation $(n_1-n_2) \times (w_2-w_1) = (\lambda/2) \times P_1/(P_2-P_1)$ where $\lambda$ is the wavelength of light, with light having $\lambda$ of 1.55 μm being used in the instant embodiment.

Figure 8:
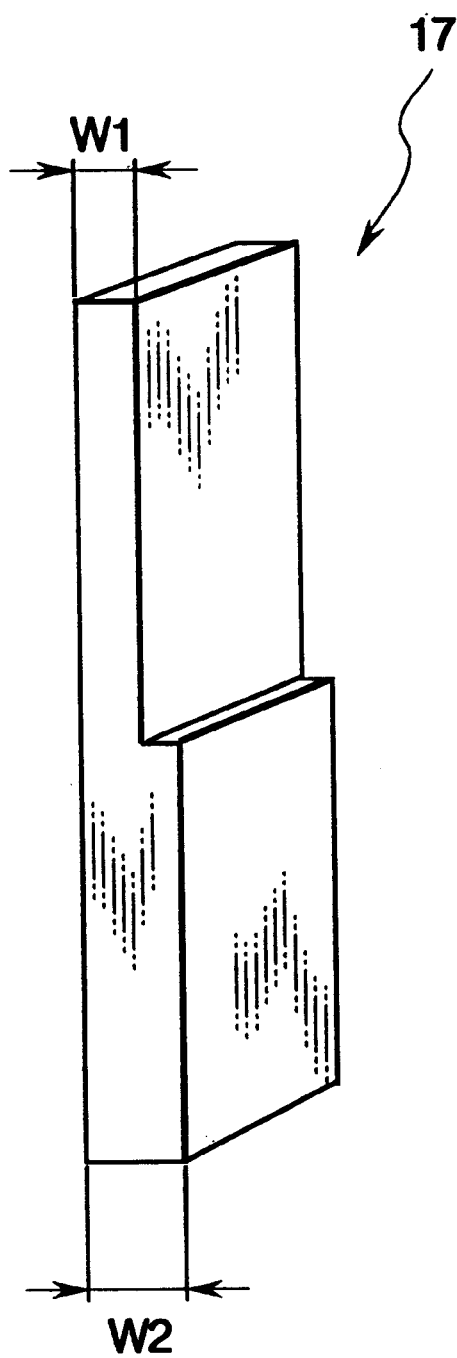
FIG. 8 is an enlarged view of a phase adjusting plate used in the first embodiment.
Figure 9:
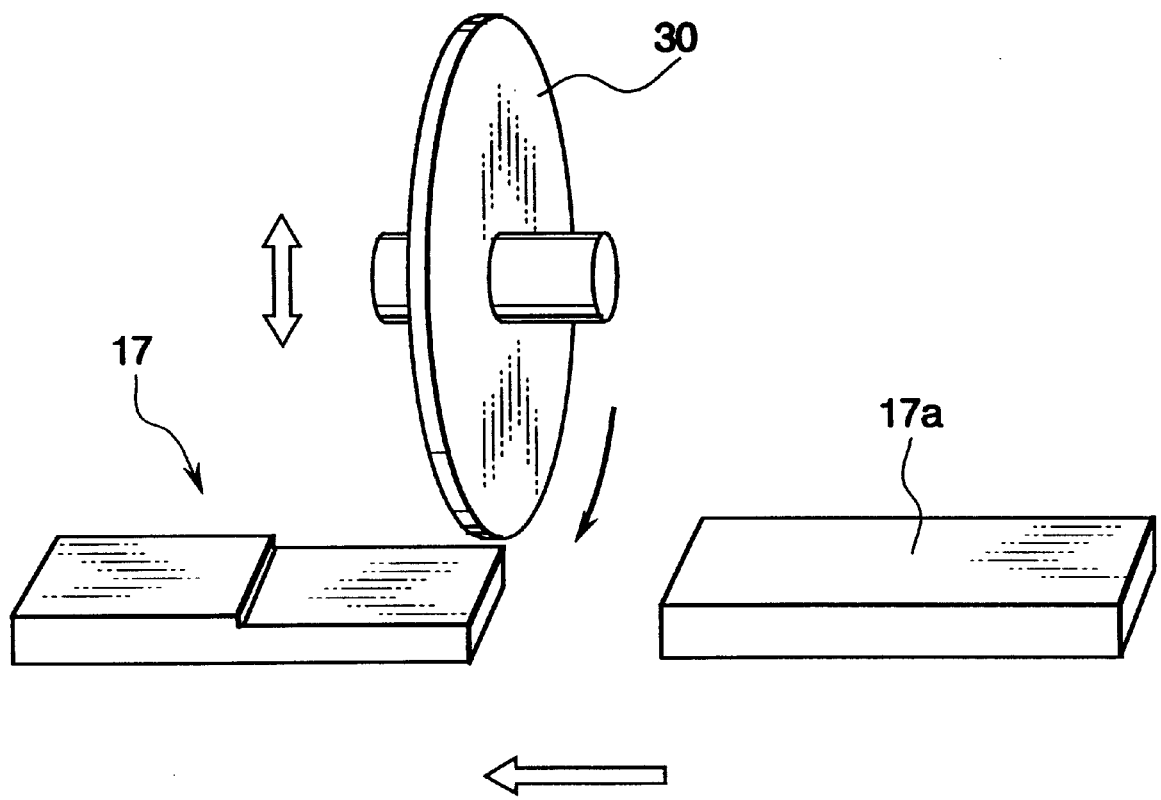
FIG. 9 shows a method for preparing the phase adjusting plate used in the first embodiment.

(vi) Process the polyimide film 17*a* with the in-plane refractive index $n_1$ by a method using a processing tool 30, as shown in FIG. 9, to provide the film thicknesses $w_1$ and $w_2$. This film processed to the predetermined thickness is called the phase adjusting plate 17 (FIG. 8).

(vii) Insert the processed phase adjusting plate 17 into the groove 16 formed above, and fix it there using the adhesive 18.

The 2×2 optical switch was actually prepared by silica-based PLC technology, showing the following values:

$P_1$=20 mW $P_2$=420 mW

The refractive index of the adhesive 18 and the in-plane refractive index of the polyimide film 17*a* were $n_1$=1.53

$n_2$=1.52 with the difference between the refractive indices being 0.01.

Accordingly, the manufacturing error can be compensated for by setting $(w_2-w_1)$ at 3.9 μm.

Thus, the following dimensions are set:

$w_2$=16.0 μm $w_1$=12.1 μm

With the processing method illustrated in FIG. 9, the film thickness can be obtained at an absolute accuracy of as low as ±0.5 μm. However, the relative film thickness difference can be adjusted to ±0.05 μm, so that the manufacturing error can be compensated for accurately.

Figure 11:
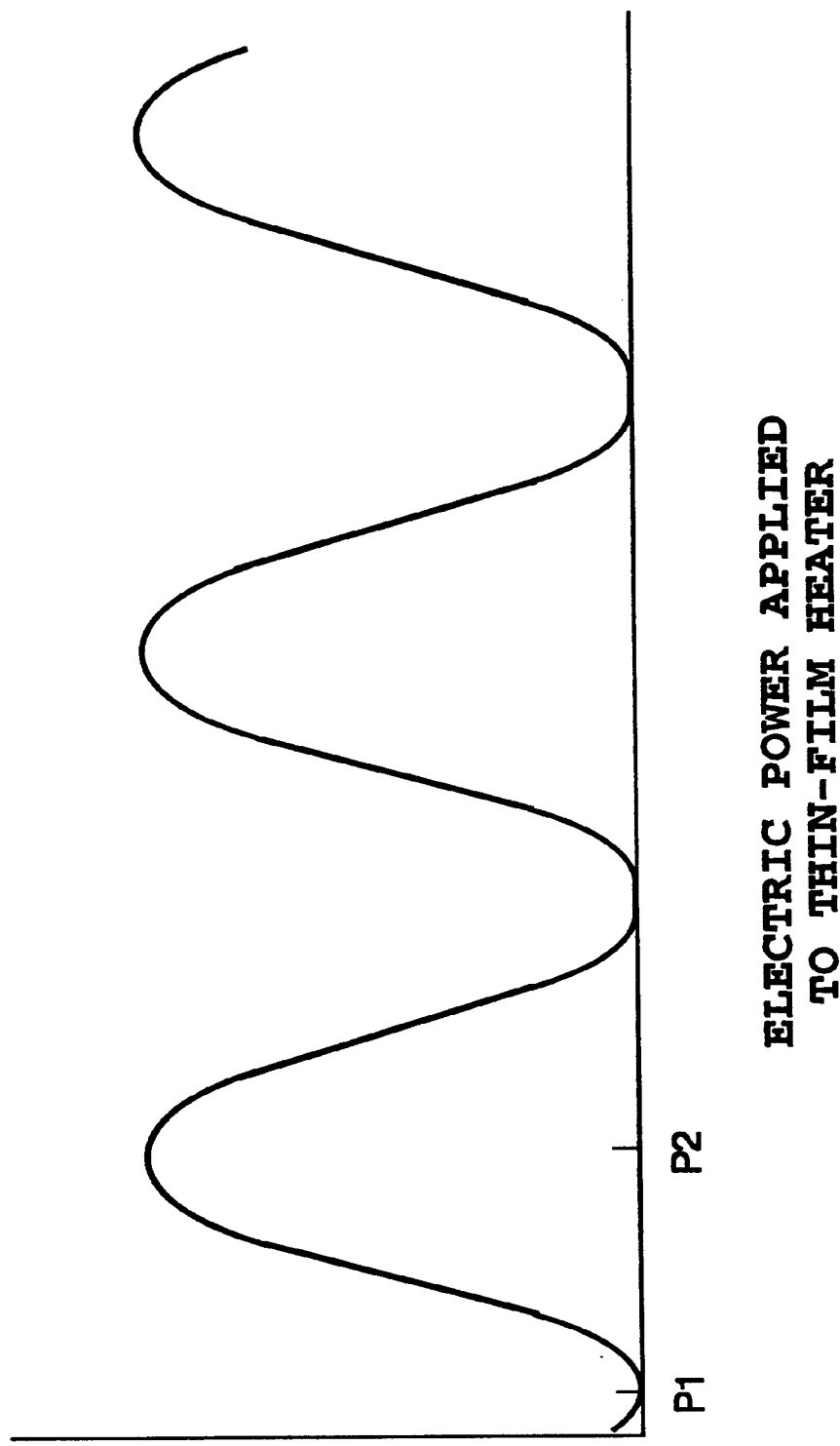
FIG. 11 is a graph showing changes in the optical transmittance versus electric power applied to the thin-film heater after insertion of the phase adjusting plate in the Mach-Zehnder interferometer shown in FIG. 6.

Changes in the optical transmittance responsive to the electric power applied to the thin film heater of the resulting 2×2 optical switch are shown in FIG. 11. P1 takes the value 0; hence, whether 400 mW is applied or not corresponds to switching on or off.

When the groove 20 μm wide was formed, and the film and adhesive were inserted there, the excess loss of light was 0.3 dB. This value is sufficiently small compared with the value of the entire optical circuit, and poses no practical problem.

Embodiment 2

Figure 12:
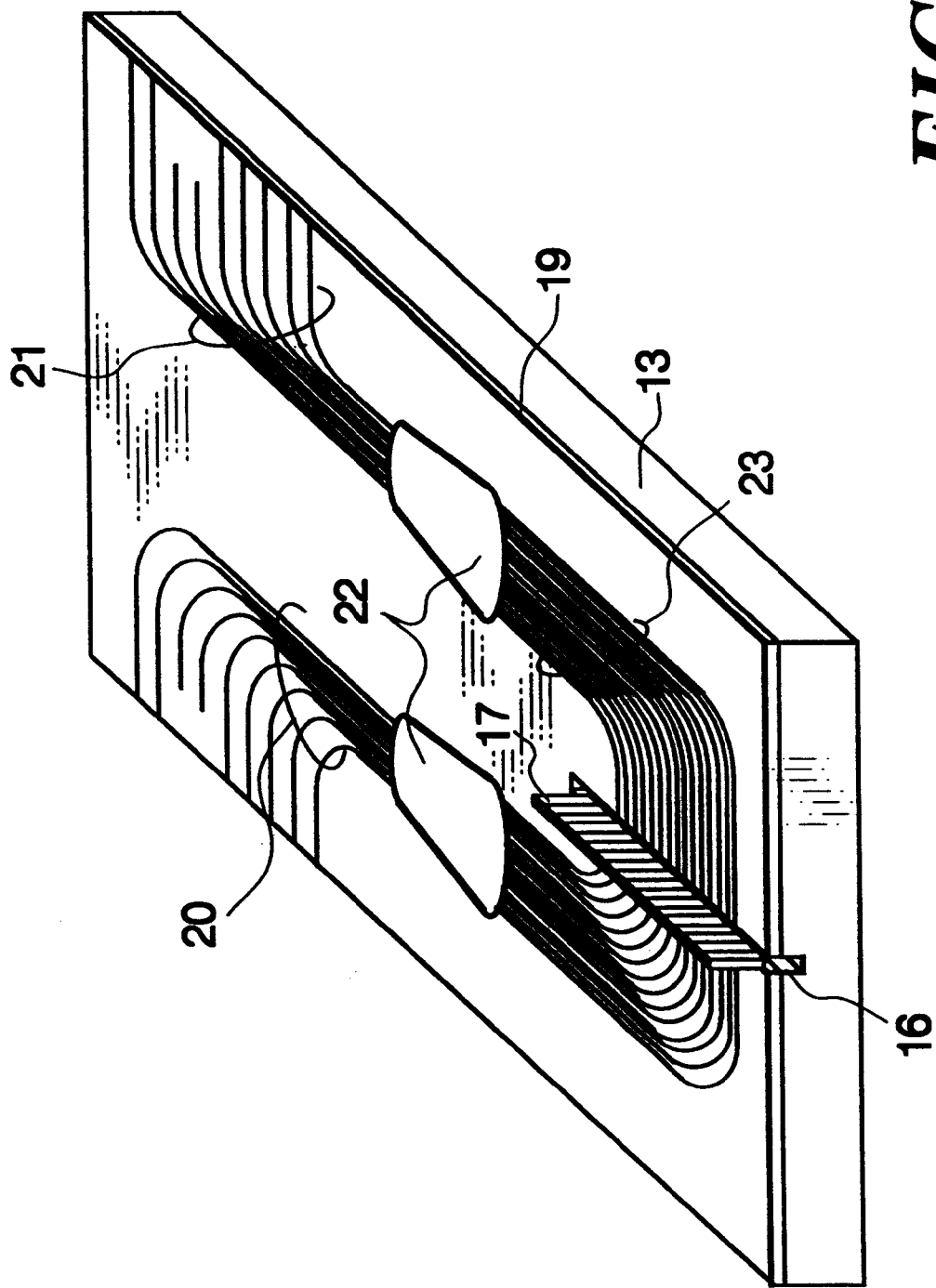
FIG. 12 is a schematic view of an arrayed-waveguide grating wavelength division multi/demultiplexer as a second embodiment of the present invention.

FIG. 12 shows an arrayed-waveguide grating wavelength division multi/demultiplexer as a second embodiment of the present invention.

Figure 13:
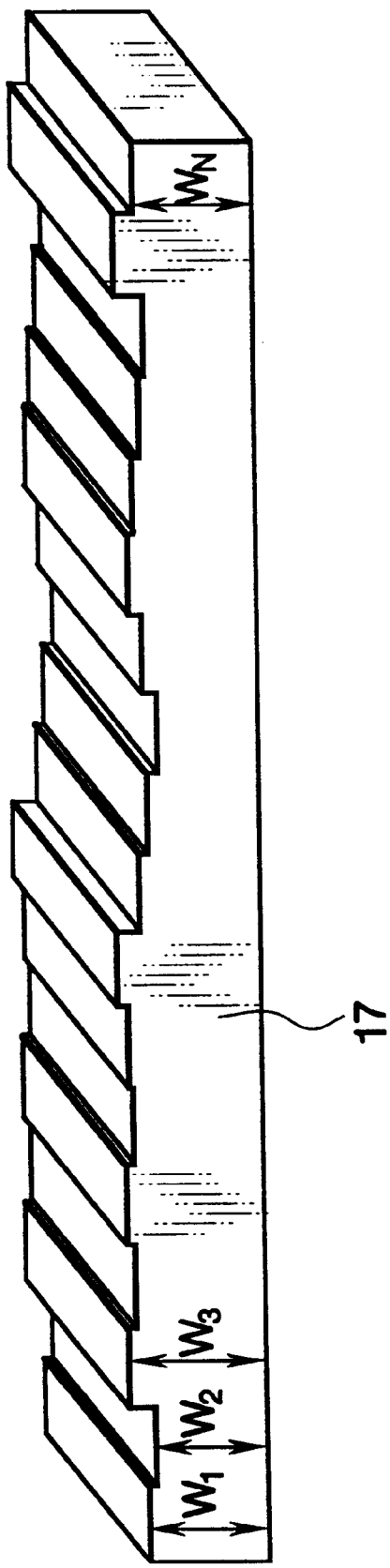
FIG. 13 is a schematic view of a phase adjusting plate used in the second embodiment.

In FIG. 12, the numeral 13 denotes a silicon substrate, 16 is a groove in which a phase adjusting plate 17 is inserted, 19 is a cladding layer, 20 are input waveguides, 21 are output waveguides, 22 are slab waveguides, and 23 represent arrayed waveguides. FIG. 13 is an enlarged view of the phase adjusting plate used in FIG. 12.

In the instant embodiment, errors in the optical path lengths of the arrayed waveguides 23 arranged in parallel can be measured using a low coherent light source.

This measuring method is described in detail in K. Takada et al., "Measurement of phase error distributions in silica-based arrayed-waveguide grating multiplexers by using Fourier transform spectroscopy," Electron. Lett., vol. 30, no. 20, pp. 1671–1672, 1994.

The wavelength division multi/demultiplexer according to the instant embodiment was prepared by the following procedure, which was basically the same as the procedure mentioned in the aforementioned Embodiment 1:

(i) Prepare an arrayed-waveguide grating wavelength division multi/demultiplexer on a silicon substrate 13 by flame deposition and reactive ion etching using conventional technology.

(ii) Form a groove 16 having a width of 20 μm and a depth of 150 μm with a dicing saw.

(iii) Fill the groove 16 with an adhesive having the refractive index $n_2$.

(iv) In this condition, measure errors in the optical path lengths of the arrayed waveguides 23 arranged in parallel.

(v) Process a polyimide film with an in-plane refractive index of $n_1$ by a processing method, as shown in FIG. 9, to provide film thicknesses $w_1, w_2 \ldots w_N$.

Here, determine each of the film thicknesses $w_1, w_2 \ldots w_N$ so as to compensate for errors in the optical path lengths of the arrayed waveguides 23. For instance, when the optical path length errors for the first, second . . . the Nth arrayed waveguides are $\delta L_1 \ldots \delta L_N$, seek $w_i$ to satisfy $$\delta L_i + (n_1 - n_2) \times w_i = \text{constant}$$

(vi) Insert the processed phase adjusting plate 17 into the groove 16, and fix it there using the adhesive.

Figure 14:
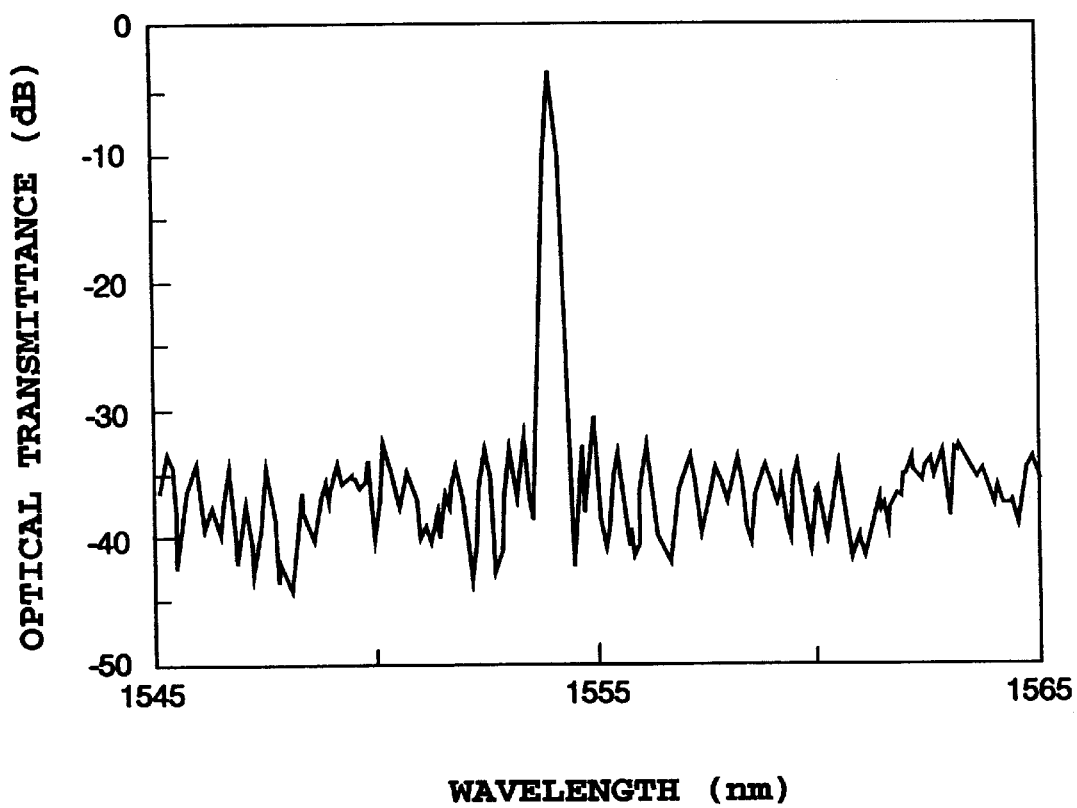
FIG. 14 is a graph showing the wavelength-transmission characteristics of transmitted light from a central input port to a central output port before insertion of a phase adjusting plate in the arrayed-waveguide grating wavelength division multi/demultiplexer shown in FIG. 12.
Figure 15:
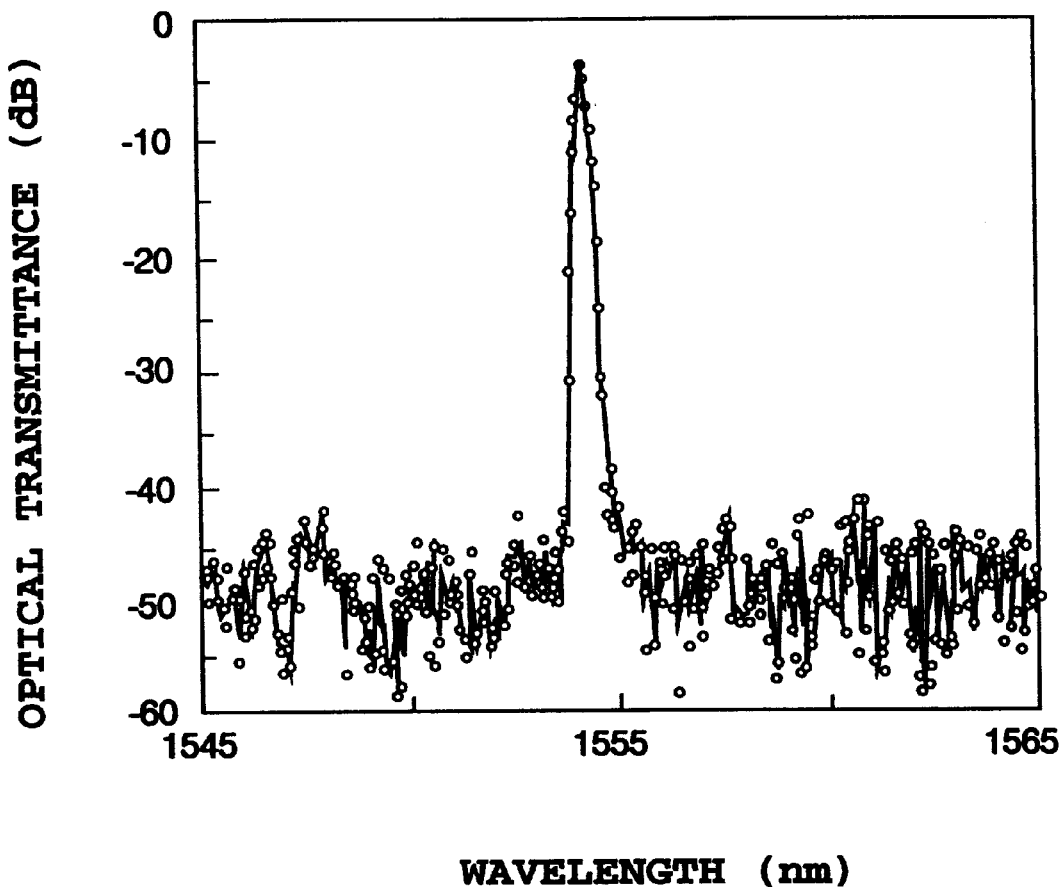
FIG. 15 is a graph showing the wavelength-transmission characteristics of transmitted light from the central input port to the central output port after insertion of the phase adjusting plate in the arrayed-waveguide grating wavelength division multi/demultiplexer shown in FIG. 12.

FIG. 14 shows the wavelength-transmission characteristics of transmitted light in the arrayed-waveguide grating wavelength division multi/demultiplexer before insertion of the phase adjusting plate. FIG. 15 shows the wavelength-transmission characteristics of transmitted light in the arrayed-waveguide grating wavelength division multi/demultiplexer after insertion of the phase adjusting plate by the process described above.

After the phase adjusting plate was inserted, the optical path length errors of the arrayed waveguides were compensated for, whereupon the crosstalk was reduced from −30 dB to −40 dB. At this time, the excess loss due to the phase adjusting plate insertion, including groove formation, was 0.3 dB.

In the foregoing Embodiments 1 and 2, the respective materials were selected so that the difference between the in-plane refractive index of the phase adjusting plate and the refractive index of the adhesive would be 0.01. In this case, the necessary change in the film thickness to compensate for the optical path length error of 0.1 μm was 10 μm. Even when the accuracy for processing of film thickness changes in the phase adjusting plate was ±0.5 μm, it was possible to compensate for the optical path length error at an accuracy of ±0.005 μm.

By setting the difference in refractive index between the adhesive and the film at an arbitrary value, it becomes possible to adjust the effect of changes in the film thickness on the optical path length.

Embodiment 3

Figure 16:
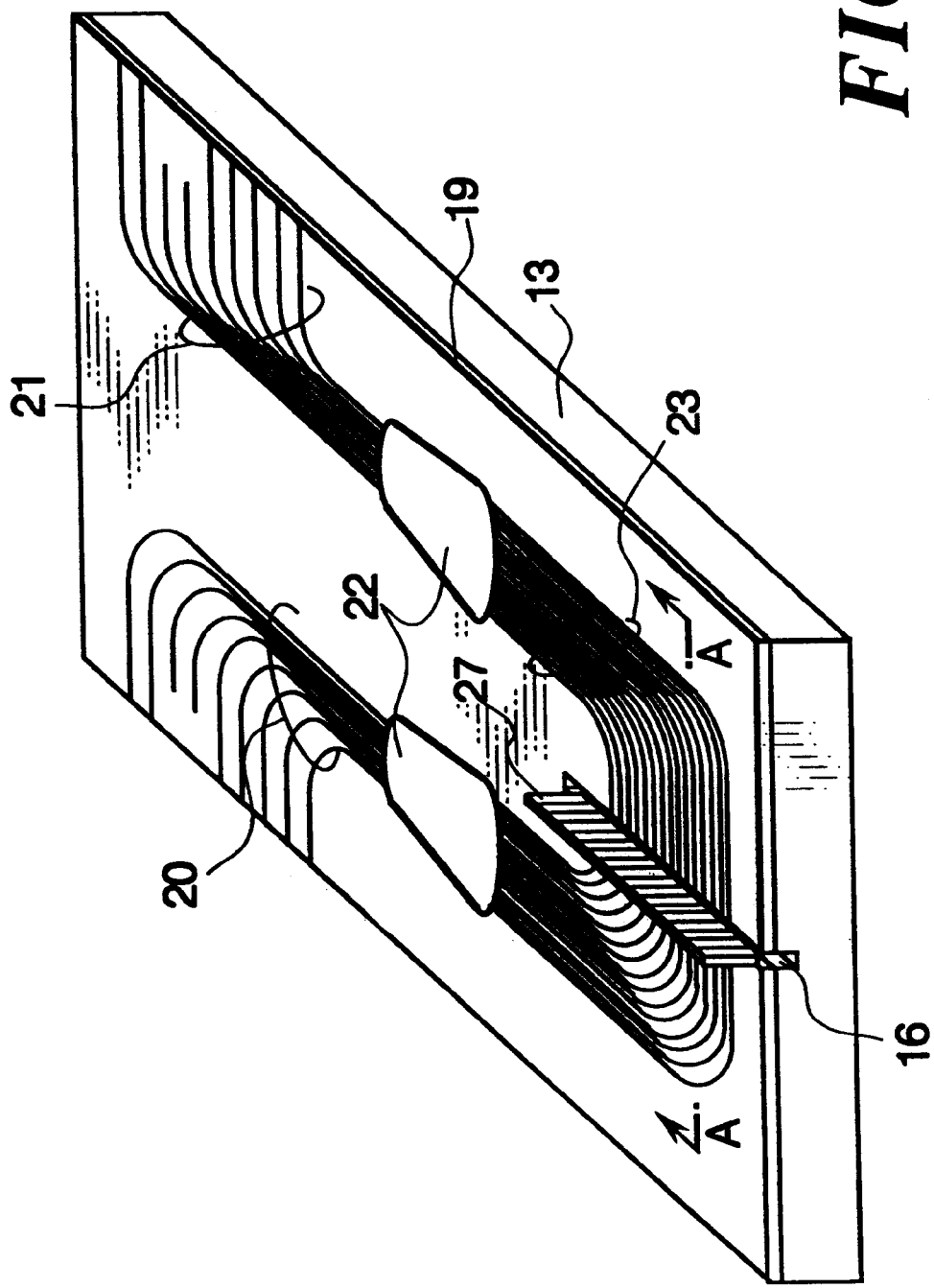
FIG. 16 is a view of an arrayed-waveguide grating multi/demultiplexer as a third embodiment of the present invention.

FIG. 16 shows an arrayed-waveguide grating wavelength division multi/demultiplexer as a third embodiment of the present invention.

In FIG. 16, the numeral 20 represents input waveguides, 21 denotes output waveguides, 22 represents slab waveguides, 23 represents arrayed waveguides, 19 is a cladding layer, 13 is a silicon substrate, 16 is a groove, and 27 is an amplitude adjusting plate.

Figure 17:
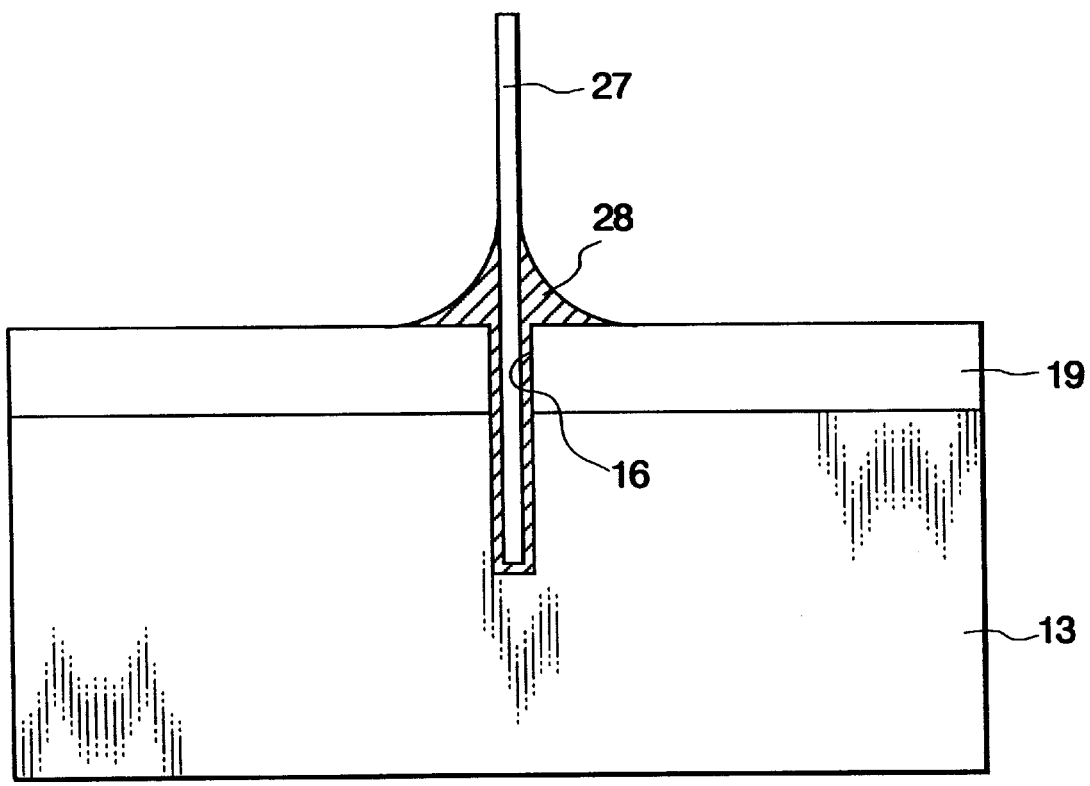
FIG. 17 is an enlarged view taken along line A—A of FIG. 16.
Figure 18:
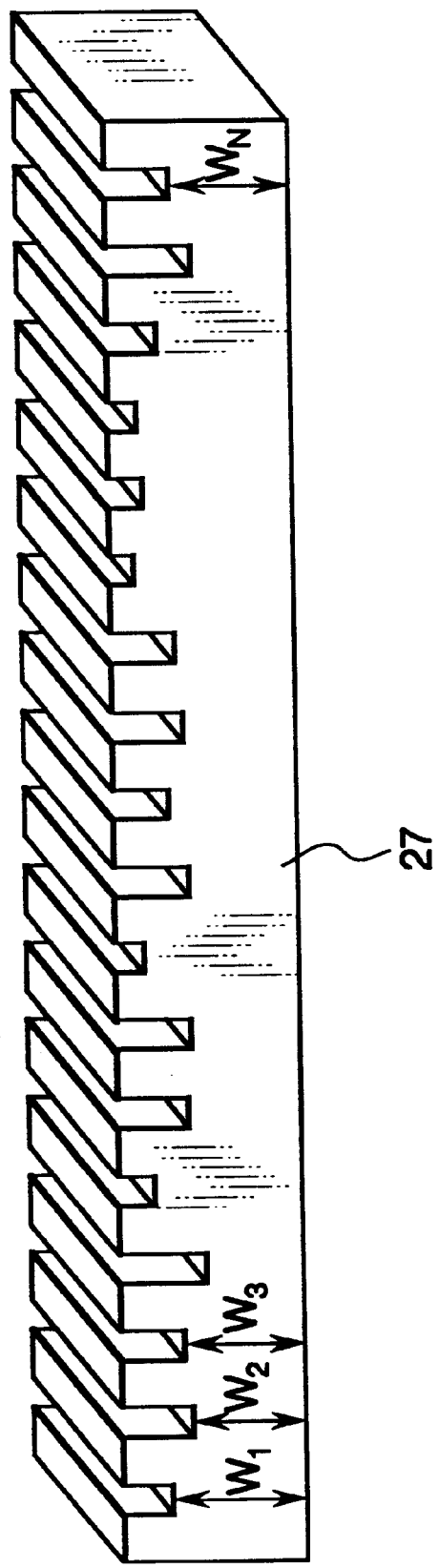
FIG. 18 is an enlarged view of an amplitude adjusting plate used in the third embodiment.

FIG. 17 is an enlarged sectional view taken along line A—A of FIG. 16. FIG. 18 is an enlarged view of the amplitude adjusting plate used in FIG. 16.

In the instant embodiment, the arrayed-waveguide grating wavelength division multi/demultiplexer was processed to have a constant-width groove 16 intersecting the arrayed waveguides of the multi/demultiplexer. Then, an amplitude adjusting plate 27 with spatially changed thicknesses and a constant in-plane refractive index was inserted into the groove 16.

To fix the amplitude adjusting plate 27 in the groove 16, an optically transparent adhesive 28 was filled into the groove 16 as shown in FIG. 17. The refractive index of the adhesive 28 was matched to the refractive index of the amplitude adjusting plate 27 so as not to vary the phase characteristics.

Let the film thickness at the intersection with the ith arrayed waveguide be $W_i$. After light propagating through the ith arrayed waveguide passes through the groove 16, its amplitude $A_i$ varies according to the equation:

$$A_i^2 = \exp(-\alpha W_i)$$

where $\alpha$ is the in-plane absorption coefficient of the amplitude adjusting plate 27, with a certain loss due to the insertion of the transparent film being excluded.

This relationship is based on Lambert's law concerned with the absorption of light. It can be applied when the absorption coefficient is constant with respect to the film thickness.

In the instant embodiment, therefore, the amplitude was adjusted by suitably providing the in-plane absorption coefficient, $\alpha$, and the film thickness, $W_i$, of the film.

First, measurements were made of the distribution of the amplitude errors of a plurality of paths formed by the input waveguides 20, output waveguides 21, slab waveguides 22 and arrayed waveguides 23. A known optical circuit analytic method was applicable to this measurement (see, for example, Japanese Patent Application No. 5989/94).

The wavelength division multi/demultiplexer according to the instant embodiment was prepared by the following procedure:

(i) Prepare an arrayed-waveguide grating wavelength division multi/demultiplexer on a silicon substrate 13 by flame deposition and reactive ion etching.

(ii) Measure the distribution of phase errors and the distribution of amplitude errors of a plurality of paths, which were formed by the input waveguides 20, output waveguides 21, slab waveguides 22 and arrayed waveguides 23, by use of a low coherent light source. Based on these measurements, determine the amounts of amplitude adjustment, $A_1, A_2, \ldots A_N$ ($A_i \leq 1$; the character, i, means the number of the arrayed waveguide).

(iii) Irradiate each arrayed waveguide with laser light to change the refractive index partially and compensate for the phase error.

(iv) Prepare a polyimide film (absorption coefficient $\alpha$, refractive index $n_1$), and process it so as to have film thicknesses $W_1, W_2 \ldots W_N$ at its intersections with the arrayed waveguides when it would be inserted into a groove. Here, $W_i$ was determined to satisfy $$A_i^2 = \exp(-\alpha W_i)$$

(v) Form a groove 16 having a width of $W_0$ and a depth of 150 μm with a dicing saw.

(vi) Insert the processed amplitude adjusting plate 27 into the groove 16, and fix it there using an adhesive 28.

To decrease the phase errors in the instant embodiment, a second harmonics from a mode-locked Q switch YAG laser was used.

For amplitude adjustment, a film having an absorption coefficient of 0.02 (1/μm) and a film thickness of 30 microns was prepared, and processed in amounts of 0 to 20 microns by means of a dicing saw to have film thickness $W_i$ at an accuracy of 0.5 micron. The width $W_0$ of the groove 16 was set at 35 microns.

Figure 19:
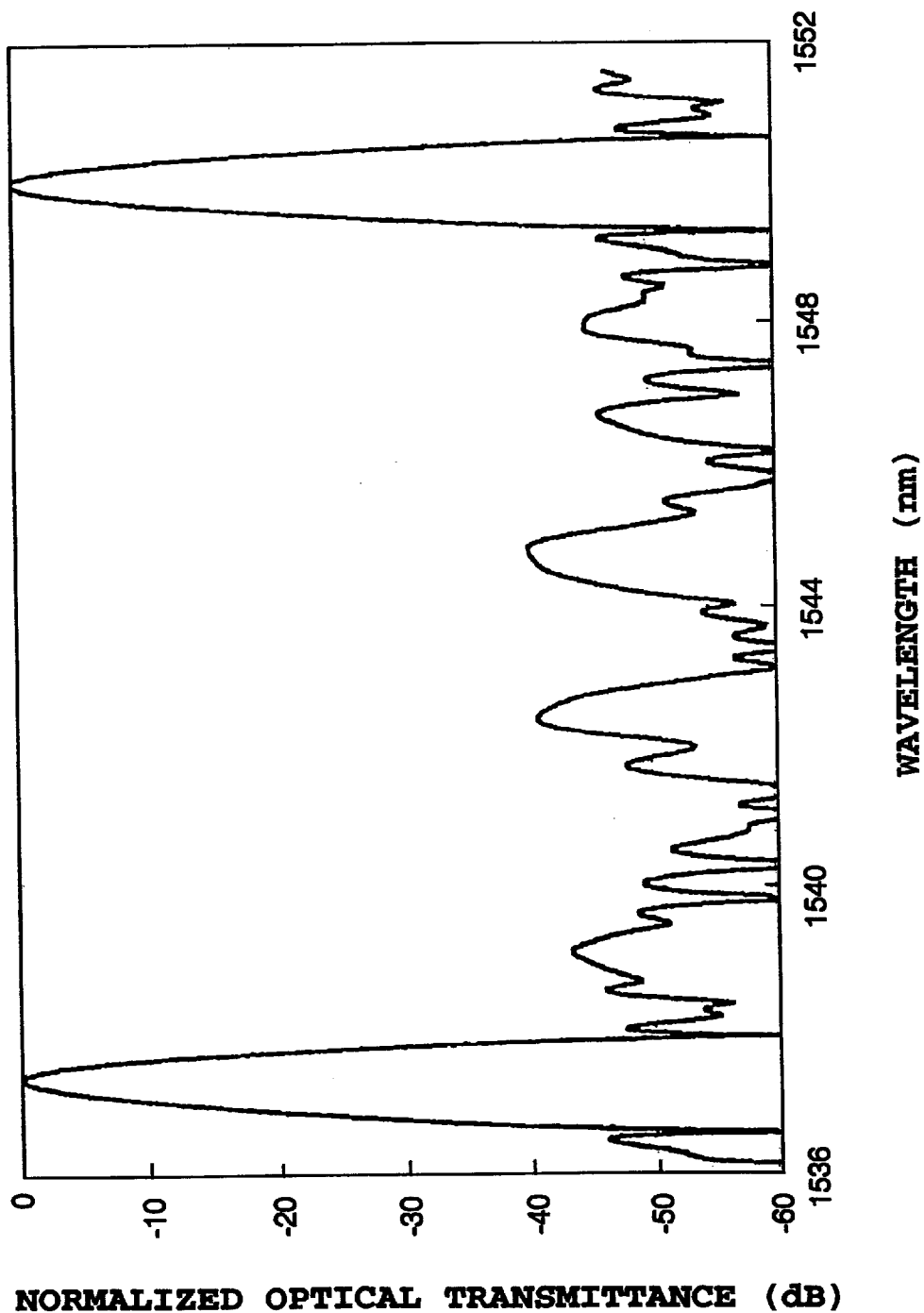
FIG. 19 is a graph showing the wavelength-transmission characteristics of transmitted light before insertion of an amplitude adjusting plate in the arrayed-waveguide grating multi/demultiplexer shown in FIG. 16.
Figure 20:
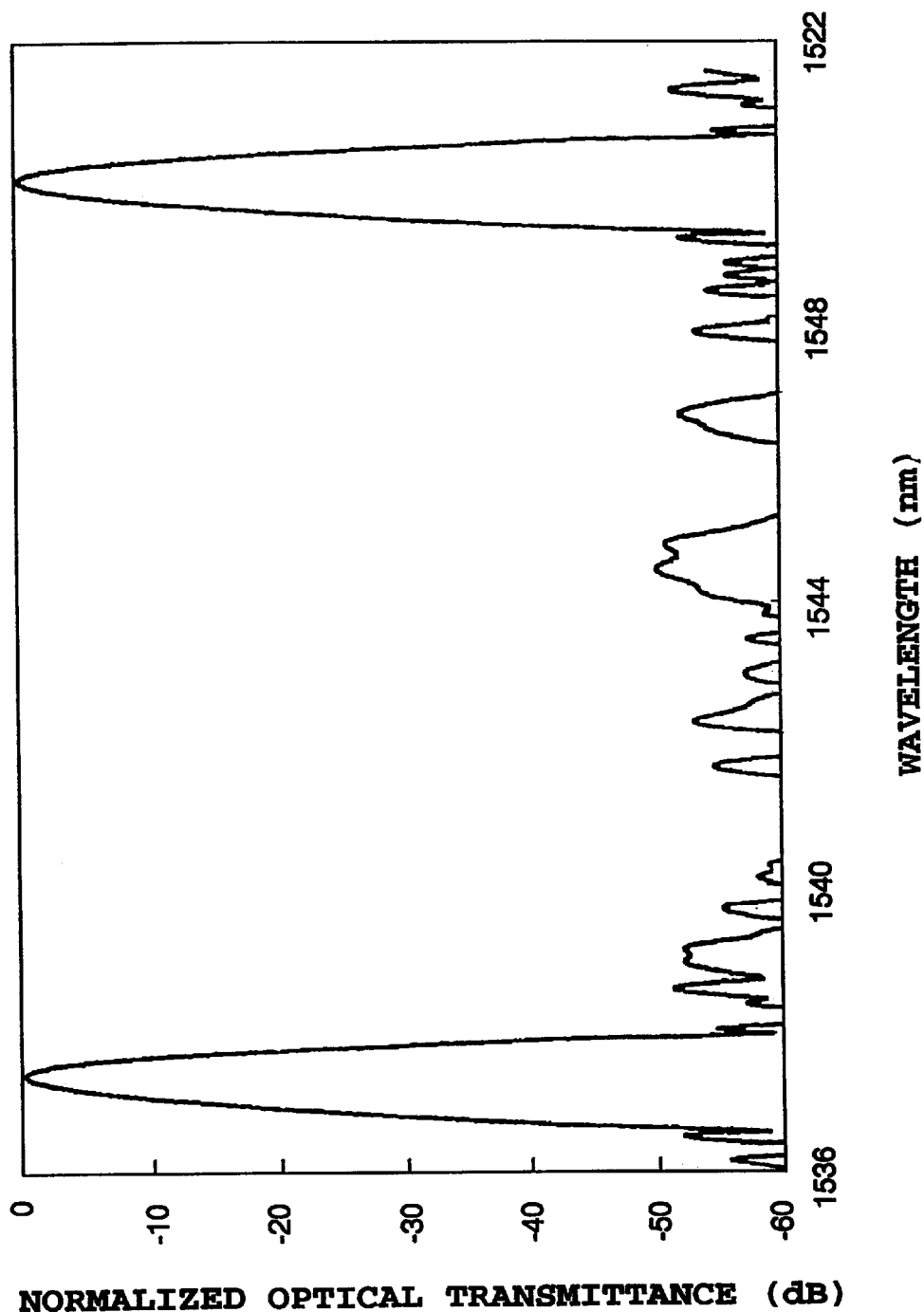
FIG. 20 is a graph showing the wavelength-transmission characteristics of transmitted light after insertion of the amplitude adjusting plate in the arrayed-waveguide grating multi/demultiplexer shown in FIG. 16.

FIG. 19 shows the wavelength-transmission characteristics of transmitted light in the arrayed-waveguide grating multi/demultiplexer before insertion of the amplitude adjusting plate (after reduction of phase errors). FIG. 20 shows the wavelength-transmission characteristics of transmitted light in the arrayed-waveguide grating multi/demultiplexer after insertion of the amplitude adjusting plate by the above-described method.

As shown in FIG. 20, the amplitude errors of the arrayed waveguides were compensated for by the amplitude adjusting plate 27, and the crosstalk was reduced from −40 dB to −50 dB. At this time, the excess loss due to the amplitude adjusting plate insertion, including groove formation, was 1.7 dB.

Embodiment 4

Figure 21:
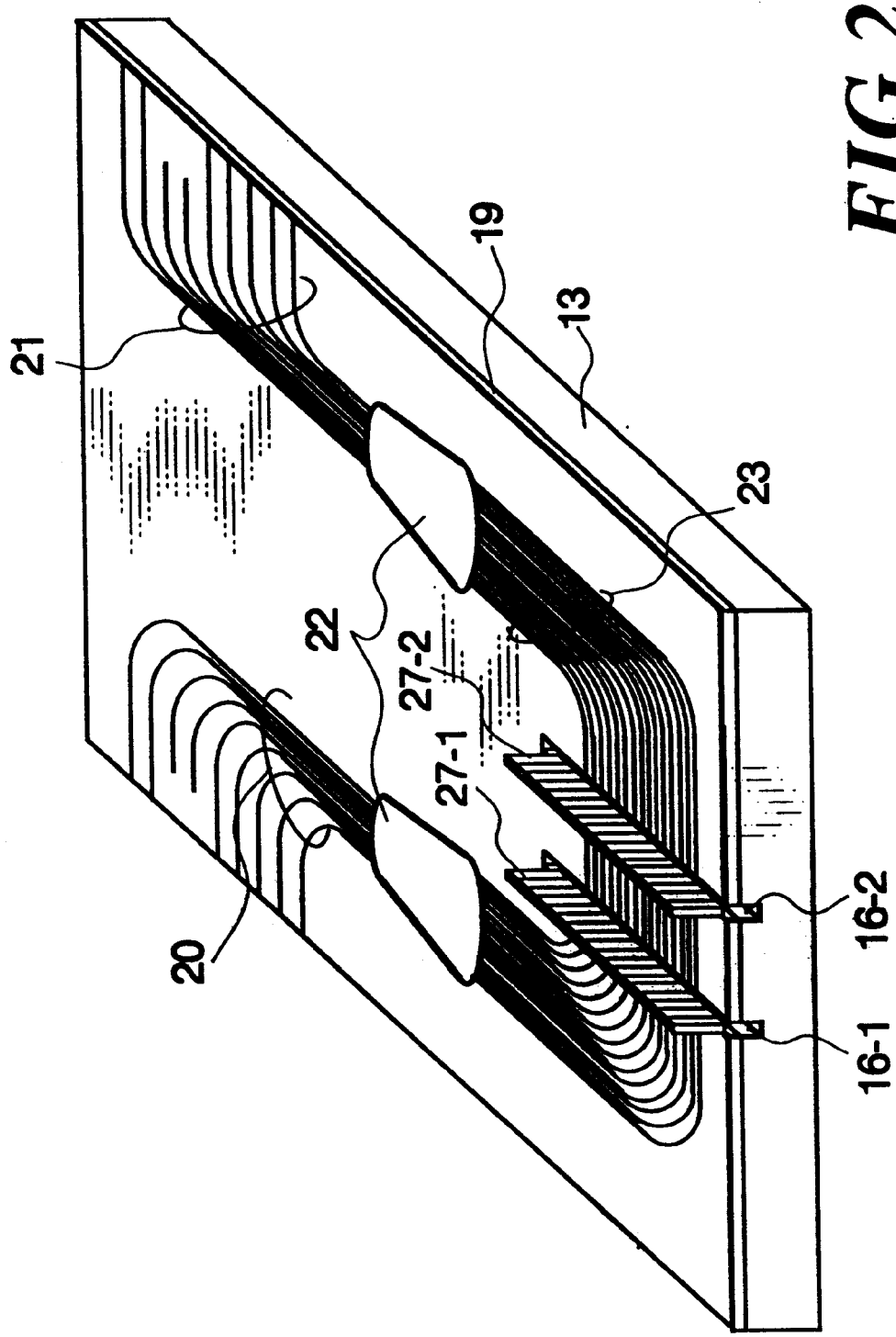
FIG. 21 is a perspective view of an arrayed-waveguide grating multi/demultiplexer as a fourth embodiment of the present invention.

FIG. 21 shows an arrayed-waveguide grating wavelength division multi/demultiplexer as a fourth embodiment of the present invention.

In FIG. 21, the numerals 16-1 and 16-2 each represents a groove, 27-1 is a phase adjusting plate, and 27-2 is an amplitude adjusting plate.

In the instant embodiment, a conventional arrayed-waveguide optical wavelength multi/demultiplexer was processed to have a constant-width groove 16-1 intersecting the arrayed waveguides of the multi/demultiplexer. Then, a phase adjusting plate 27-1 with spatially changed thicknesses and a constant in-plane refractive index was inserted into the groove 16-1, followed by filling the groove with an adhesive. This constitution is designed to decrease phase errors.

Furthermore, as in the Embodiment 3, the arrayed-waveguide optical wavelength multi/demultiplexer was processed to have a constant-width groove 16-2 intersecting the arrayed waveguides of the multi/demultiplexer. Then, an amplitude adjusting plate 27-2 was inserted into the groove 16-2. The difference of the instant embodiment from the Embodiment 3 is that the amplitude adjusting plate 27-2 was given a flat surface of a uniform thickness as shown in FIG. 22.

Figure 22:
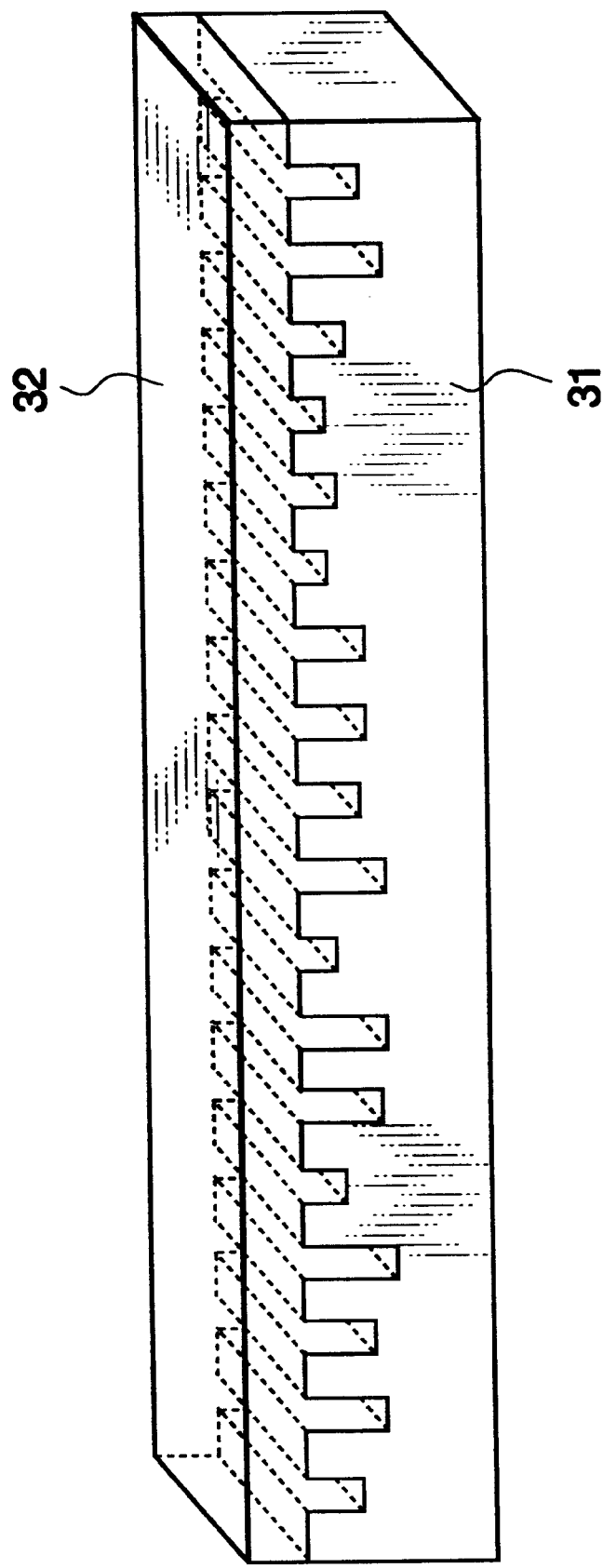
FIG. 22 is an enlarged view of an amplitude adjusting plate used in the fourth embodiment.

In FIG. 22, the numeral 31 denotes a film with spatially changed thicknesses and a constant in-plane refractive index, while the numeral 32 represents a transparent material for covering the irregularities of the film to make a flat surface. The refractive index of such a transparent material 32 for flattening the irregular film was the same as the refractive index of the film 31.

To fix the amplitude adjusting plate 27-2 in the groove, an adhesive was filled into the groove. The amplitude adjusting plate used in this Embodiment 4 had its irregularities smoothed out. Thus, the refractive index of the adhesive did not need to be matched to the refractive index of the amplitude adjusting plate as done in the Embodiment 3.

The wavelength division multi/demultiplexer according to the instant embodiment was prepared by the following procedure:

(i) Prepare an arrayed-waveguide grating wavelength division multi/demultiplexer on a silicon substrate 13 by flame deposition and reactive ion etching.

(ii) Measure the distribution of phase errors and the distribution of amplitude errors of a plurality of paths, which were formed by the input waveguides 20, output waveguides 21, slab waveguides 22 and arrayed waveguides 23, by use of a low coherent light source. Based on these measurements, determine the amounts of amplitude adjustment, $A_1, A_2, \ldots A_N$ ($A_i \leq 1$; the character, i, means the number of the arrayed waveguide).

Figure 2:
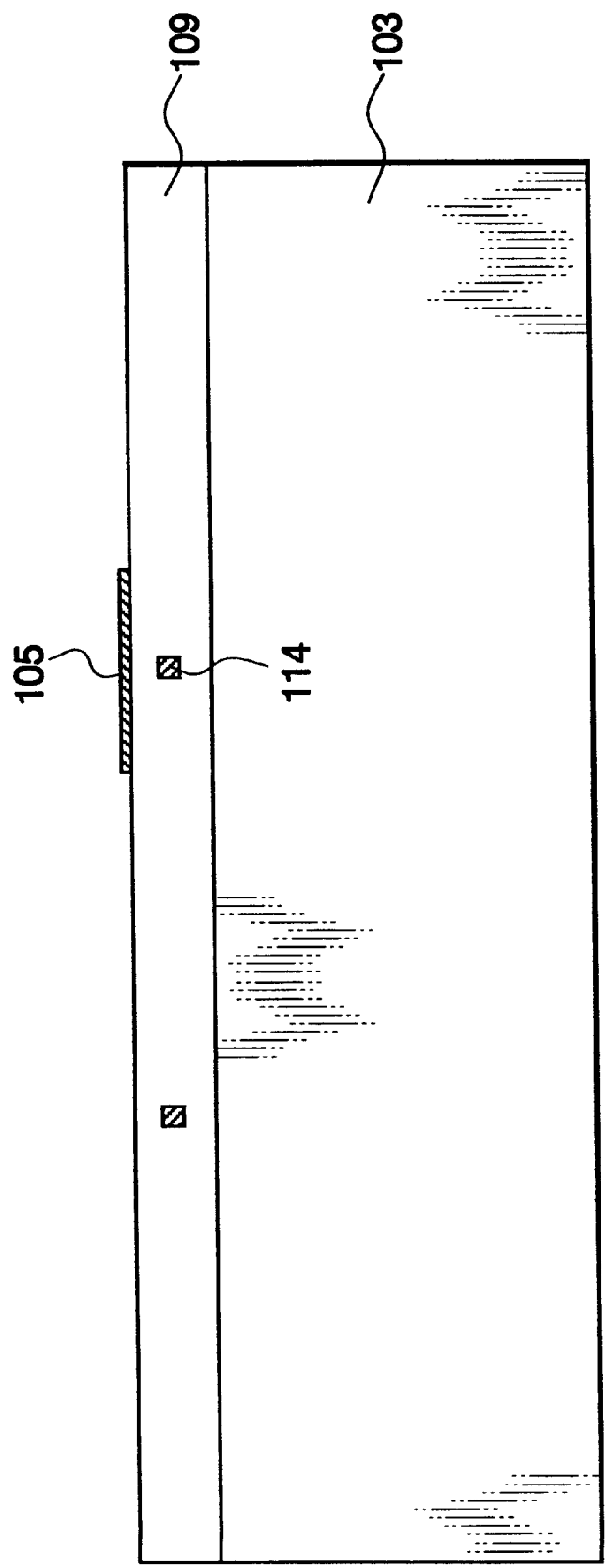
FIG. 2 is an enlarged sectional view taken along line II—II of FIG. 1.
Figure 3:
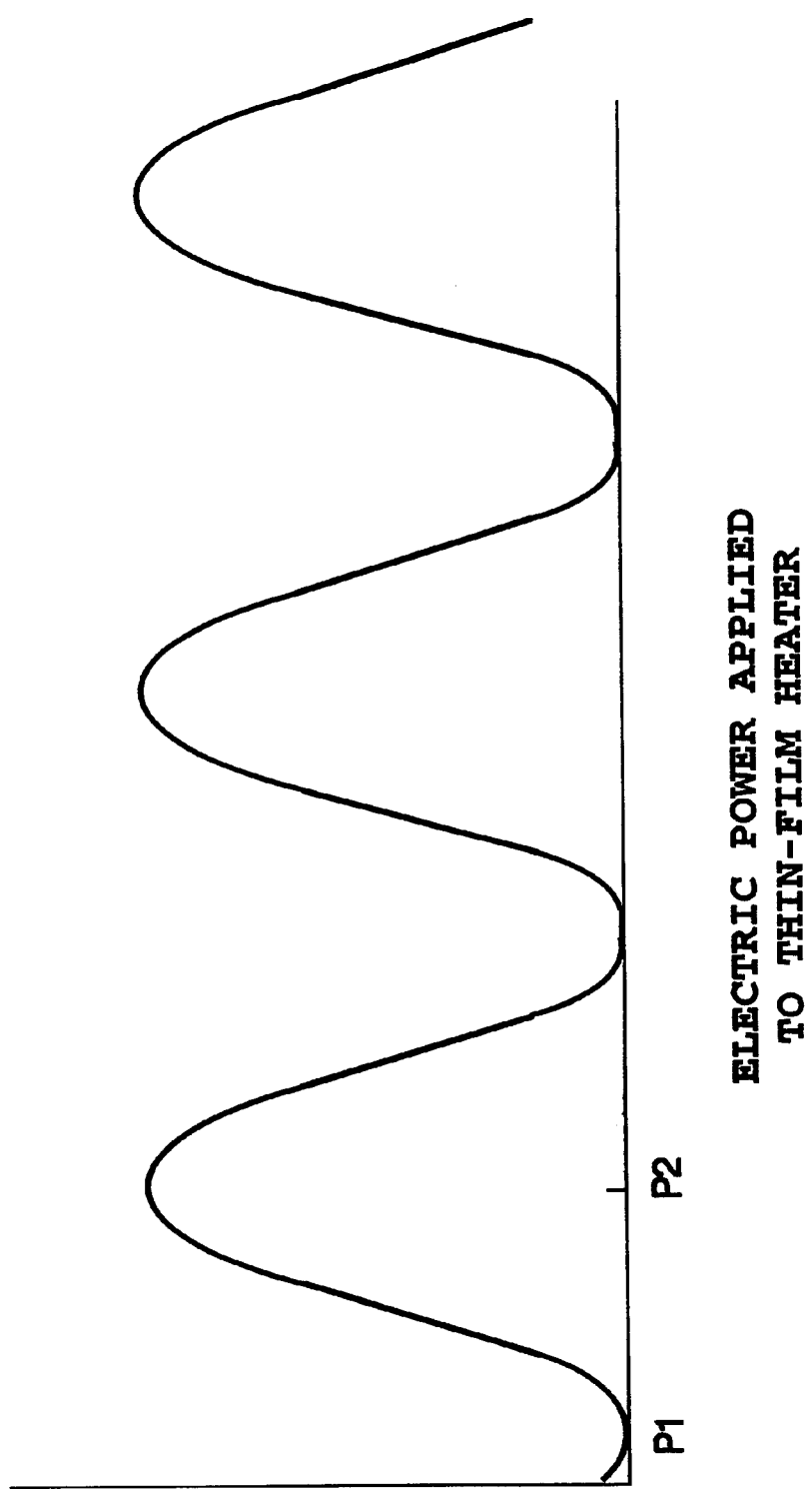
FIG. 3 is a graph showing changes in the optical transmittance versus electric power applied to a thin-film heater of the Mach-Zehnder interferometer shown in FIG. 1.
Figure 4:
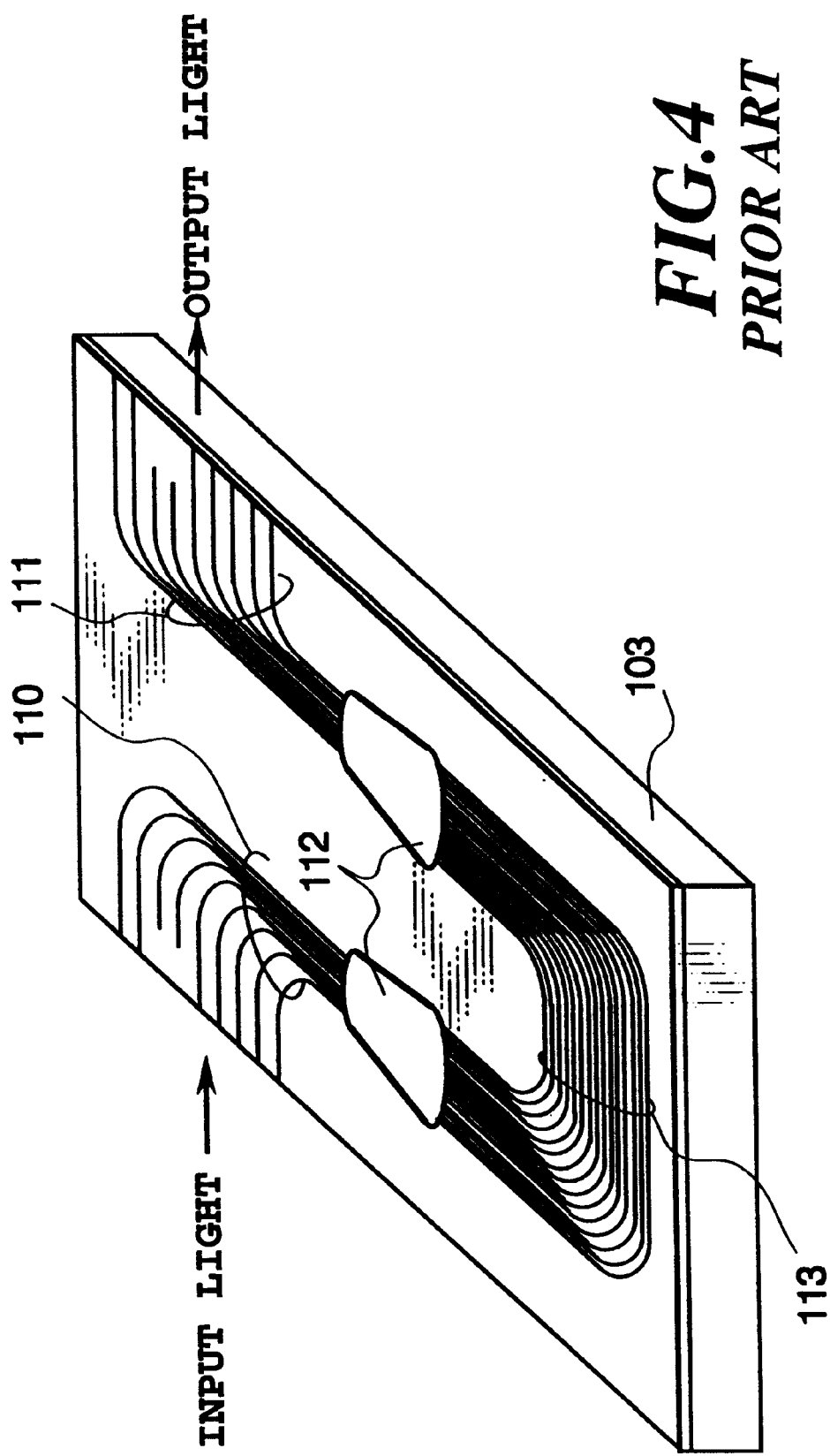
FIG. 4 shows the circuit configuration of an arrayed-waveguide grating wavelength division multi/demultiplexer.
Figure 5:
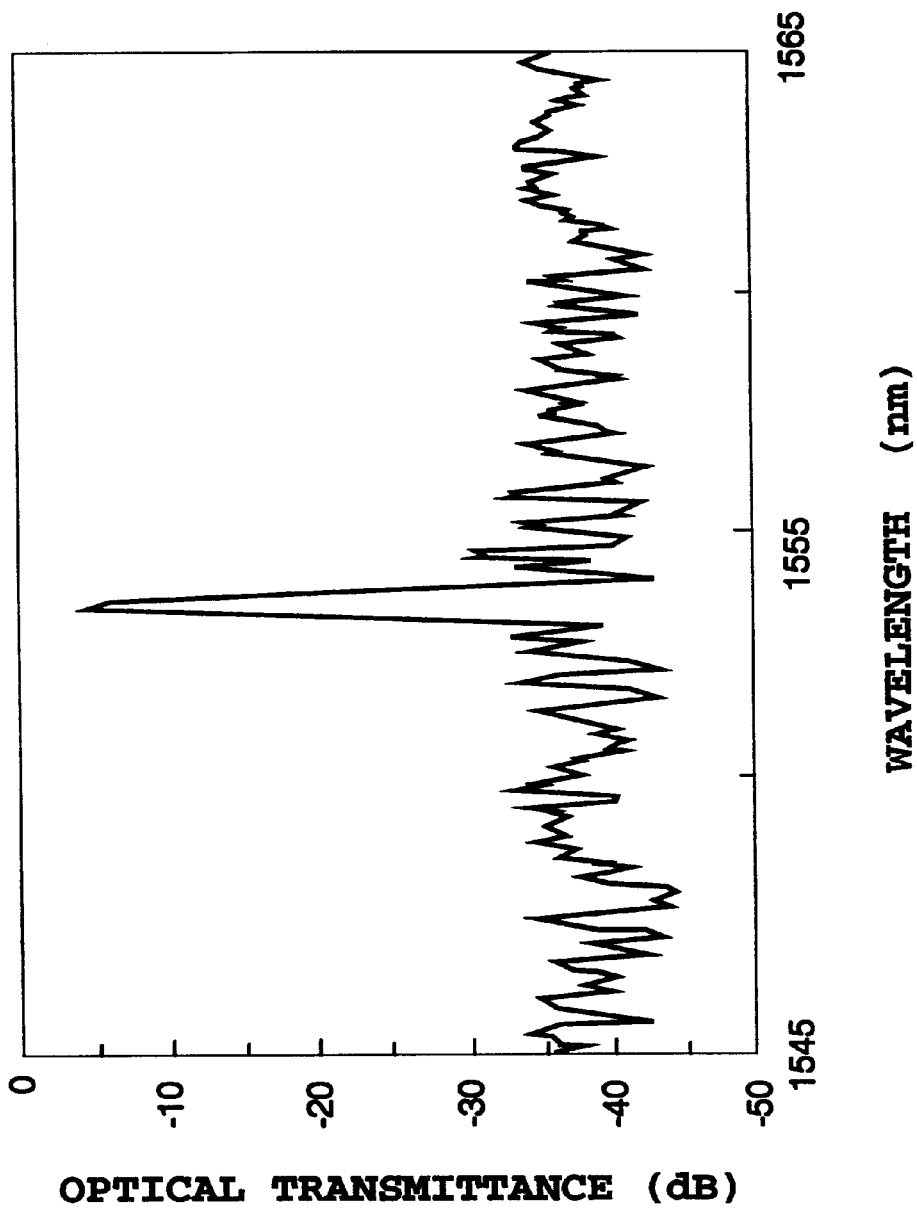
FIG. 5 shows the wavelength-transmission characteristics of transmitted light from a central input port to a central output port of the arrayed-waveguide grating wavelength division multi/demultiplexer shown in FIG. 4.

(iii) Using the optical circuit with the phase adjusting plate shown in FIGS. 1 and 2 as well as the method for production disclosed there, insert the phase adjusting plate 27-1 into the groove 16-1 to decrease phase errors.

(iv) Prepare a polyimide film (absorption coefficient α, refractive index $n_1$) of amplitude adjusting plate 27-2, and process it so that when inserted into groove 16-2, it would have film thicknesses $W_1, W_2 \ldots W_N$ at its intersections with the arrayed waveguides. Here, $W_i$ was determined to satisfy:

$$A_i^2 = \exp(-\alpha W_i)$$

(v) Form the groove 16-2 having a width of $W_0$ and a depth of 150 microns with a dicing saw.

(vi) Insert the processed amplitude adjusting plate 27-2 into the groove 16-2, and fix it there using an adhesive.

Actually, a film having an absorption coefficient of 0.03 (1/μm) and a film thickness of 20 microns was prepared, and processed in amounts of 0 to 15 microns by means of a dicing saw to have film thicknesses $W_i$ at an accuracy of 0.5 micron. Then, a transparent material 32 having the same refractive index as that of the resulting film 31 was spin coated on the film. As a result of spin coating, the depressions formed were filled up, and the film thickness became constant at 22 microns throughout the film. The width $W_0$ of the groove was set at 25 microns.

The amplitude errors of the arrayed waveguides were compensated for by the amplitude adjusting plate, and the crosstalk was reduced from −40 dB to −50 dB, with the exception of adjacent channels. At this time, the excess loss due to insertion of the phase and amplitude adjusting plates, including formation of the two grooves, was 2.2 dB.

Embodiment 5

The construction of Embodiment 5 of the present invention is the same as the construction of the Embodiment 4.

Figure 23:
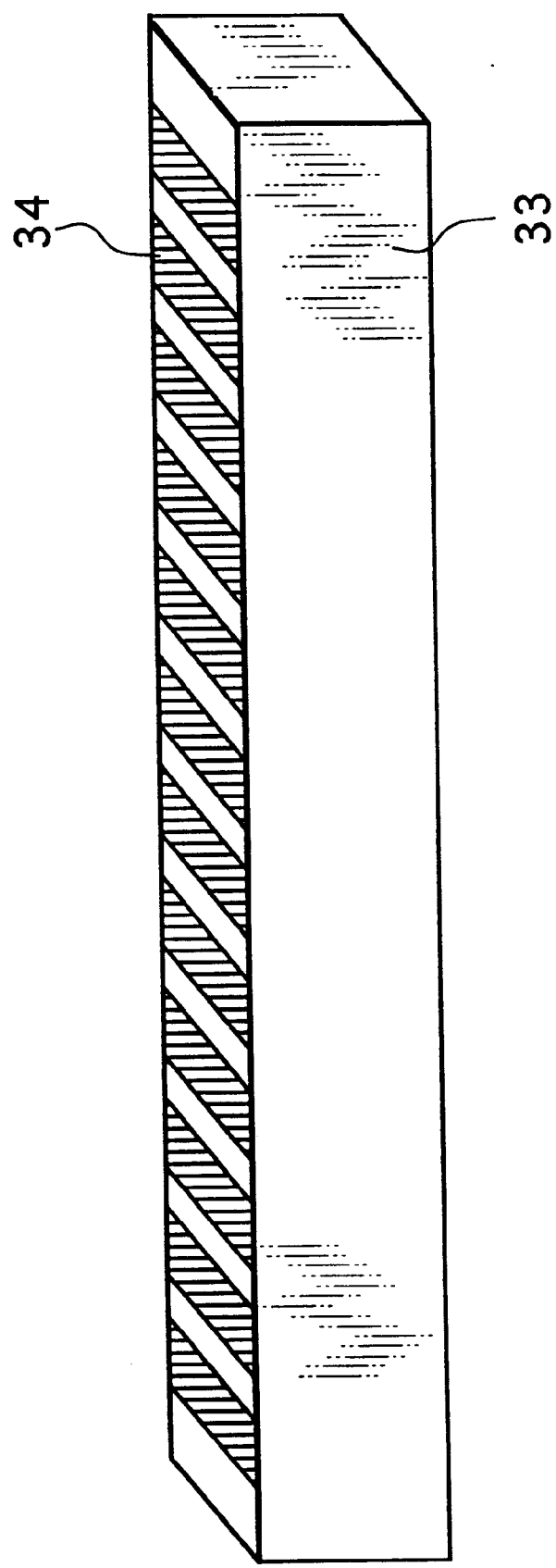
FIG. 23 is an enlarged view of an amplitude adjusting plate used in a fifth embodiment of the present invention.

The difference of this embodiment from the Embodiment 4 was in the insertion of an amplitude adjusting plate as illustrated in FIG. 23. In FIG. 23, the numeral 33 denotes a transparent film, and 34 a metal film. The thickness of each metal film 34 was determined by the absorption coefficient of the metal and the amount of amplitude adjustment. Since the metal film 34 had a high absorption coefficient, it required a small film thickness, and the effect of the irregularities of the metal film on the phase was minimal.

In the instant embodiment, the amplitude characteristics of the arrayed-waveguide grating wavelength division multi/demultiplexer that can usually be approximated in a Gaussian form were adjusted to a sinc function. Phase adjustment was used to achieve negative values in the sinc function, namely, to shift the phase by 180 degrees.

The amplitude adjusting plate in actual use was prepared by forming a film 15 microns thick, and then vacuum depositing Cr thereon. The width $W_0$ of the groove was set at 20 microns.

Figure 24:
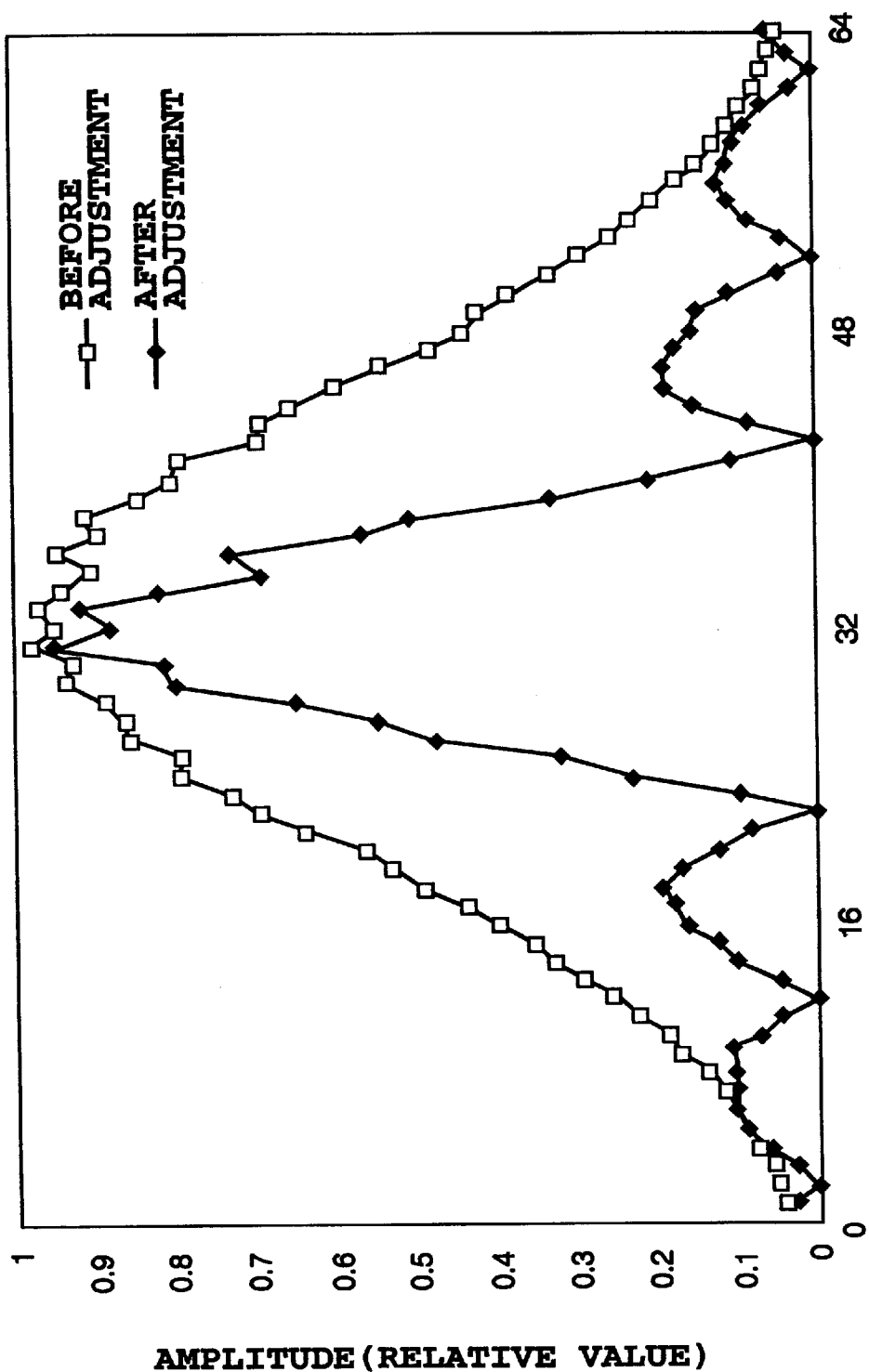
FIG. 24 is a view showing the distributions of amplitudes before and after insertion of an amplitude adjusting plate and a phase adjusting plate in an arrayed-waveguide grating multi/demultiplexer as the fifth embodiment.
Figure 25:
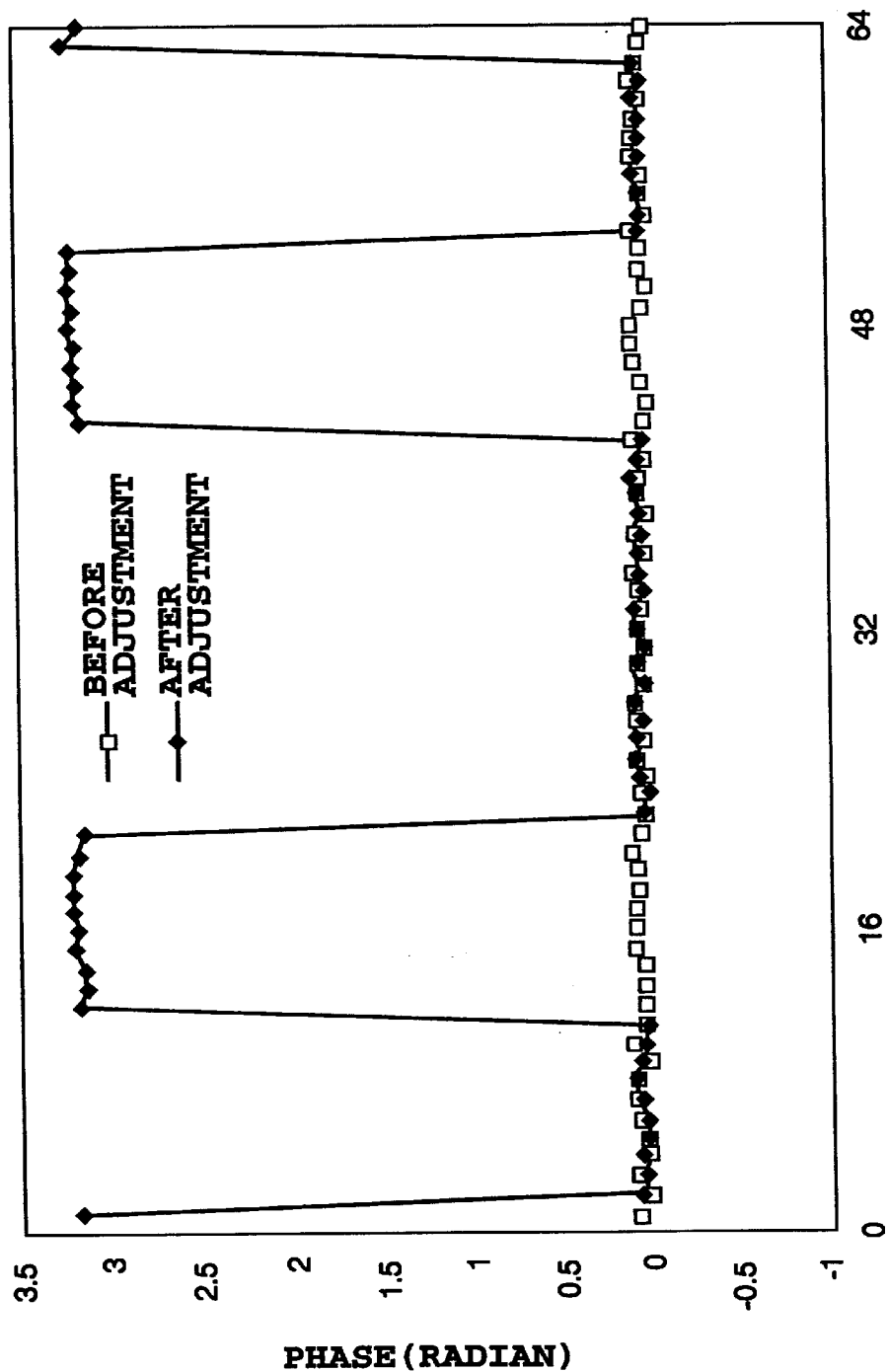
FIG. 25 is a view showing the distributions of phases before and after insertion of the amplitude adjusting plate and phase adjusting plate in the arrayed-waveguide grating multi/demultiplexer as the fifth embodiment.
Figure 26:
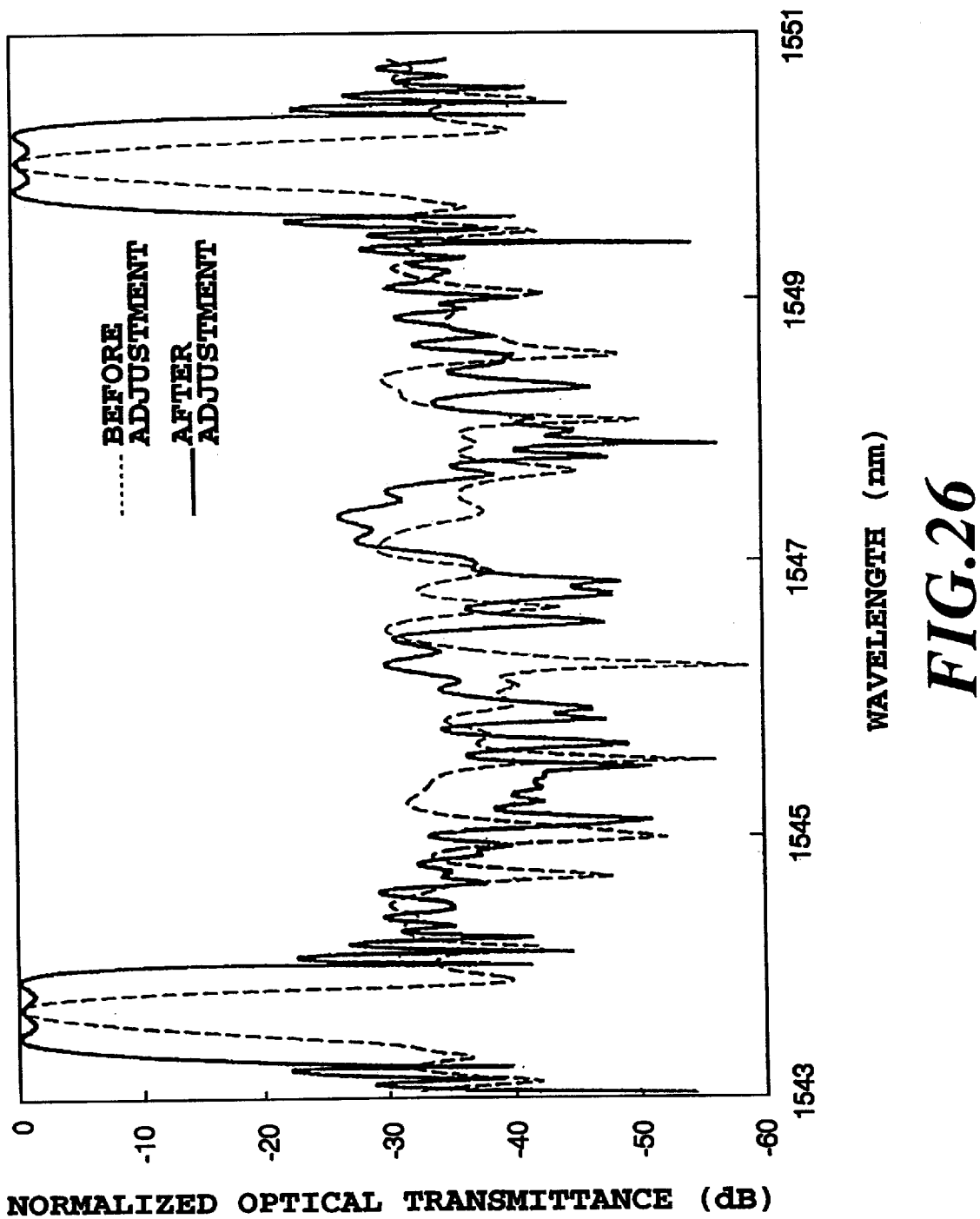
FIG. 26 is a view showing the wavelength-transmission characteristics of transmitted light before and after insertion of the amplitude adjusting plate and phase adjusting plate in the arrayed-waveguide grating multi/demultiplexer as the fifth embodiment.

FIGS. 24, 25 and 26 show the amplitude, phase and optical wavelength-transmission characteristics, respectively, before and after adjustment. As shown in these drawings, the amplitude and phase characteristics could be adjusted, and a distribution similar to a sinc function could be achieved. Thus, the passband was flattened, and the 3 dB band width was broadened by about 280%.

At this time, the excess loss due to insertion of the amplitude adjusting plates, including formation of the groove, was 3.5 dB.

Embodiment 6

Figure 27:
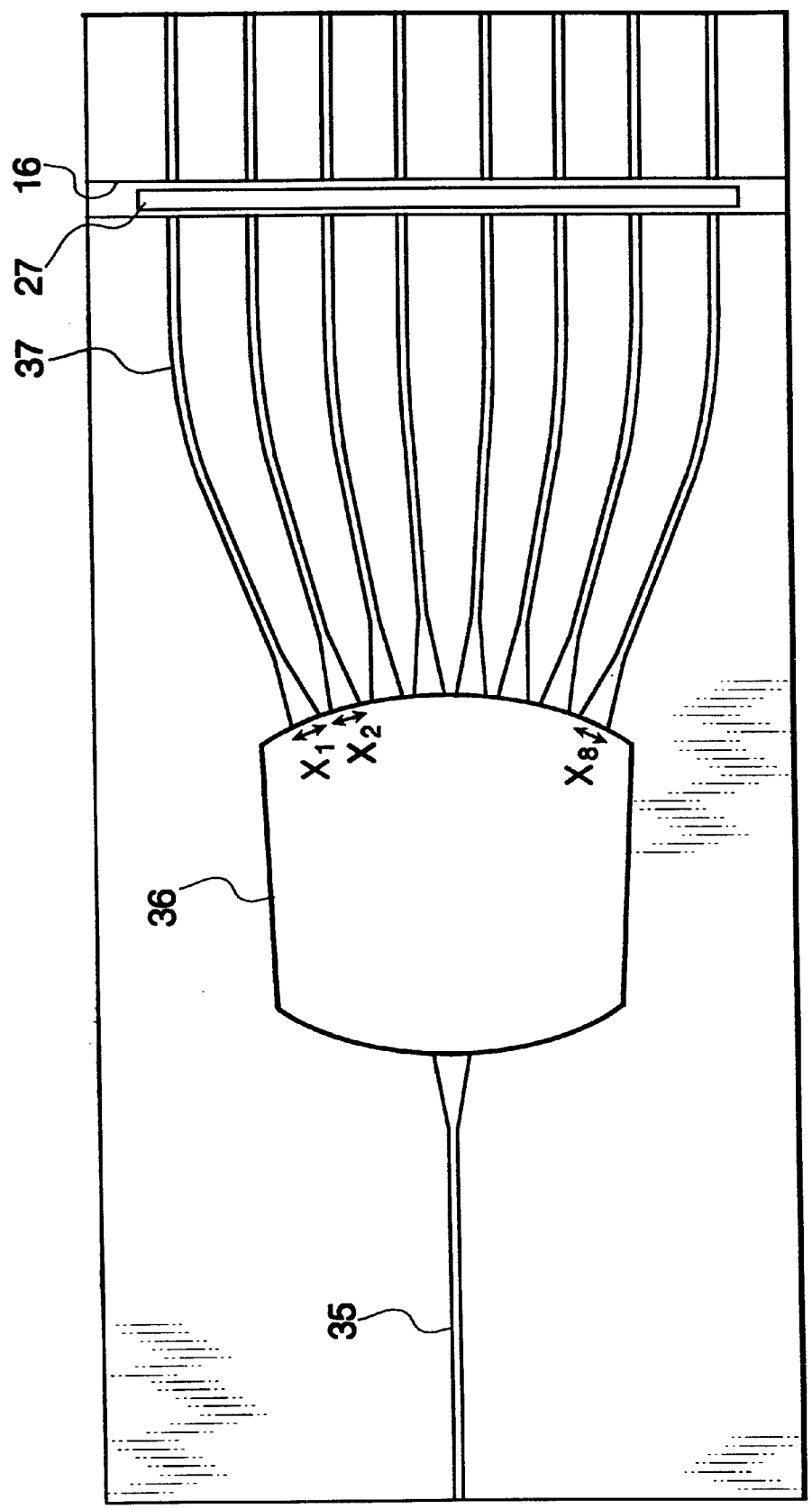
FIG. 27 is a plan view of a 1×8 splitter with an amplitude adjusting plate as a sixth embodiment of the present invention.

FIG. 27 shows a 1×8 splitter with an amplitude adjusting plate as a sixth embodiment of the present invention.

Figure 28:
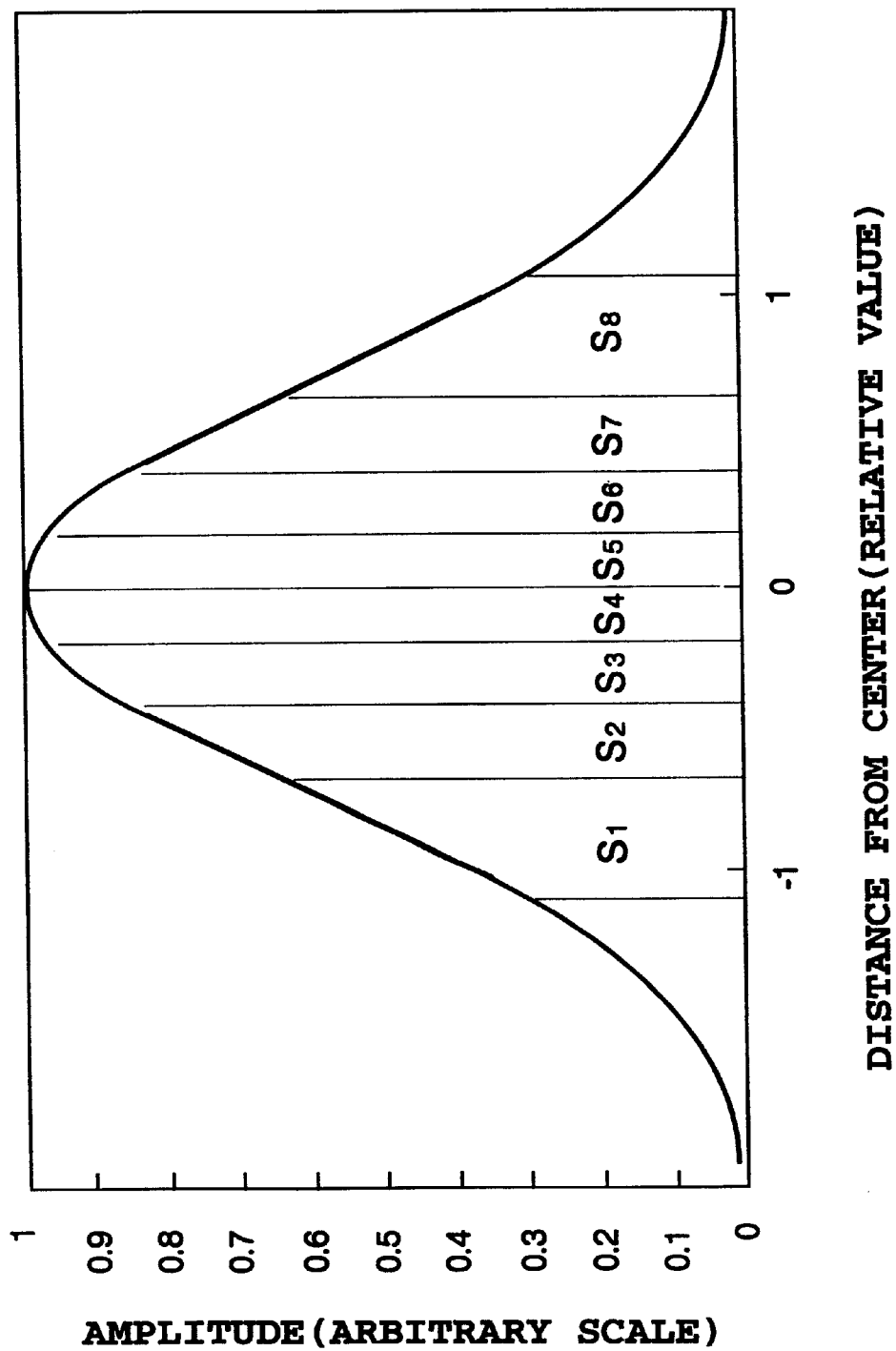
FIG. 28 is a graph showing the distribution of powers at the slab waveguide output portion calculated according to a simulation in the sixth embodiment.

In FIG. 27, the numeral 35 represents an input waveguide, 36 denotes a slab waveguide, 37 represent output waveguides, 16 is a groove, and 27 is an amplitude adjusting plate. The input waveguide was designed as a single mode waveguide having an intensity distribution which could be approximated in a Gaussian form. Input light spread at the slab waveguide and was integrated into the output waveguides. The distribution of the optical powers at the slab waveguide output portions was the Fourier transform of the distribution at the slab waveguide input portion. Since the distribution at the slab waveguide input portion was of nearly the Gaussian type, the distribution at the output portions could also be approximated in nearly a Gaussian form. Generally, a 1×N splitter is designed such that the opening widths of the output waveguides are decreased as the output waveguides become apart from the input waveguides, so that the optical powers guided to the N number of output waveguides will be equal. Actually, the distribution of optical powers at the slab waveguide output portions was calculated according to a simulation as shown in FIG. 28. Based on the results, the opening width $x_i$ was determined so that the optical powers integrated to the respective output waveguides would be equal, that is, the areas Si's (the character, i, means the No. of the output port) formed by dividing the area under the curve with vertical lines in FIG. 28 would be the same.

Generally, a 1×N splitter actually prepared gives variations in output light power among the ports, because the distribution of optical powers at the input waveguide is not completely of the Gaussian type, or because there are variations in loss at the junctions between the slab waveguide and the output waveguides.

According to the instant embodiment, variations in output optical power among ports in the 1×8 splitter composed of silica-based optical waveguides were reduced by use of the amplitude adjusting plate.

Figure 29:
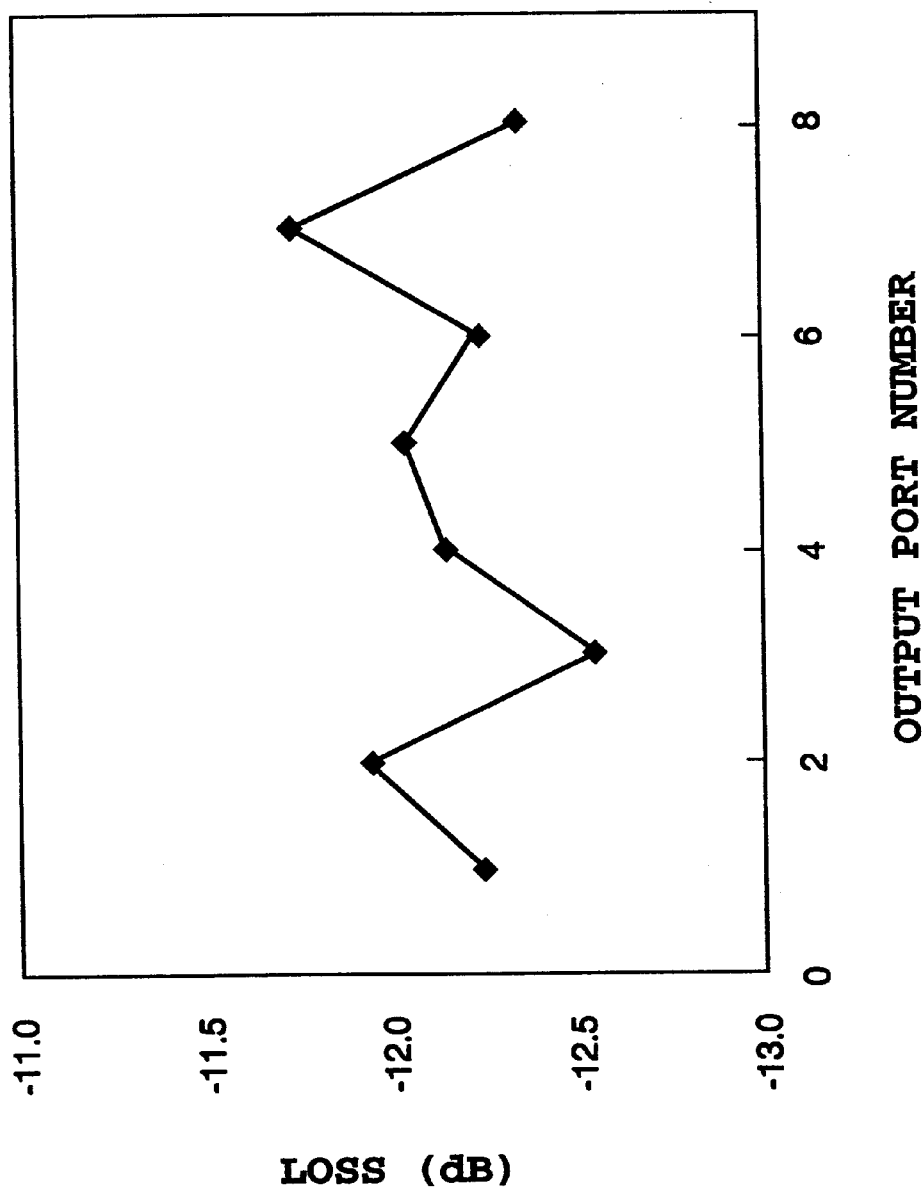
FIG. 29 is a graph showing the output port dependency of output optical powers measured in the sixth embodiment.
Figure 30:
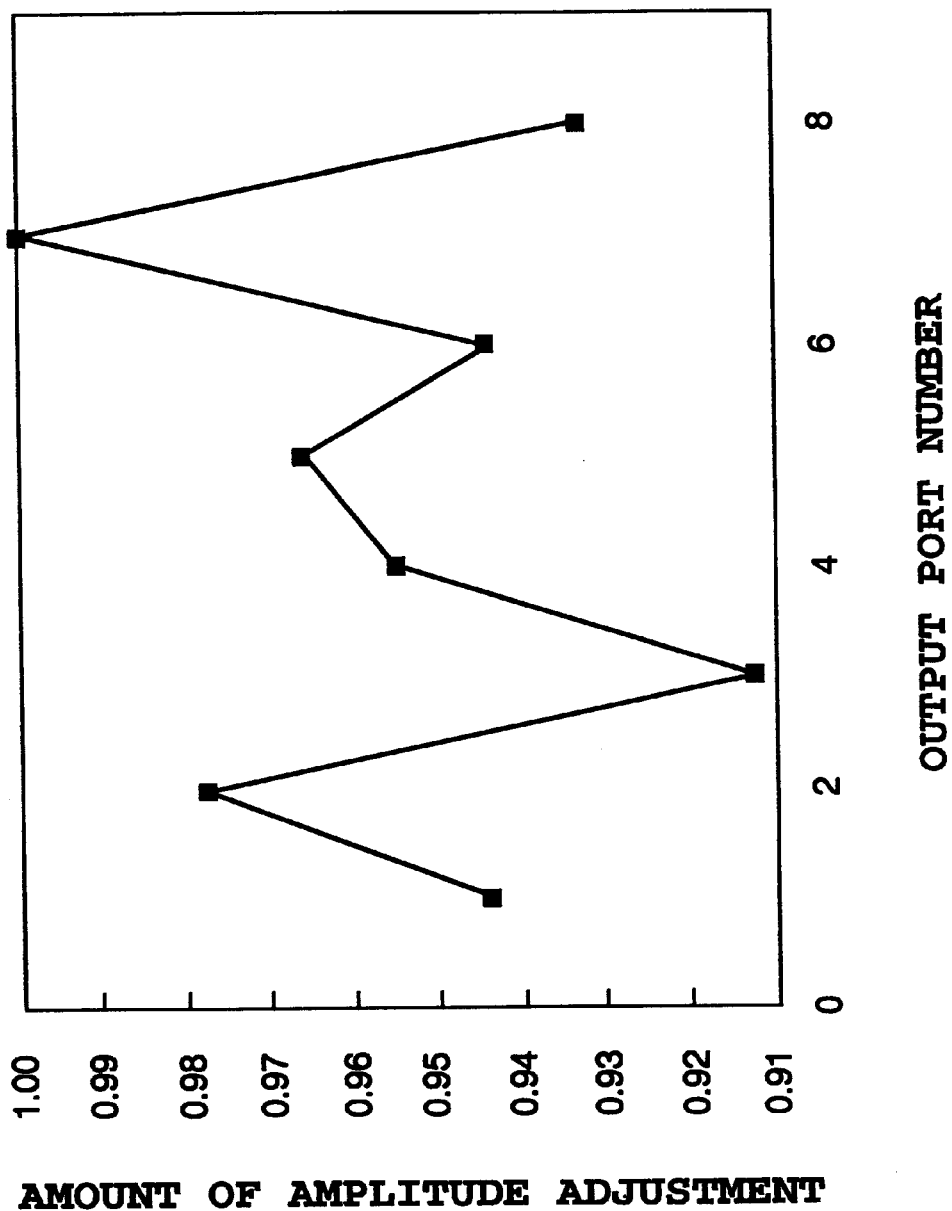
FIG. 30 is a graph showing the output port dependency of the amounts of amplitude adjustment determined in the sixth embodiment.

The 1×8 splitter according to the instant embodiment was prepared by the following procedure:

(i) The optical powers produced by the eight output waveguides of the 1×8 splitter were measured. FIG. 29 shows the output port dependency of the output optical power measured. The losses were distributed between 11.8 and 12.6 dB. The amounts of amplitude adjustment for decreasing these variations were determined in the following manner: The difference between the maximum loss 12.6 dB and the loss at each output port was calculated. The square root of the calculated value was designated as the amount of amplitude adjustment, $A_i$ (i denotes the number of the output port). FIG. 30 shows the output port dependency of the amount of amplitude adjustment determined. Since the maximum difference in loss was 0.8 dB corresponding to 0.83, the maximum amount of amplitude adjustment was the square root of 0.83=0.91.

(ii) The absorption coefficient α of the material for the amplitude adjusting plate was determined to be 0.021 (1/μm) so that an amplitude adjustment of 0.9 (<maximum amount of amplitude adjustment 0.91) could be obtained for a film thickness of 10 microns. As shown in FIG. 30, the amplitude adjusting plate in the instant embodiment had an absorption film formed on a transparent film, and changed absorption by relying on cuts (or the uncut portions) in the absorption film. The transparent film was used to minimize the amounts of the uncut portions in the absorption film and decrease excess loss, while retaining the strength and operability of the amplitude adjusting plate sufficiently. The film thicknesses of the absorption film and the transparent film were set at 10 μm and 8 μm, respectively. The amount of cut in the absorption film was determined so that the amount of the uncut portion, $W_i$, would satisfy the following equation:

$$A_i^2 = \exp(-\alpha W_i) \tag{1}$$

Figure 31:
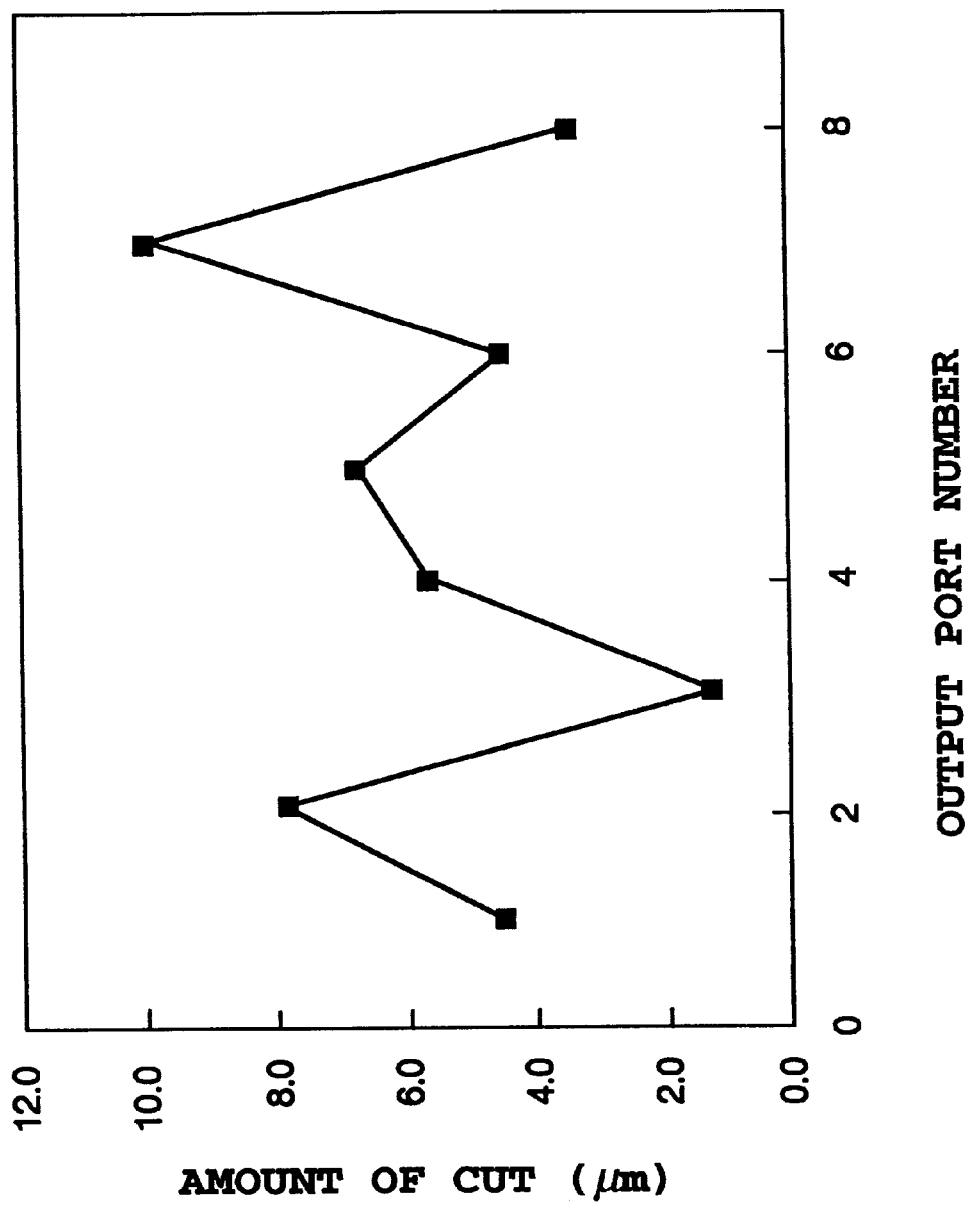
FIG. 31 is a graph showing the distribution of the amounts of cuts in the amplitude adjusting plate determined in the sixth embodiment.

FIG. 31 shows the distribution of the determined amounts of cuts in the amplitude adjusting plate. The maximum amount of cut was 10 μm, a value giving the minimum amount of adjustment.

Figure 32:
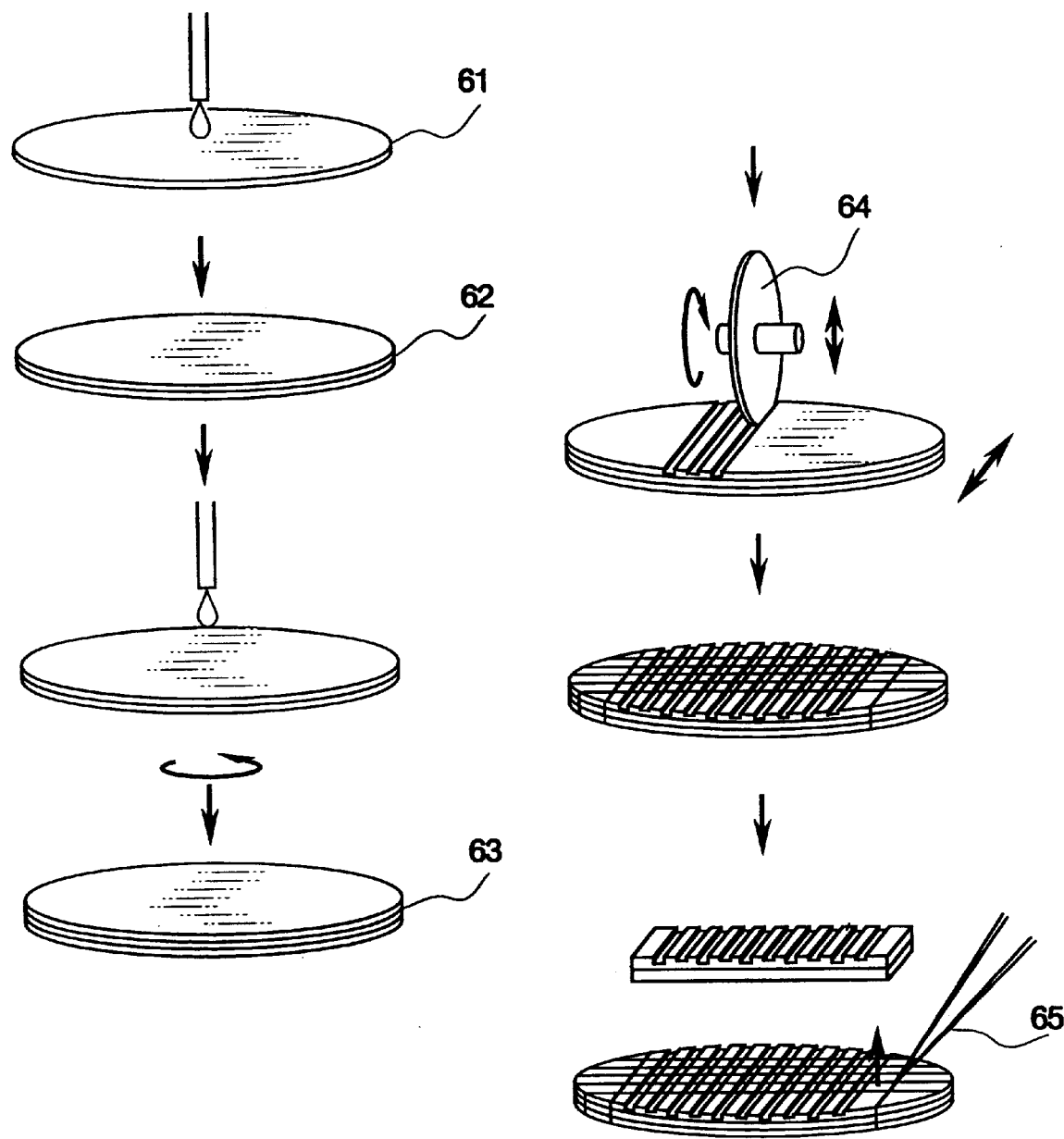
FIG. 32 is a view showing a step of preparing the amplitude adjusting plate in the sixth embodiment.

(iii) FIG. 32 shows a step of preparing the amplitude adjusting plate in actual use. A transparent film 62 with a film thickness of 8 μm was formed on an Si substrate 61 by spin coating. After drying, an absorption film 63 with an absorption coefficient of α=0.021 (1/μm) and a film thickness of 10 μm was formed on the transparent film by spin coating. Then, cuts in the amounts determined by the above-described method were produced by means of a dicing saw 64. Since the distance between adjacent output waveguides of the 1×8 splitter was 250 μm, the width of the blade of the dicing saw was set at 100 μm. After cut production, the composite film was cut into a rectangular strip on the Si substrate, and stripped with a forceps 65 for use as an amplitude adjusting plate 27.

(iv) A 20 μm wide groove 13 crossing all the eight output waveguides of the 1×8 splitter was formed using a dicing saw. A manipulator with a forceps was used to insert the resulting amplitude adjusting plate into the groove, and align the positions so that the cut portions of the amplitude adjusting plate would intersect the output waveguides. A micropipet was used to fill an adhesive, having the same refractive index as that of the amplitude adjusting plate, into the gap between the amplitude adjusting plate 27 and the groove 16. Then, ultraviolet radiation was cast on the adhesive to fix the amplitude adjusting plate in the groove.

Figure 33:
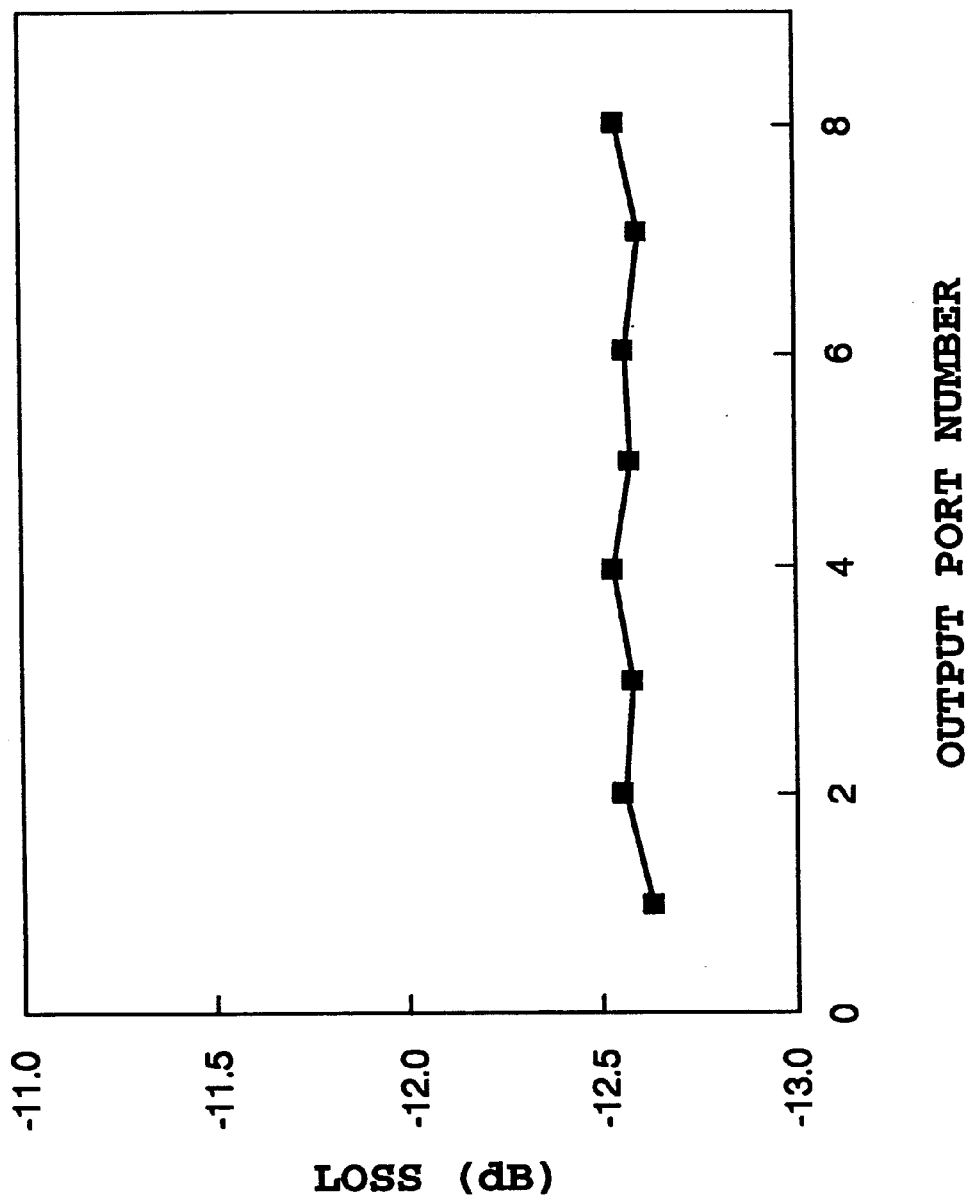
FIG. 33 is a graph showing the distribution of optical powers in the respective output ports of the splitter after adjustment by the amplitude adjusting plate in the sixth embodiment.

FIG. 33 shows the distribution of optical powers in the respective output ports after adjustment. The losses distributing over the range of from 11.8 to 12.6 dB were narrowed to a range of 12.8 to 12.9 dB, so that their variations were decreased. An excess loss of 0.3 dB on the average was mainly ascribed to the diffraction loss in the 20 μm wide groove crossing the waveguides. These results are shown with regard to the TE mode, but adjustments were as successful for the TM mode as the TE mode.

Embodiment 7

Figure 34:
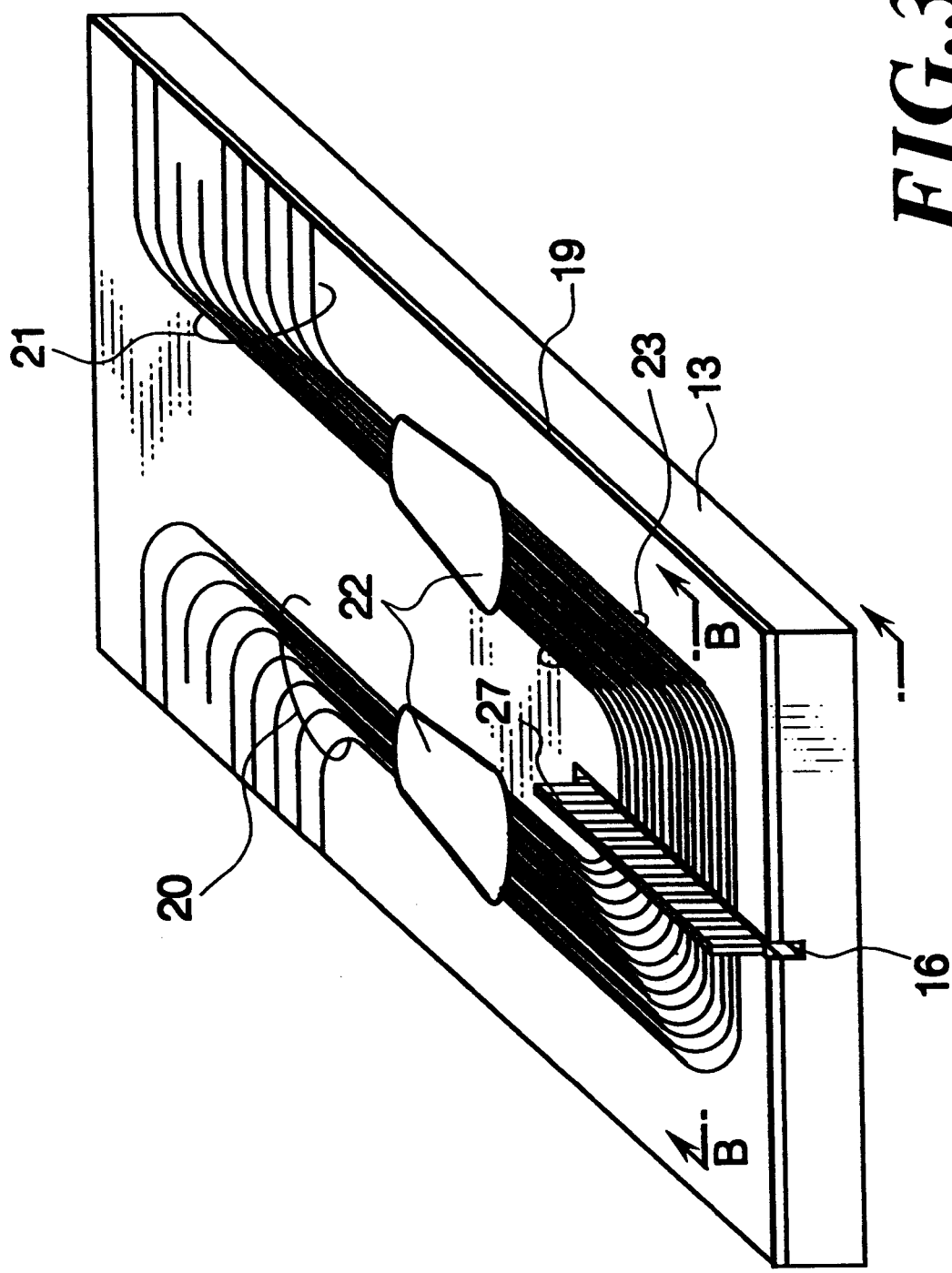
FIG. 34 is a perspective view of an arrayed-waveguide grating wavelength division multi/demultiplexer with a phase adjusting plate as a seventh embodiment of the present invention.

FIG. 34 shows an arrayed-waveguide grating wavelength division multi/demultiplexer with a phase adjusting plate as a seventh embodiment of the present invention.

Figure 35:
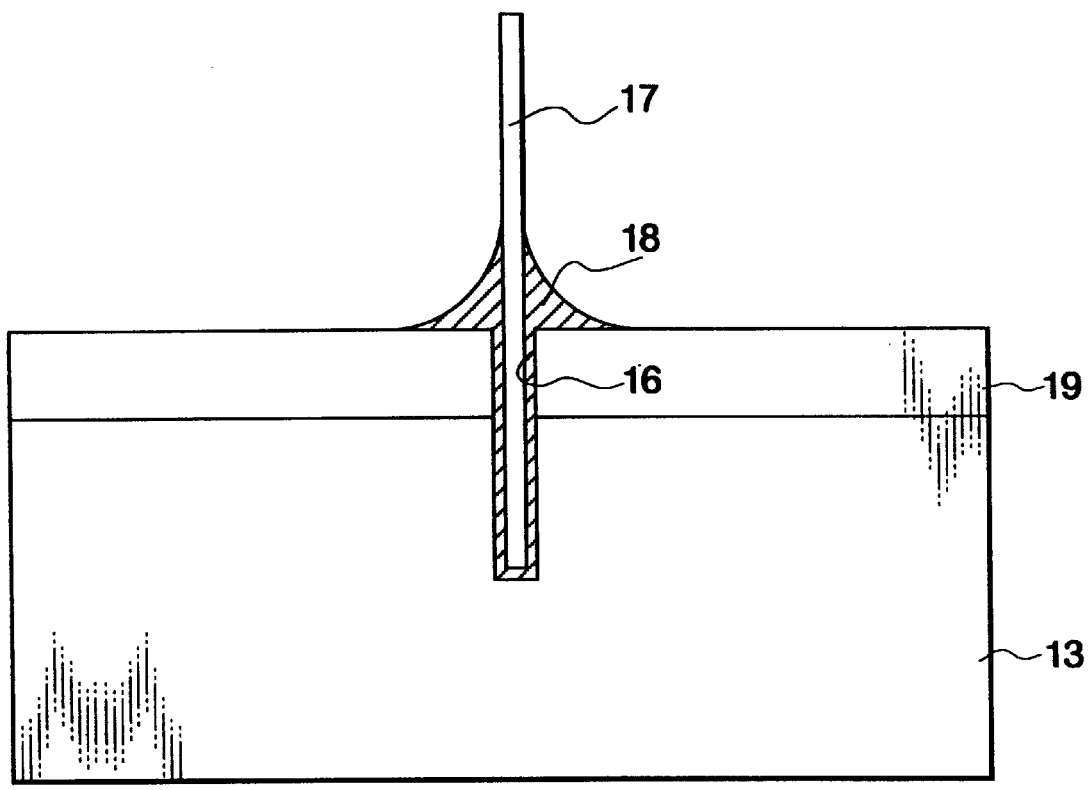
FIG. 35 is an enlarged sectional view taken along line B—B of FIG. 34.
Figure 36:
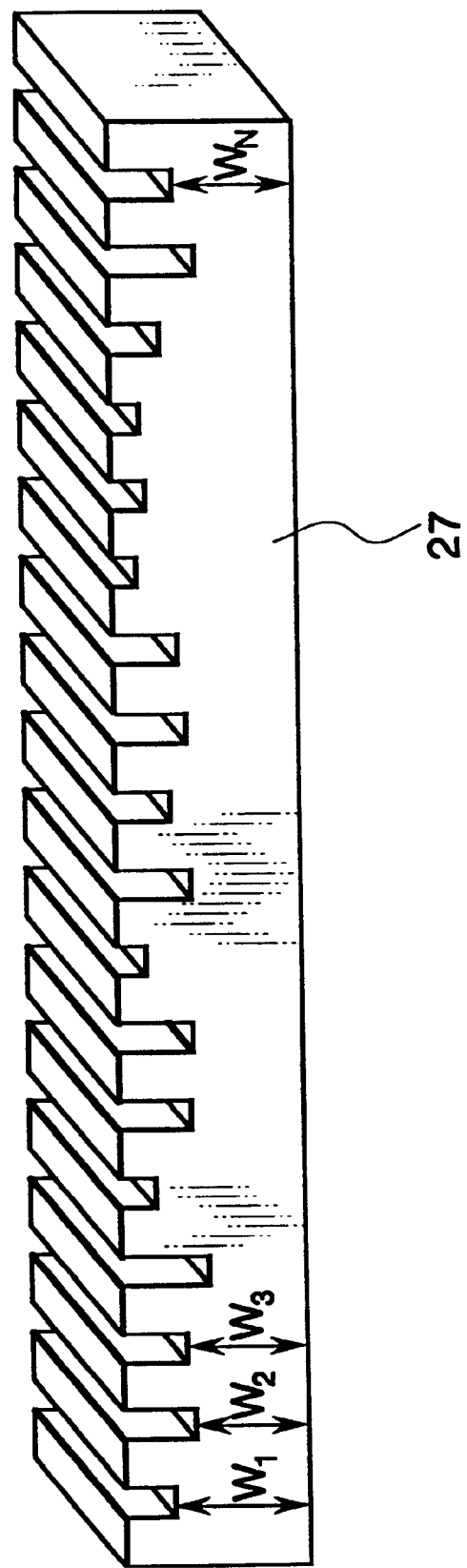
FIG. 36 is a perspective view of the phase adjusting plate used in the seventh embodiment.

In FIG. 34, the numeral 20 represents input waveguides, 21 denotes output waveguides, 22 represents slab waveguides, 23 represents arrayed waveguides, 19 is a cladding layer, 13 is a silicon substrate, 16 is a groove, and 17 is a phase adjusting plate. FIG. 35 is an enlarged sectional view taken along line B—B of FIG. 34. FIG. 36 is an enlarged view of the phase adjusting plate used in FIG. 34.

The arrayed-waveguide grating wavelength division multi/demultiplexer of this embodiment was constructed by inserting the phase adjusting plate 17 in the constant-width groove 16 formed to cross all the arrayed waveguides.

An adhesive 18 was filled into the gap between the phase adjusting plate 17 and the inner wall of the groove 16, whereby the optical circuit and the phase adjusting plate were fixed together.

In the instant embodiment, the phase adjusting plate 17 was used to decrease deviations of the order of wavelength in the optical path lengths, i.e., phase errors, of the arrayed waveguides in the arrayed-waveguide grating wavelength division multi/demultiplexer produced from silica-based optical waveguides. The resulting arrayed-waveguide grating had eight input ports, eight output ports, thirty arrayed waveguides, and a channel wavelength spacing of 0.8 nm.

Figure 37:
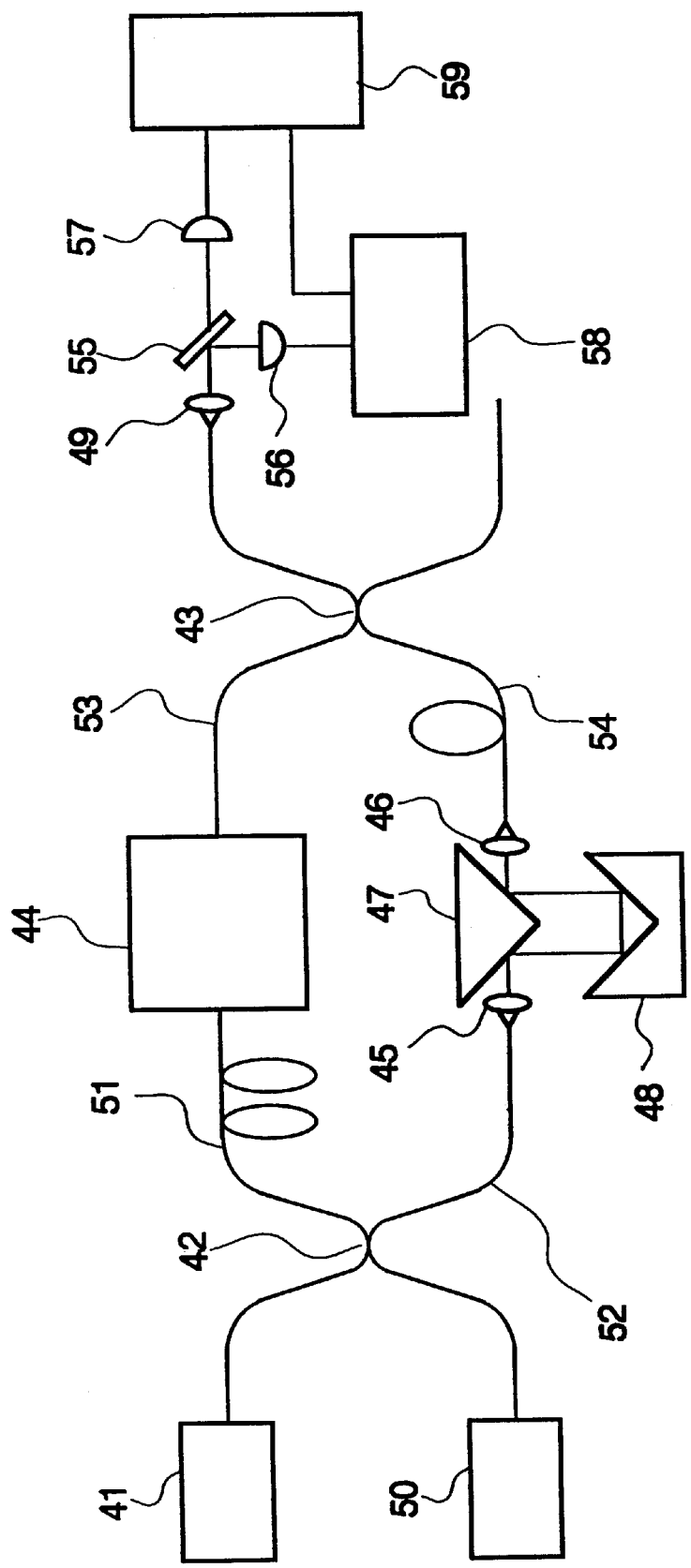
FIG. 37 is a configurational view of a measuring system for measuring the phases and amplitudes of light passing through the arrayed waveguides of the wavelength division multi/demultiplexer of the seventh embodiment.

The wavelength division multi/demultiplexer according to the instant embodiment was prepared by the following procedure:

(i) Measure the phase and amplitude characteristics of light passing through each arrayed waveguide constituting the arrayed waveguide grating. A known optical circuit analytic method using low coherence light was applied to this measurement (see, for example, Japanese Patent Application No. 5989/94). FIG. 37 shows a measuring system, in which the numeral 41 represents a light source, 42 and 43 denote optical fiber 3 dB couplers, 44 is an interferometer type optical circuit for measurement, 45, 46 and 49 are lenses, 47 is a prism, 48 is a reflector, 51 and 52 output ports of the coupler 42, 53 and 54 are input ports of the coupler 43, 50 is a narrow line-width laser, 55 is a diachronic mirror, 56 and 57 are optical detectors, 58 is a fringe counter, and 59 is a waveform recorder.

SLD light in the 1.55 μm band with a coherence length of 35 μm was used as the light source 41. A DFB laser in the 1.3 μm band was used as the narrow line-width laser 50. SLD light and DFB laser light were divided into two optical paths by the 3 dB coupler 42. Part of the light was guided to the optical circuit for measurement, while the remaining part of the light was guided to an optical path length variable portion comprising the reflector 48 mounted on an electrically actuated stage. These parts of light from the two optical paths were combined again by the 3 dB coupler 43. Light with wavelengths of 1.3 μm and 1.55 μm exiting from the interferometer was separated by the dichroic mirror 55, whereupon light of 1.3 μm was received by the optical detector 56, while light of 1.55 μm was received by the optical detector 57. When the optical path length in the interferometer varies by a half wave, a beat signal of light from the laser 50 varies by a half period. Utilizing this fact, the fringe counter 58 produced a clock pulse each time the optical path length changed by a half wave. Using this pulse as an external clock, the waveform recorder 59 sampled interference signals. According to this constitution, only when the difference in the optical path length between the path along the optical circuit and the path along the optical path length variable portion was smaller than the coherence length of the light source, two types of light interfere with each other, so that an interference signal is observed. The arrayed waveguides were designed such that their optical path lengths increased by (L in order. Thus, as the optical path length of the optical path length variable portion was increased, an interference signal was obtained in order, starting at the shortest arrayed waveguide.

Figure 38:
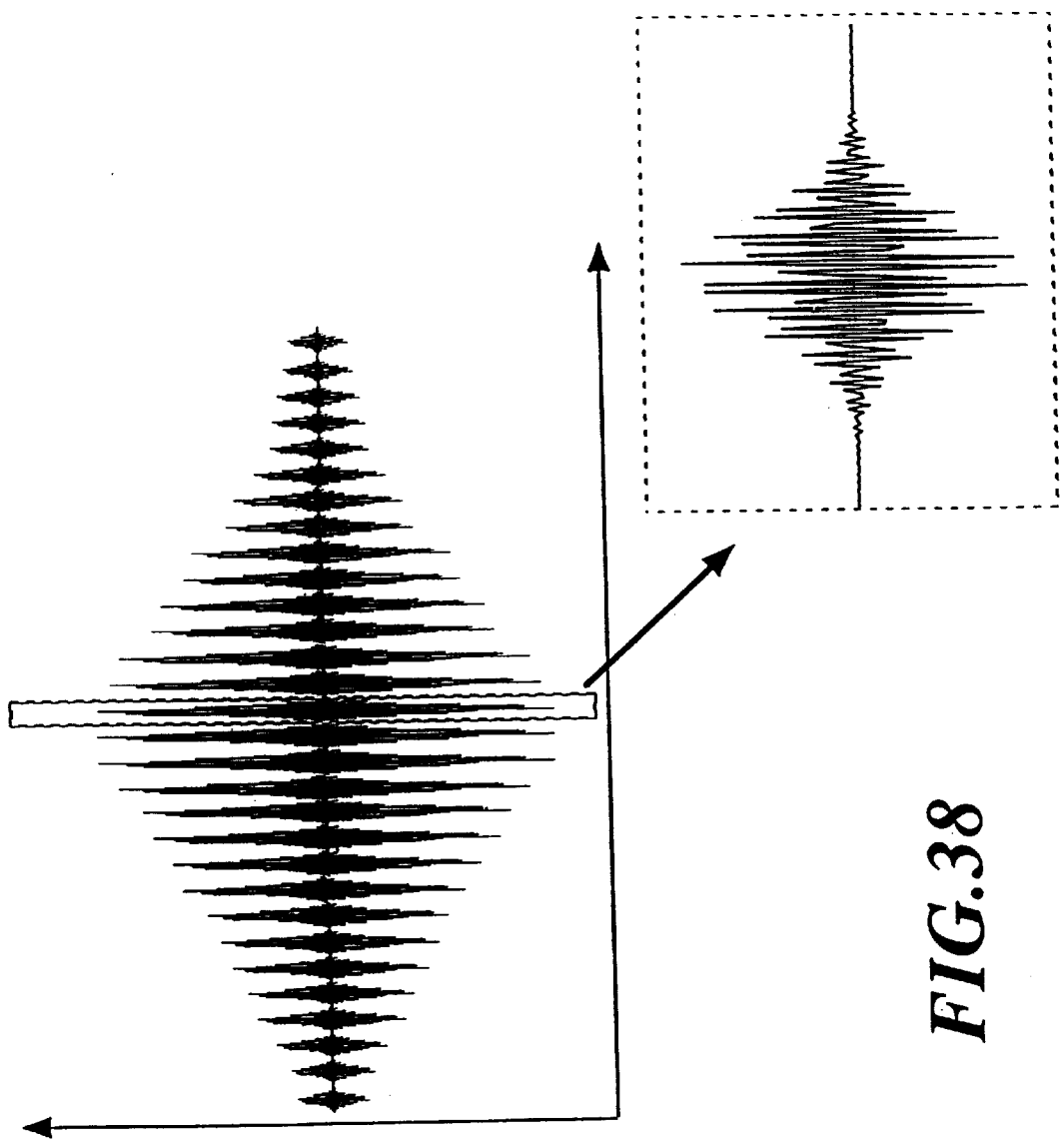
FIG. 38 is a graph showing an example of interference signals from the arrayed waveguides of the wavelength division multi/demultiplexer of the seventh embodiment that were observed by the measuring system of FIG. 37.
Figure 39:
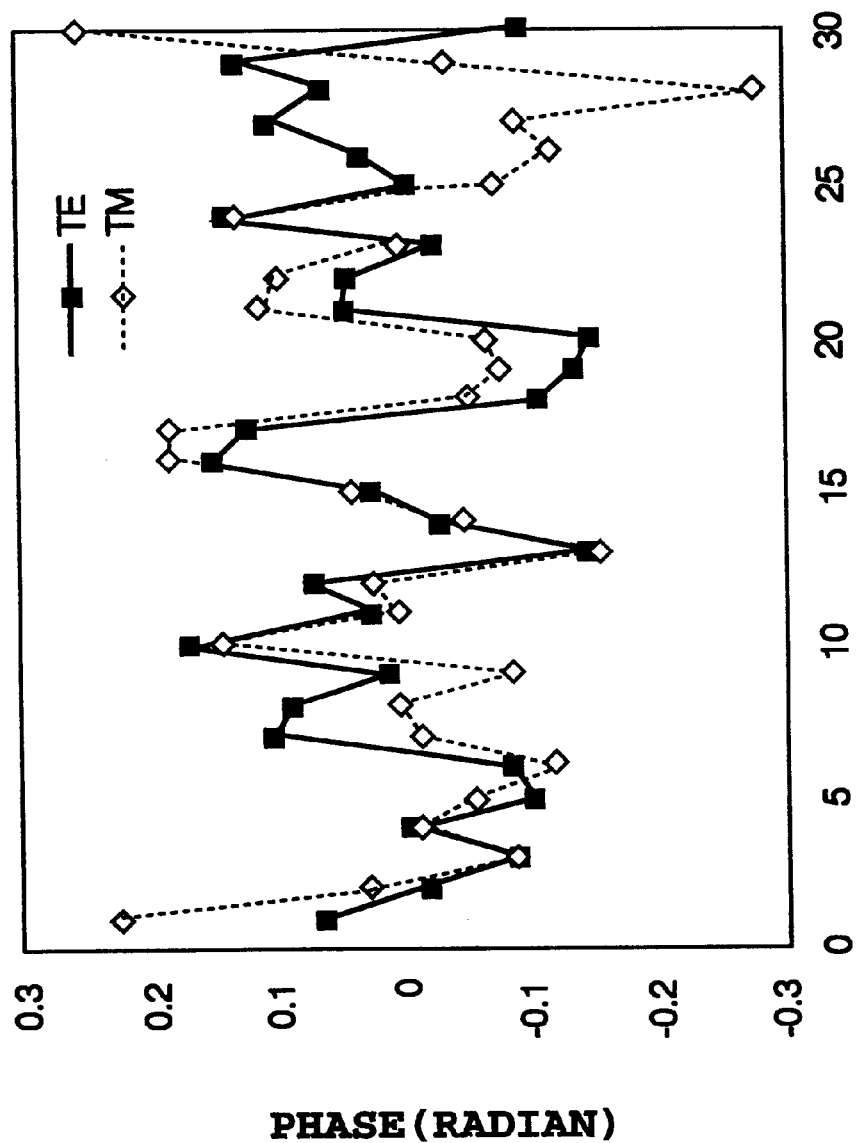
FIG. 39 is a graph showing the distribution of phases in the central transmitted wavelength at each arrayed waveguide of the wavelength division multi/demultiplexer in the seventh embodiment.
Figure 40:
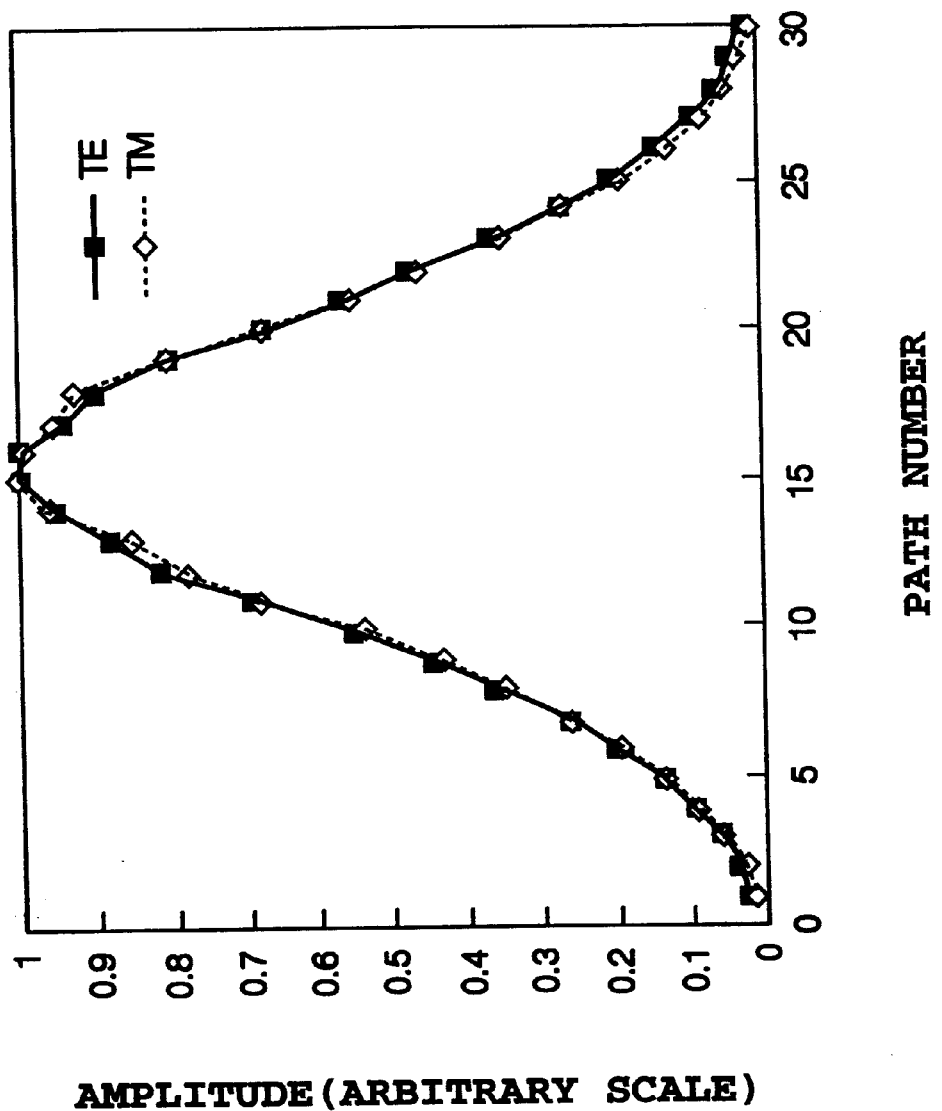
FIG. 40 is a graph showing the distribution of amplitudes in the central transmitted wavelength at each arrayed waveguide of the wavelength division multi/demultiplexer in the seventh embodiment.
Figure 41:
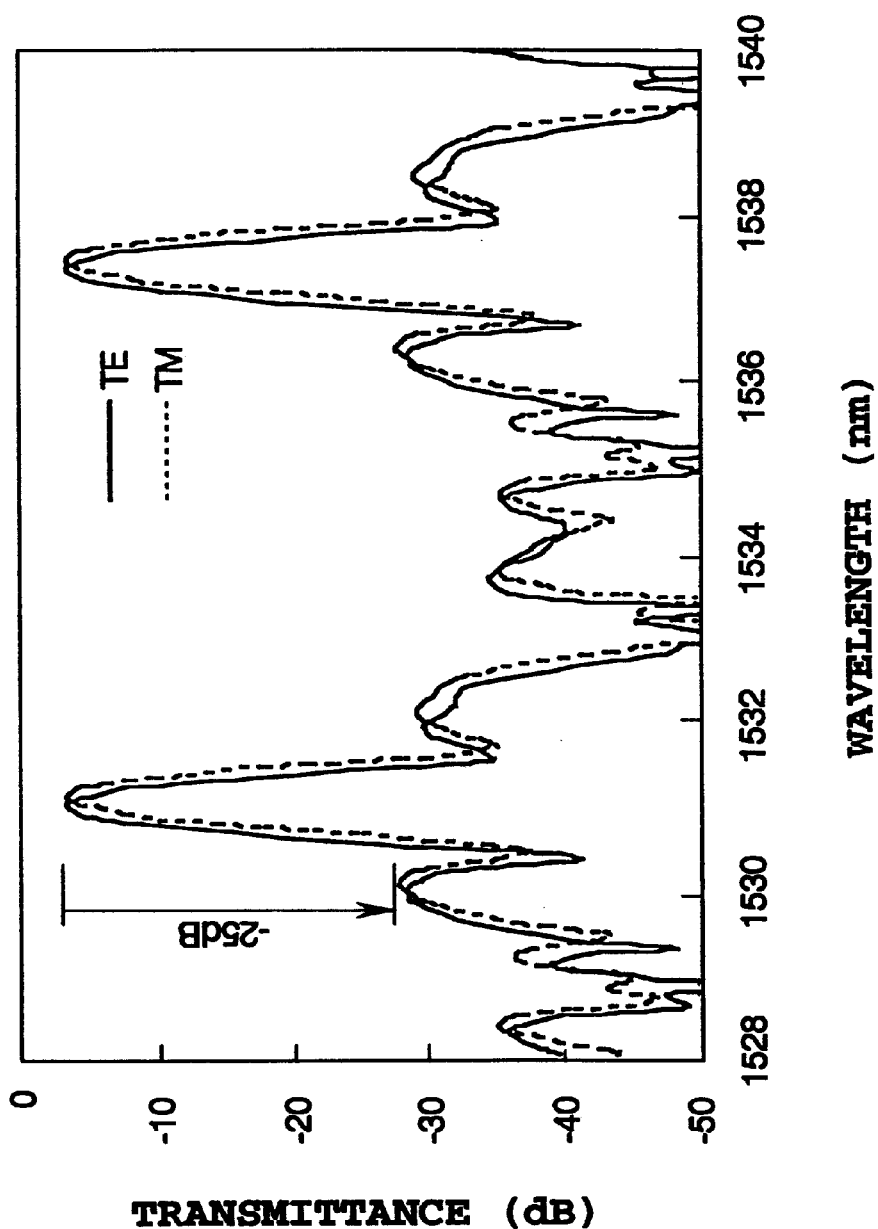
FIG. 41 is a graph showing the wavelength-transmission characteristics of transmitted light from the input port No. 8 to the output port No. 9 of the wavelength division multi/demultiplexer in the seventh embodiment.

FIG. 38 shows an example of interference signals observed. Since the coherence length of the light source is sufficiently smaller than (L=254 μm, an interference signal can be separated into fringes as indicated by wavy lines in FIG. 38. Each fringe represents the transfer function of light that has passed through each arrayed waveguide. Thus, mathematical processing such as a discrete Fourier transform enables the fringe to give information on the phase and amplitude of light. The same processing of all fringes provides the distributions of the phases and amplitudes for all the arrayed waveguides. FIGS. 39 and 40 show the distributions of phases and amplitudes of the central transmitted wavelength in each arrayed waveguide. FIG. 41 shows the wavelength-transmission characteristics of transmitted light from the input port No. 8 to the output port No. 9. The crosstalk was 25 dB at the maximum, and a major cause of this was phase errors distributed between −0.3 and 0.25 radian.

(ii) The amount of phase adjustment for decreasing a phase error was determined as follows:

First, a phase adjusting plate 27 according to the instant embodiment was designed as having cuts, adapted to the amounts of phase adjustment, in a film with a constant film thickness (FIG. 36). Furthermore, the refractive index of the adhesive 28 was made smaller than that of the phase adjusting plate, and the amount of phase adjustment was given a negative value.

Figure 42:
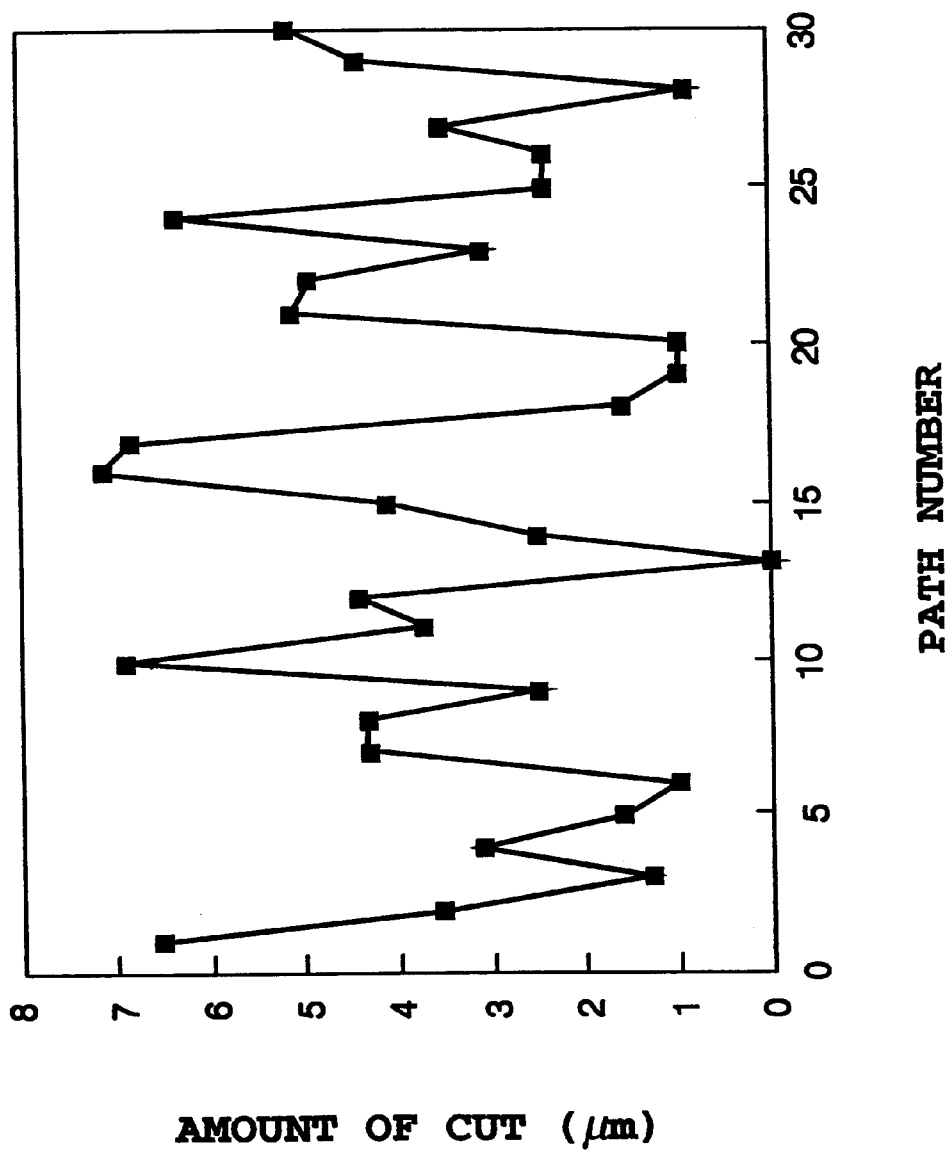
FIG. 42 is a graph showing the distribution of the amounts of cuts in the phase adjusting plate that were determined in the seventh embodiment.

As shown in FIG. 39, the phase error slightly differs between the TE mode and the TM mode. Thus, the amount of phase adjustment was calculated, provided that the phase error would be the average of the TE mode and the TM mode. The maximum value of the amount of phase adjustment corresponded to 0.32 radian. In order for a cut measuring about 7 μm to be able to make an adjustment of 0.32 radian=0.08 μm, the difference between the refractive index of the phase adjusting plate and that of the adhesive was set at 0.011. Based on this refractive index difference, the amounts of cuts corresponding to the respective amounts of phase adjustment were determined. FIG. 42 shows the distribution of the determined amounts of cuts in the phase adjusting plate.

Figure 43:
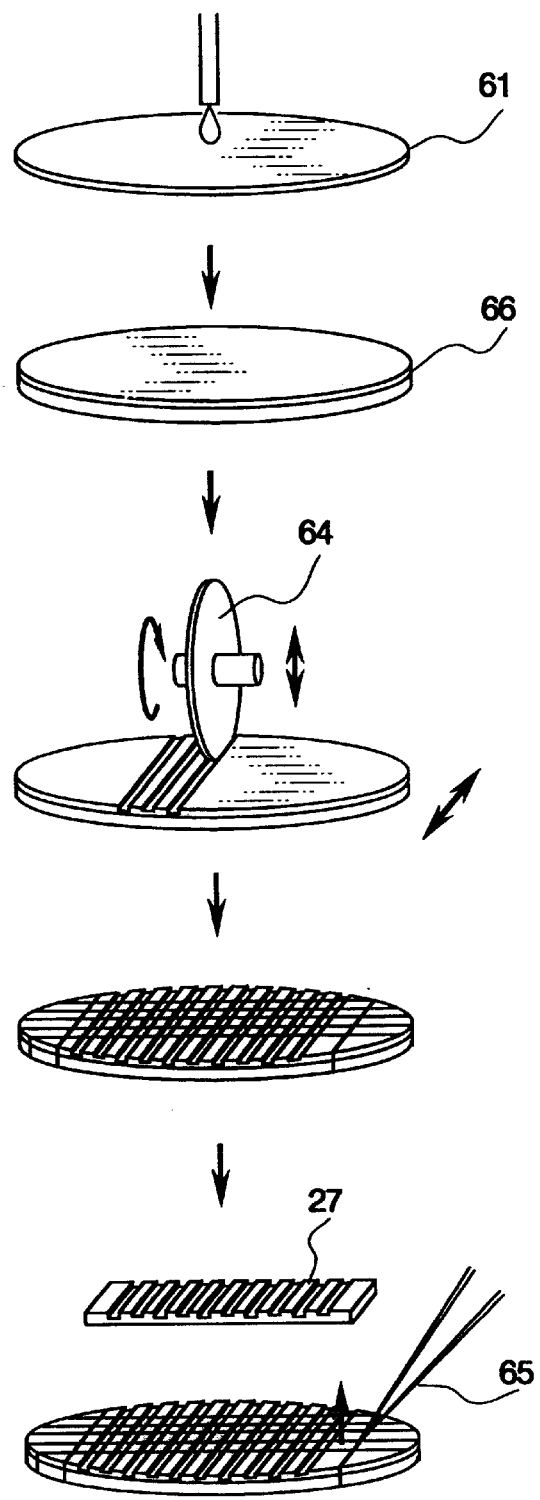
FIG. 43 is a view showing a step of preparing the phase adjusting plate in the seventh embodiment.

(iii) FIG. 43 shows a step of preparing a phase adjusting plate.

A film 66 with a film thickness of 15 μm was formed on an Si substrate 61 by spin coating. After drying, cuts in the amounts determined by the above-described method were produced by means of a dicing saw 64. Since the minimum distance between adjacent arrayed waveguides was 120 μm, the width of the blade of the dicing saw was set at 60 μm. After cut production, the film was cut into a rectangular strip on the Si substrate, and stripped with a forceps 65 to use it as a phase adjusting plate.

(iv) A 20 μm wide groove 16 crossing all the thirty output waveguides of the arrayed waveguide grating was formed using a dicing saw. A manipulator with a forceps was used to insert the prepared phase adjusting plate into the groove, and align the positions so that the cut portions of the phase adjusting plate would intersect the arrayed waveguides. A micropipet was used to fill an adhesive, having a refractive index 0.011 smaller than the refractive index of the phase adjusting plate, into the gap between the phase adjusting plate 17 and the groove 16. Then, ultraviolet radiation was cast on the adhesive to fix the phase adjusting plate in the groove.

Figure 44:
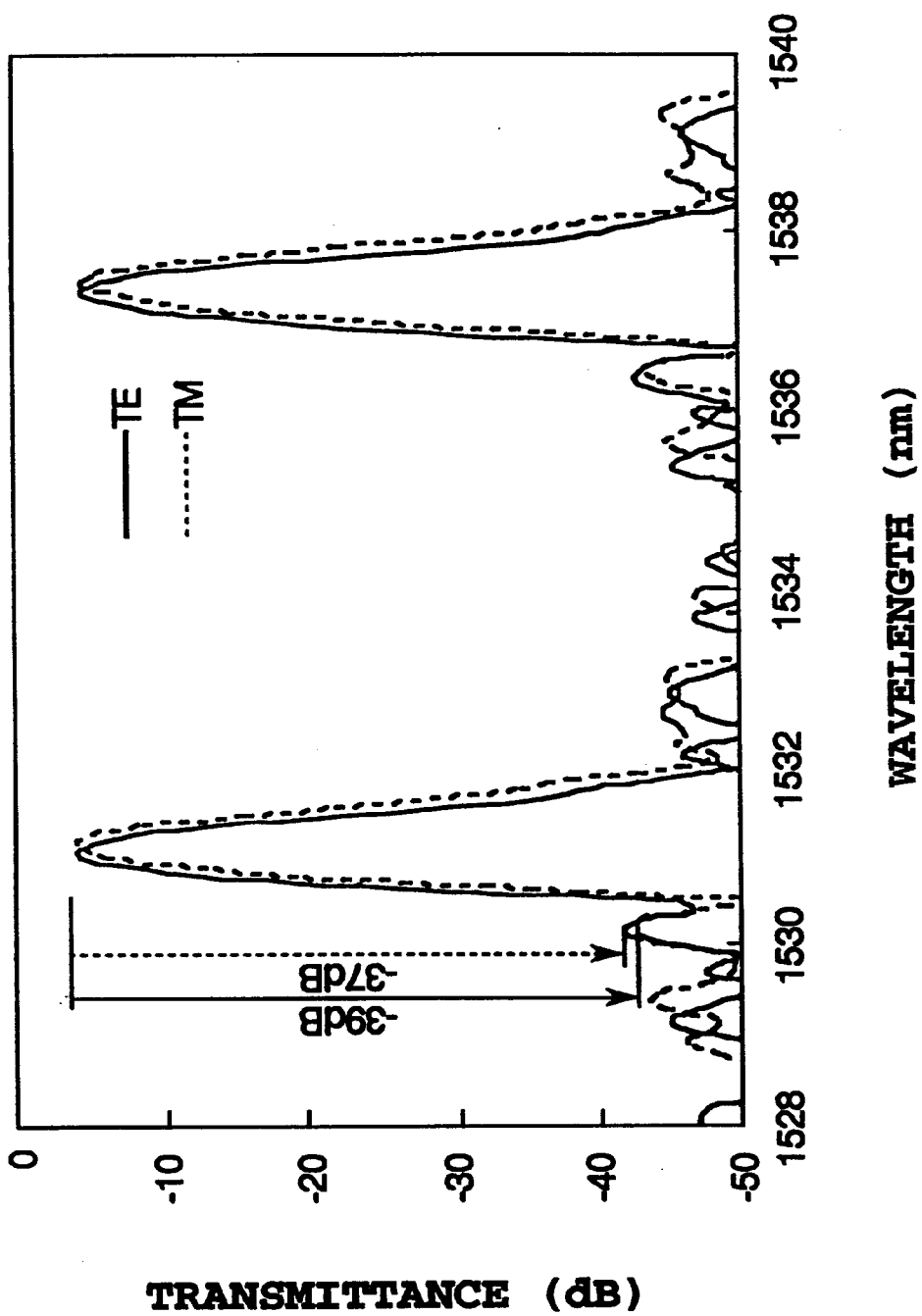
FIG. 44 is a graph showing the wavelength-transmission characteristics of transmitted light in the arrayed-waveguide grating multi/demultiplexer after insertion of the phase adjusting plate in the seventh embodiment.
Figure 45:
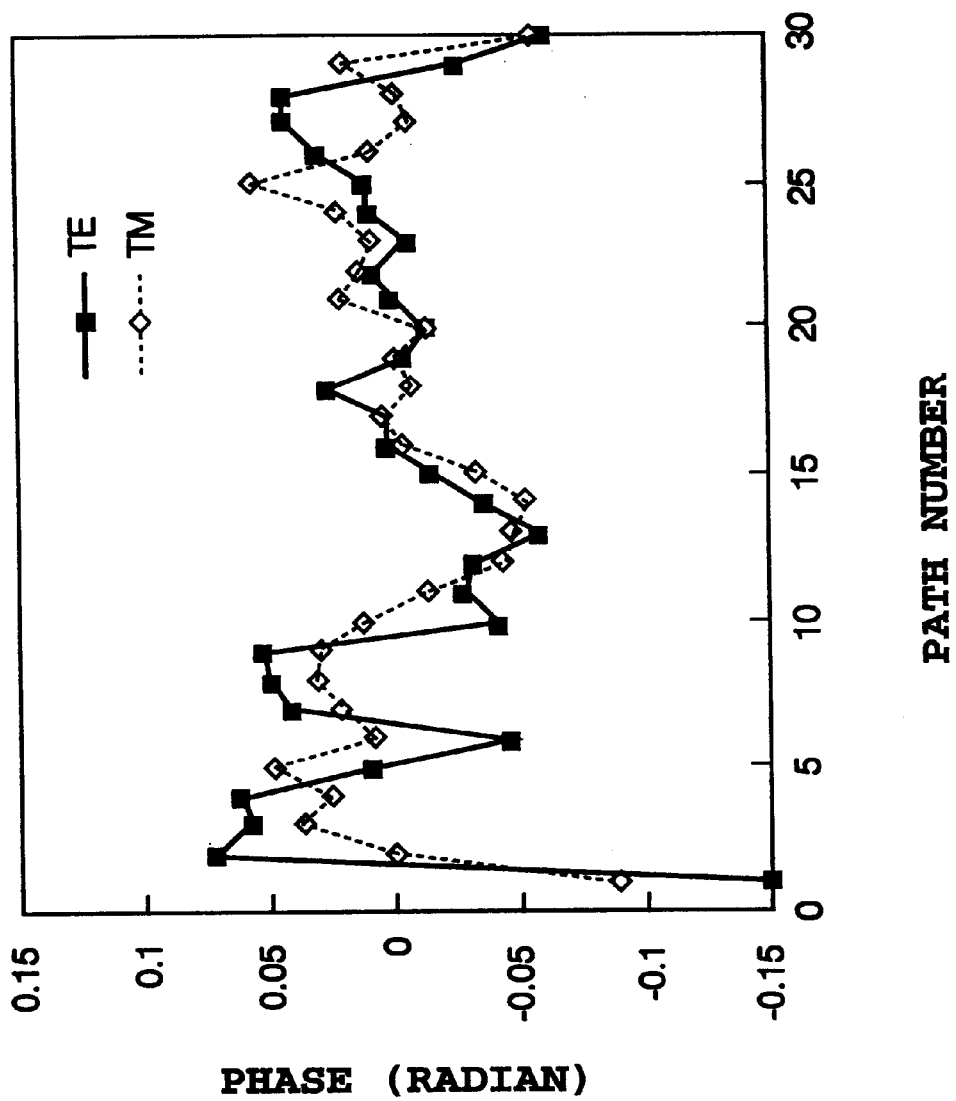
FIG. 45 is a graph showing the phase errors of the multi/demultiplexer after phase adjustment in the seventh embodiment.
Figure 46:
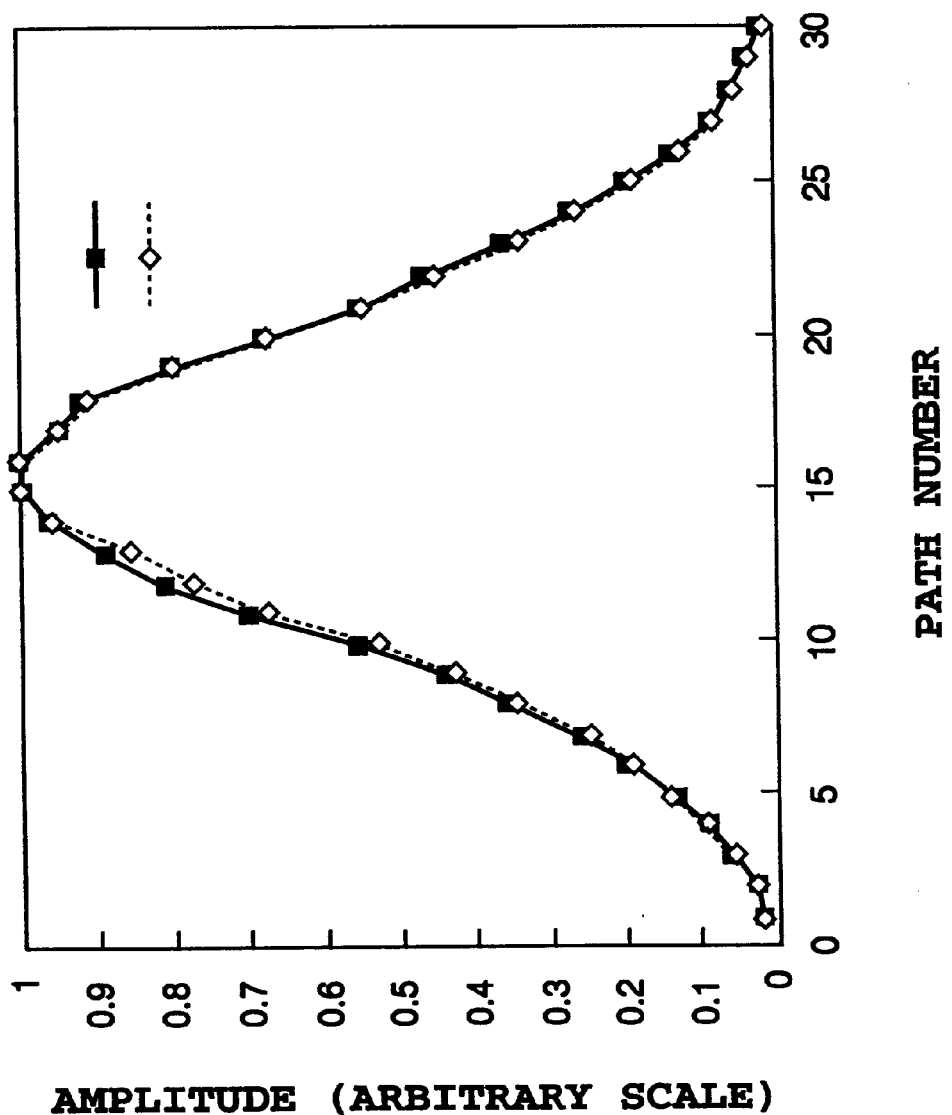
FIG. 46 is a graph showing the amplitude distribution of the multi/demultiplexer after phase adjustment in the seventh embodiment.

FIG. 44 shows the wavelength-transmission characteristics of transmitted light in the arrayed-waveguide grating multi/demultiplexer after insertion of the phase adjusting plate. FIGS. 45 and 46 are graphs showing phase errors and the distribution of amplitudes after phase adjustment, respectively. The phase errors of the arrayed waveguides were compensated for by the phase adjusting plate, and the crosstalk was reduced from −25 dB before adjustment to −37 dB for the TE mode, and to −39 dB for the TM mode. At this time, the excess loss due to groove formation and phase adjusting plate insertion was 1.0 dB. The standard deviation for the phase error as the average of the TE and TM modes was decreased from 0.088 to 0.036. The amplitude distribution was almost unchanged compared with that before insertion of the phase adjusting plate. Thus, one will see that the phase adjusting plate affected the amplitude minimally, and was able to adjust only the phase nearly independently.

Embodiment 8

Figure 47:
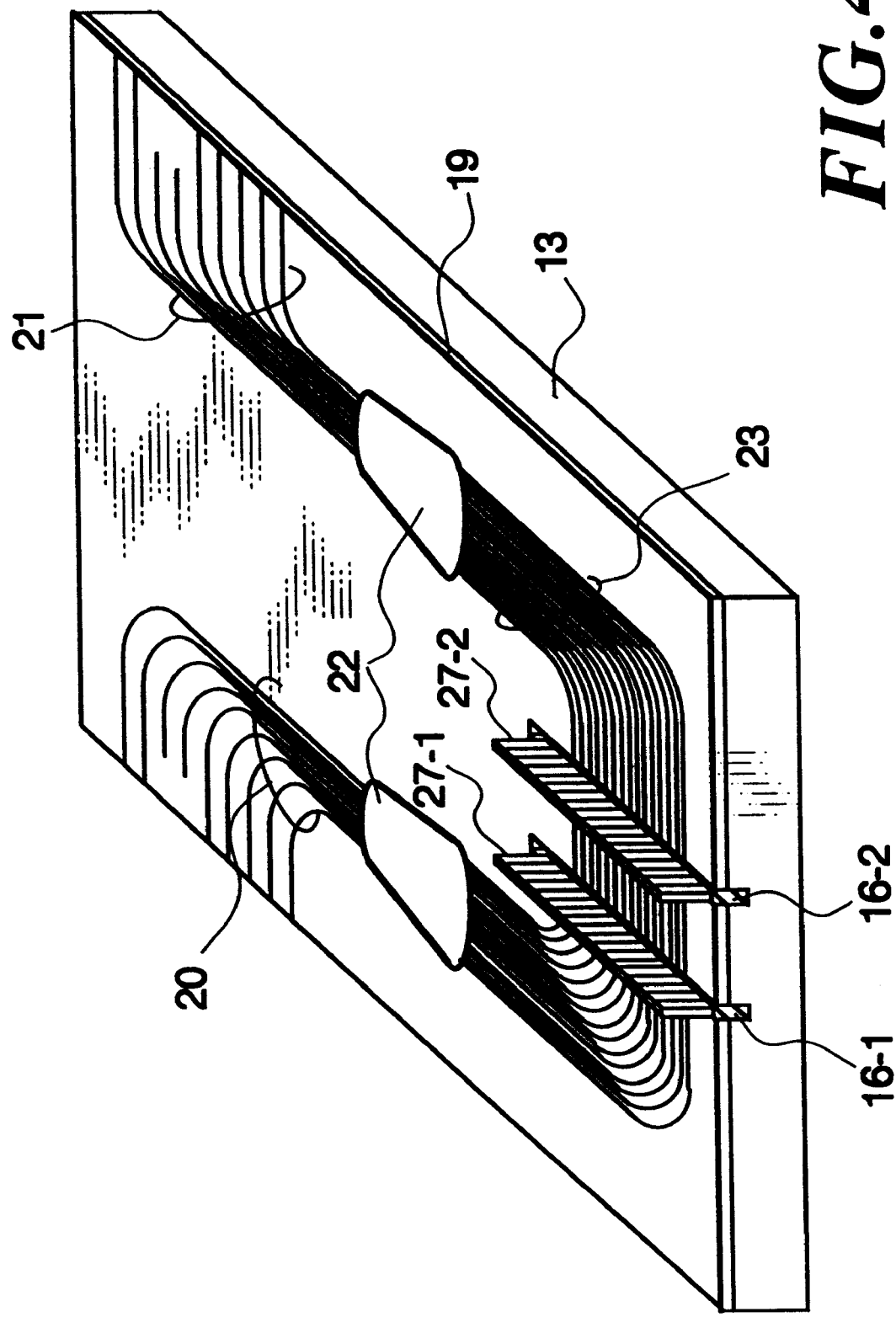
FIG. 47 is a perspective view of an arrayed-waveguide grating wavelength division multi/demultiplexer with a phase adjusting plate and an amplitude adjusting plate as an eighth embodiment of the present invention.

FIG. 47 shows an arrayed-waveguide grating wavelength division multi/demultiplexer with a phase adjusting plate and an amplitude adjusting plate as an eighth embodiment of the present invention. In FIG. 47, the numerals 16-1 and 16-2 represent grooves, and 27-1 and 27-2 are a phase adjusting plate and an amplitude adjusting plate, respectively.

The arrayed-waveguide optical wavelength multi/demultiplexer of this embodiment was constructed by inserting the phase adjusting plate 27-1 and the amplitude adjusting plate 27-2 in the constant-width grooves 16-1 and 16-2 crossing all the arrayed waveguides, and further filling an adhesive into the gap between each adjusting plate and the inner wall of each groove, to fix the respective adjusting plates in the grooves.

In the instant embodiment, the phase adjusting plate 27-1 and the amplitude adjusting plate 27-2 were used to decrease phase errors and amplitude errors, respectively, in the arrayed-waveguide grating wavelength division multi/demultiplexer produced from silica-based optical waveguides. The resulting arrayed-waveguide grating had 16 input/output ports, 64 arrayed waveguides, and a channel wavelength spacing of 0.8 nm.

Figure 48:
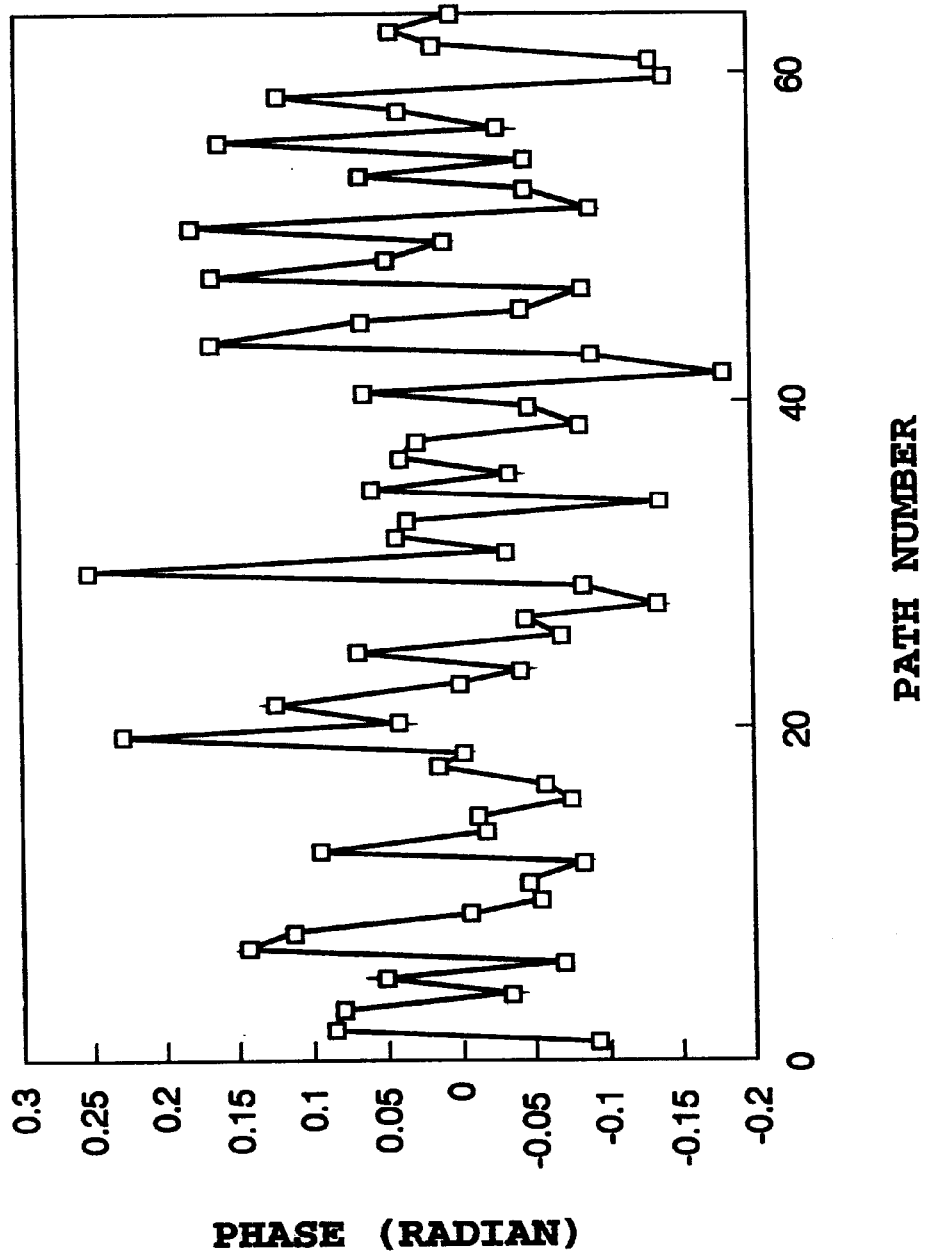
FIG. 48 is a graph showing the phase distribution in the TE mode measured with a low coherence interferometer after groove formation in the wavelength division multi/demultiplexer in the eighth embodiment.
Figure 49:
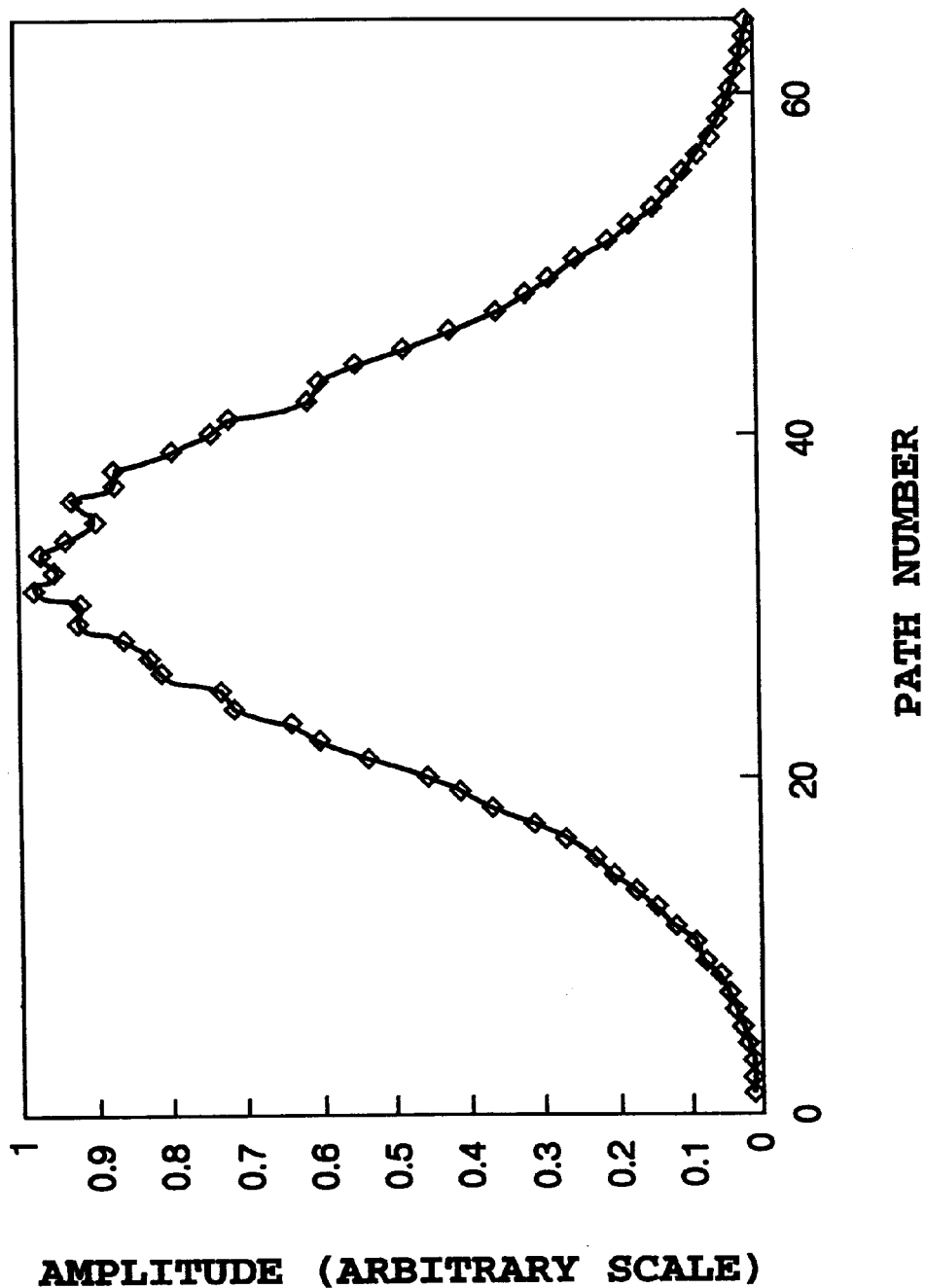
FIG. 49 is a graph showing the amplitude distribution in the TE mode measured with a low coherence interferometer after groove formation in the wavelength division multi/demultiplexer in the eighth embodiment.
Figure 50:
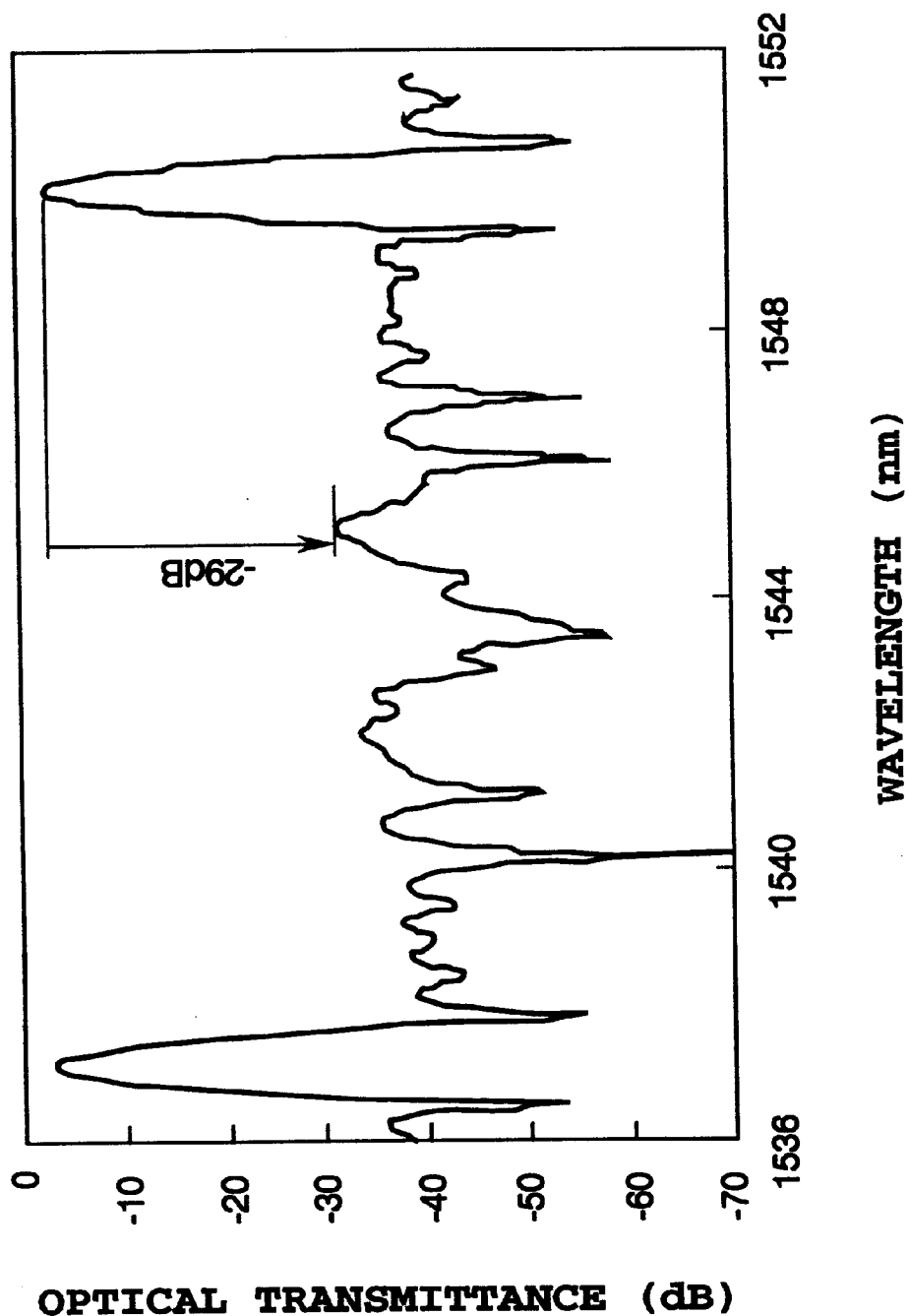
FIG. 50 is a graph showing the wavelength-transmission characteristics of transmitted light in the TE mode after groove formation in the wavelength division multi/demultiplexer in the eighth embodiment.

The wavelength division multi/demultiplexer according to the instant embodiment was prepared by the following procedure:

(i) Two grooves each 25 $\mu$m wide and 120 $\mu$m deep and crossing all the arrayed waveguides were formed by reactive ion etching. The distance between the two grooves was 100 $\mu$m. FIGS. 48 and 49 show, respectively, the distributions of phases and amplitudes in the TE mode that were measured with a low coherence interferometer after groove formation. FIG. 50 shows the wavelength-transmission characteristics of transmitted light in the TE mode. The crosstalk was −29 dB mainly ascribed to phase errors.

Figure 51:
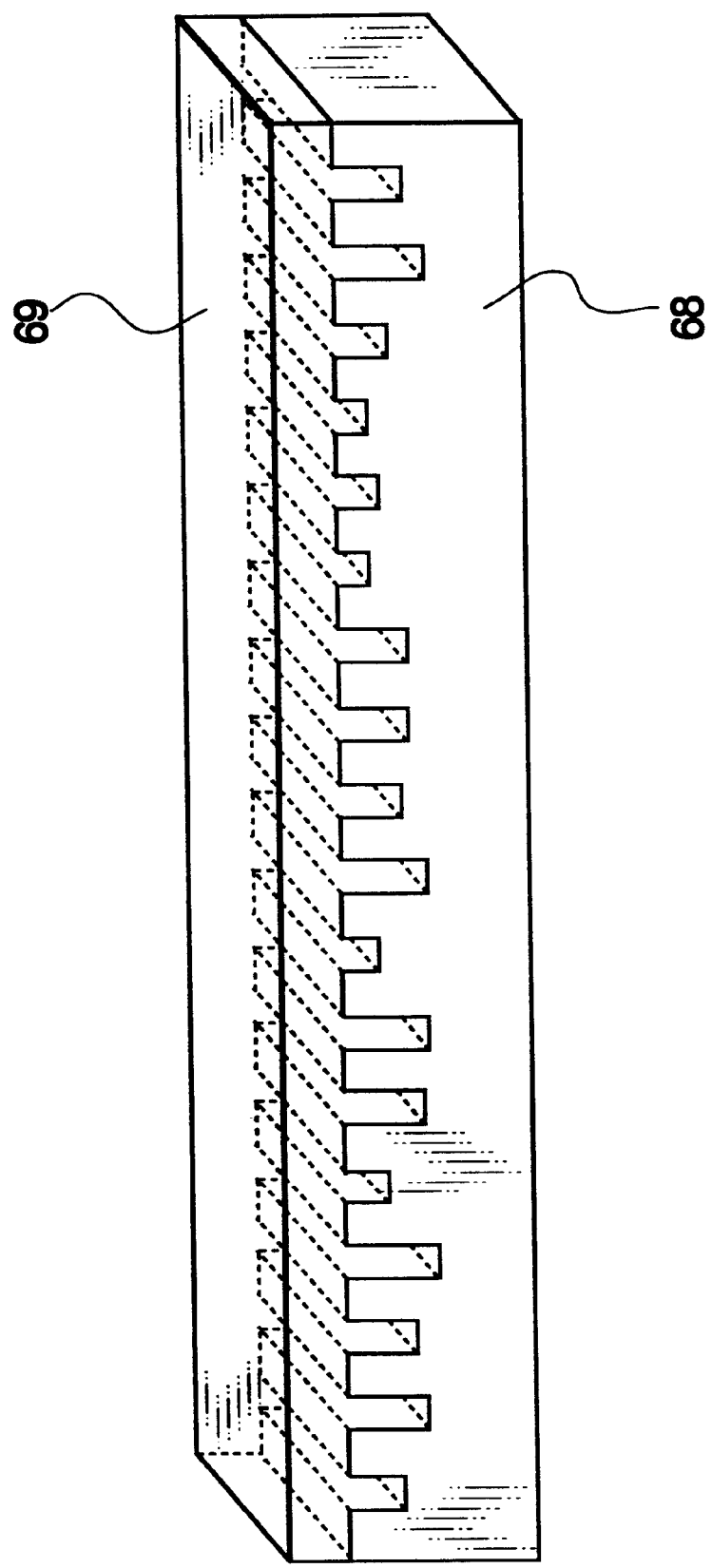
FIG. 51 is a perspective view of the phase adjusting plate used in the eighth embodiment.

(ii) The phase adjusting plate of the present embodiment was a film having depressions and having the same constitution as the phase adjusting plate of the Embodiment 7, except that the depressions of the film were flattened using a transparent material having a different refractive index from that of the film. The constitution is shown in FIG. 51. The amounts of cuts in the phase adjusting plate were determined by the same method as in the Embodiment 7. In determining the amounts of cuts, the maximum amount of cut was set at 7 $\mu$m, and the difference in refractive index between the two materials constituting the phase adjusting plate was set at 0.015.

Figure 52:
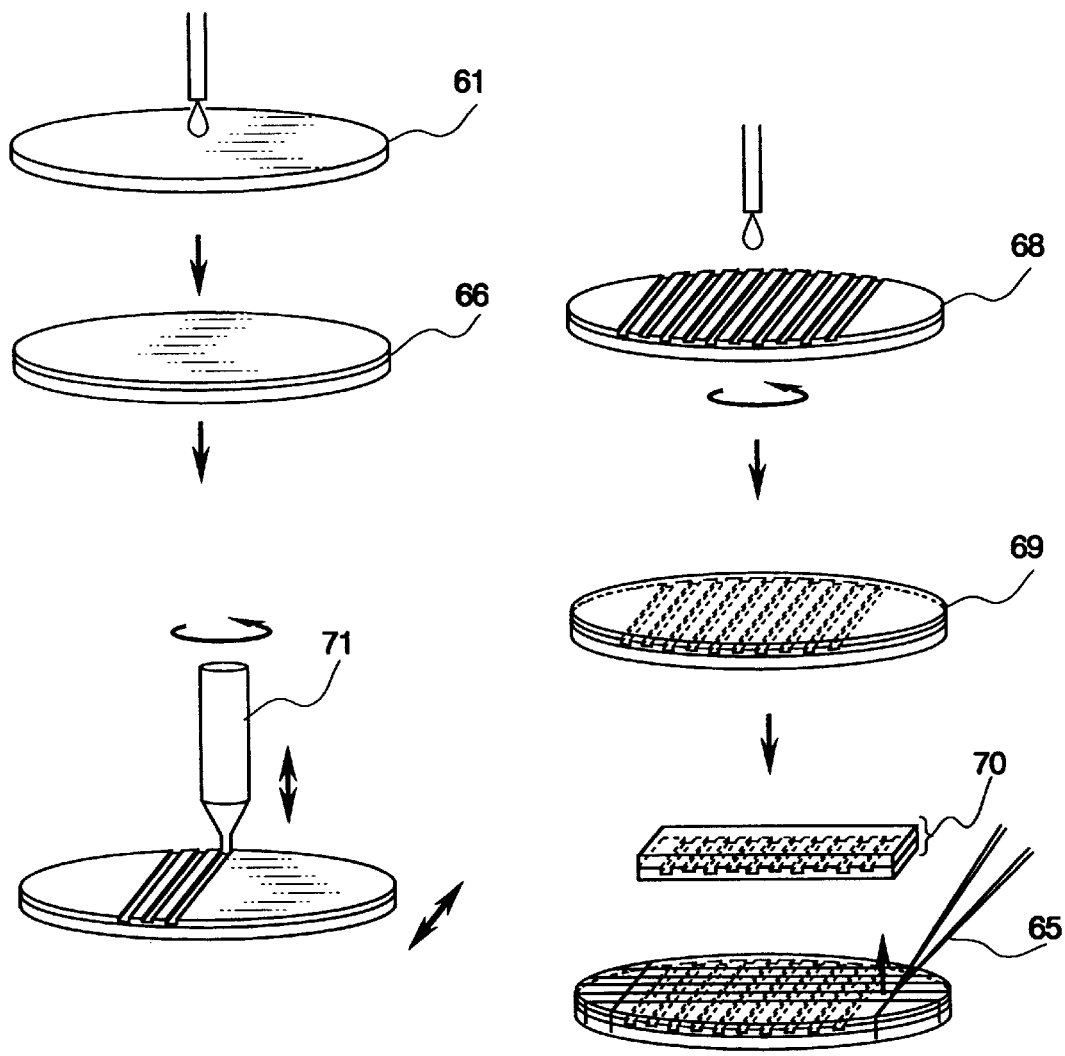
FIG. 52 is a view showing a step of preparing the phase adjusting plate in the eighth embodiment.

FIG. 52 shows a step of preparing the phase adjusting plate of the instant embodiment. First, a film 68 having depressions of the same constitution as in the Embodiment 7 was produced by milling using a rotating diamond tool 71. Then, a transparent material 69 having a refractive index different by 0.015 from the refractive index of the film was spin coated on the film to flatten its depressions. The thickness of the initial film 66 and the thickness of the final phase adjusting plate 70 were 15 and 20 $\mu$m, respectively.

(iii) The resulting phase adjusting plate 27-1 was inserted into the groove 16-1, and fixed there using an UV curable adhesive. The phase adjusting plate had been flattened so that simply by insertion into the groove, it could adjust the phase. Thus, the refractive index of the adhesive was not required to be set strictly, and it was set at 1.47, almost the same as the refractive index of the core. Setting the refractive index of the adhesive and the refractive index of the core at nearly the same value was useful for decreasing the diffraction loss in the groove, and for minimizing the effect of the distribution of the groove widths on phase errors.

Figure 53:
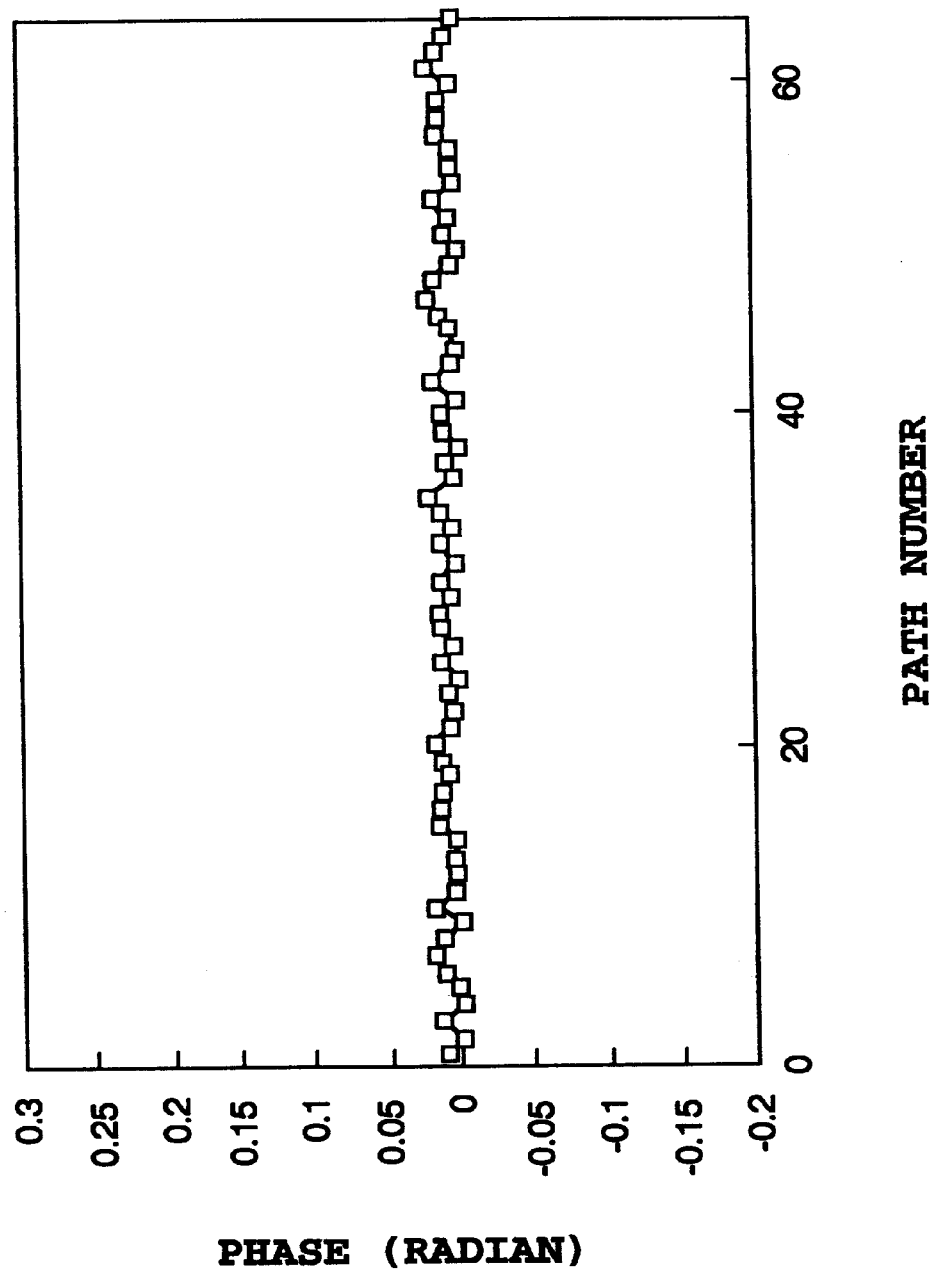
FIG. 53 is a graph showing the phase distribution of the wavelength division multi/demultiplexer after insertion of the phase adjusting plate into the groove of the wavelength division multi/demultiplexer in the eighth embodiment.
Figure 54:
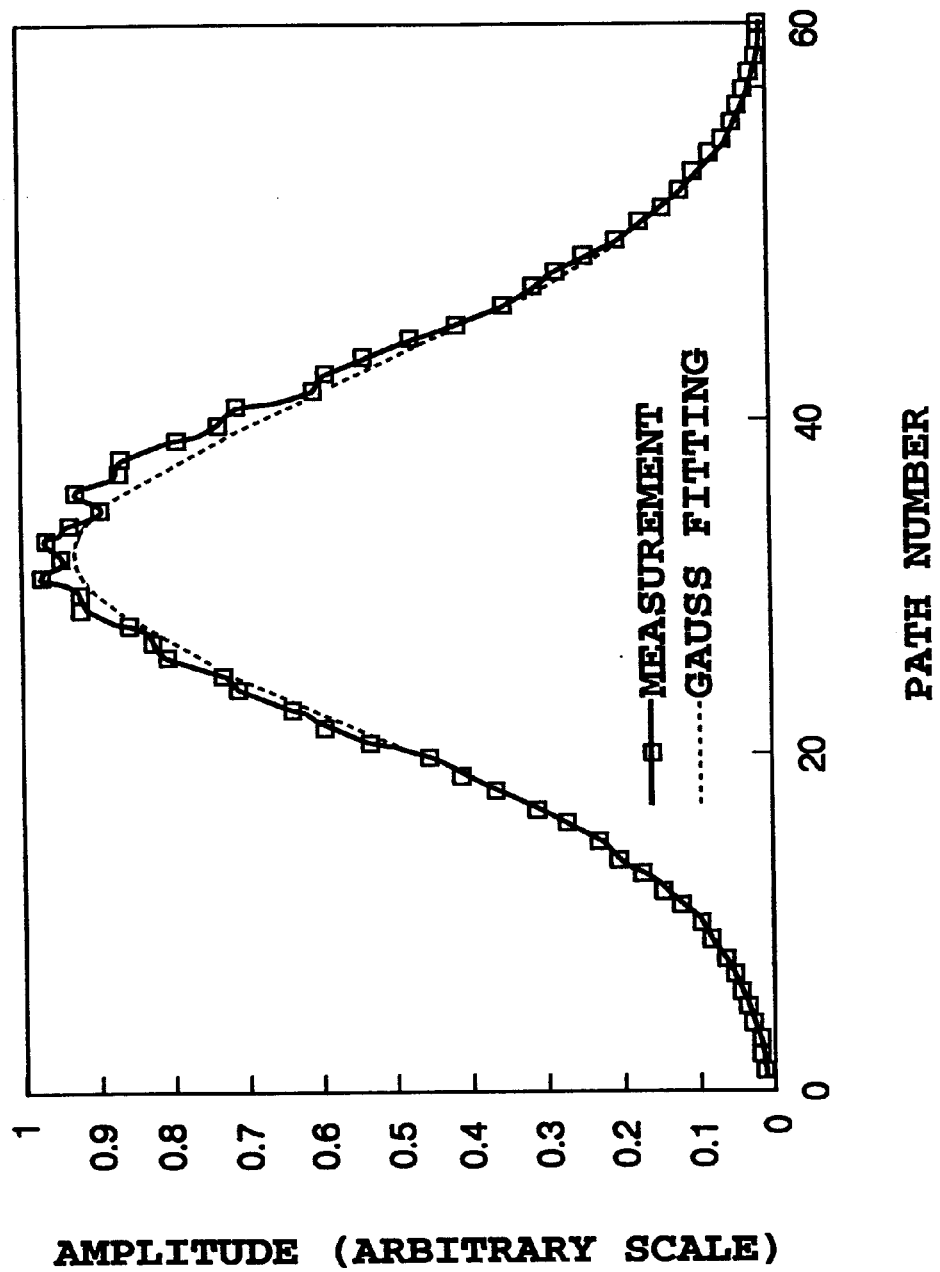
FIG. 54 is a graph showing the amplitude distribution of the wavelength division multi/demultiplexer after insertion of the phase adjusting plate into the groove of the wavelength division multi/demultiplexer in the eighth embodiment.
Figure 55:
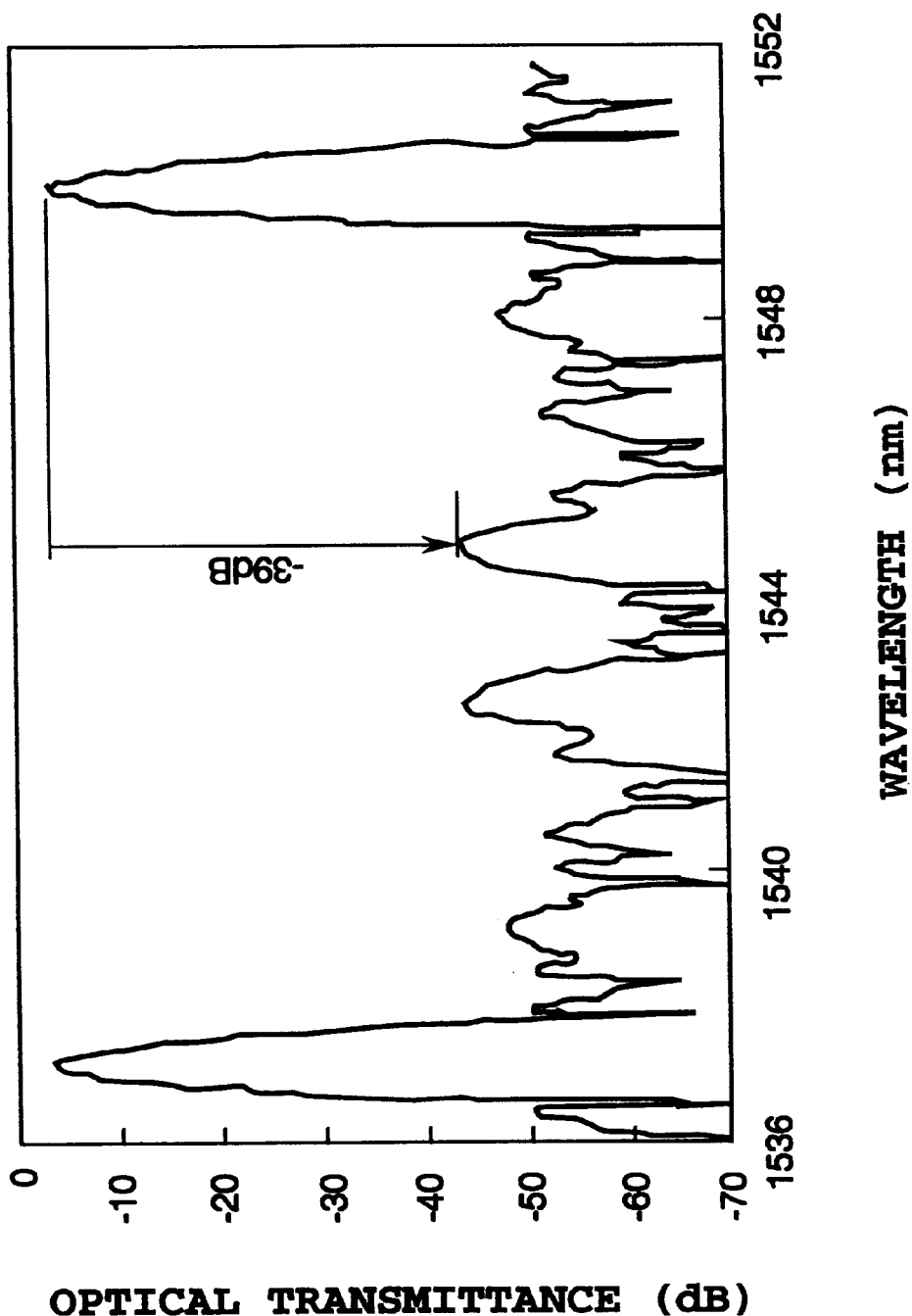
FIG. 55 is a graph showing the wavelength-transmission characteristics of transmitted light in the wavelength division multi/demultiplexer after insertion of the phase adjusting plate into the groove of the wavelength division multi/demultiplexer in the eighth embodiment.

(iv) The distributions of phases and amplitudes after insertion of the phase adjusting plate were measured using the low coherence interference method. FIGS. 53 and 54 show the distributions of phases and amplitudes measured in the TE mode. FIG. 55 shows the wavelength-transmission characteristics of transmitted light in the TE mode. Since the maximum value of the phase error was reduced from 0.45 radian to 0.05 radian, the crosstalk was decreased from −29 dB to −39 dB. The phase error in the TM mode was also decreased, so that the crosstalk was reduced to −39 dB or less. Since the crosstalk of −39 dB was attributed to a deviation in the amplitude distribution from a Gaussian distribution, the amplitude adjusting plate 27-2 was prepared next.

The amplitude adjusting plate of the present embodiment was a film having depressions and having the same constitution as the amplitude adjusting plate of the Embodiment 6, except that the depressions of the film were flattened using a transparent material having the same refractive index as that of the absorption film. The refractive index of the material for filling up the depressions was made identical with the refractive index of the absorption film in order to avoid phase errors due to the amplitude adjusting plate. The material filling up the depressions was made transparent in order to prevent this material from changing the absorption.

Figure 56:
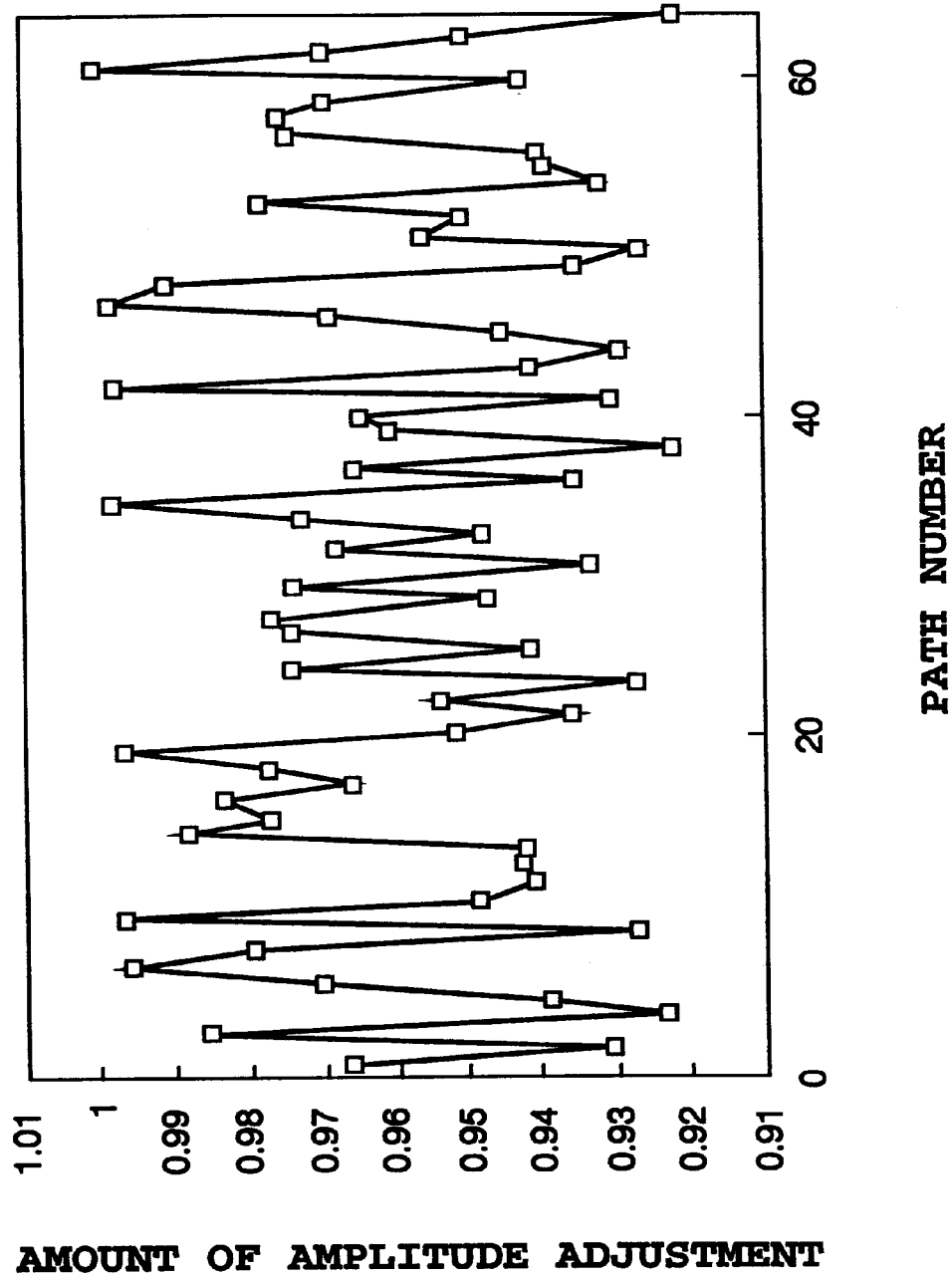
FIG. 56 is a graph showing the distribution of the amounts of amplitude adjustment determined by the distribution of the measured values of amplitude of the wavelength division multi/demultiplexer in the eighth embodiment.

(v) The amounts of cuts in the amplitude adjusting plate were determined in the following manner: The amplitude distribution measured (FIG. 54) was fitted to a Gaussian distribution to find the peak value in the distribution, the number of the path having the peak value, and the number of the path whose value corresponded to 1/e of the peak value. According to the instant embodiment, amplitude adjustment was designed to give losses. In detail, the amount of adjustment was set to be less than 1, and thus the peak value was reset so that the fitting curve would fall short of all the amplitude values (the dashed line in FIG. 54). The so obtained fitting curve expressed the finally set values of amplitude. Based on the ratios between the set values of amplitude after adjustment and the values of amplitude before adjustment, the amounts of amplitude adjustment, Ai (i denotes the path No.), were determined. FIG. 56 shows the distribution of the amounts of amplitude adjustment determined. The amounts of amplitude adjustment distributed over the range of from 1.0 to 0.92.

Figure 57:
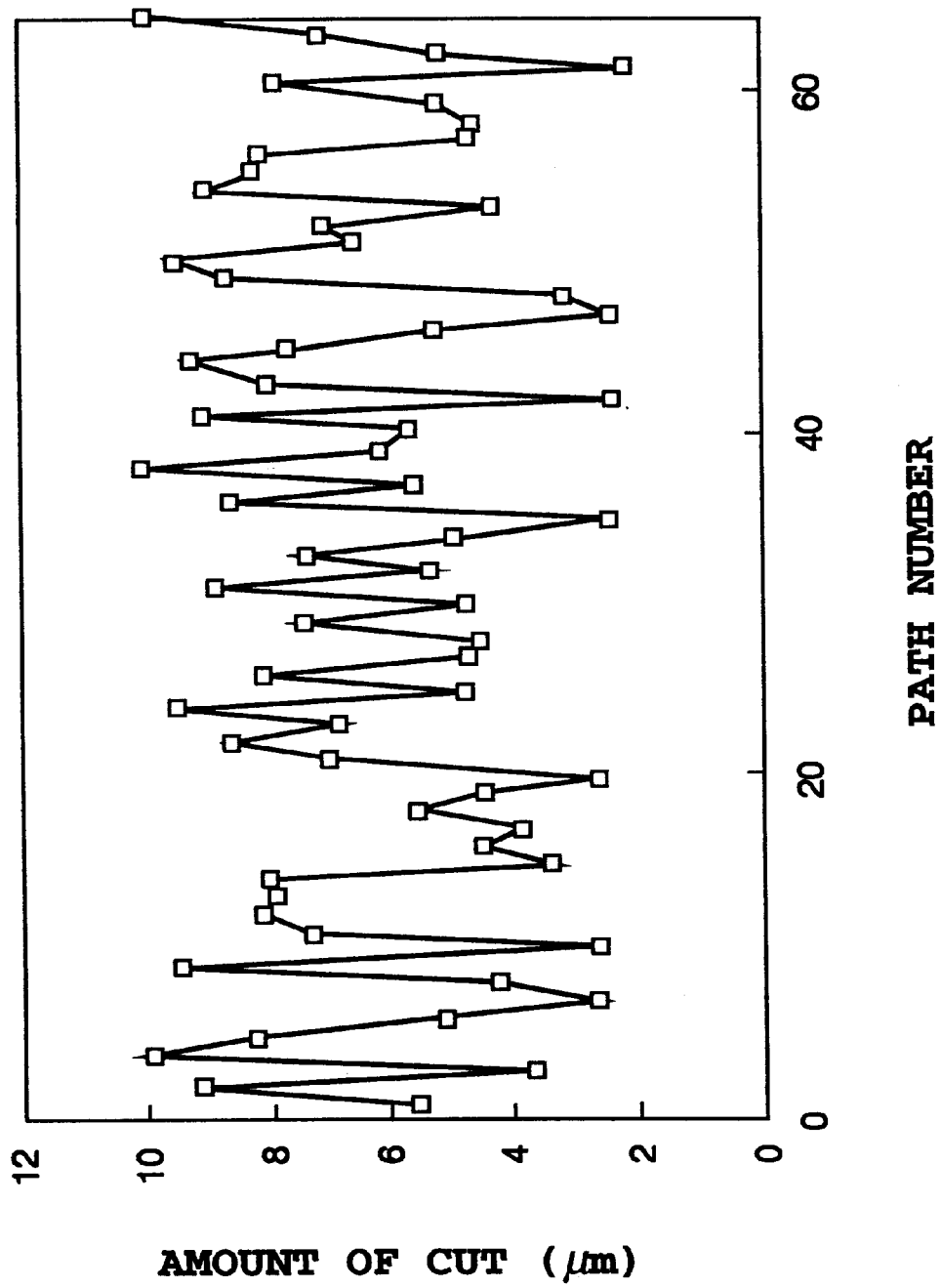
FIG. 57 is a graph showing the distribution of the amounts of cuts in the amplitude adjusting plate that were determined by the amounts of amplitude adjustment in the eighth embodiment.

(vi) Data on processing of the amplitude adjusting plate were obtained. The absorption coefficient of the material for the amplitude adjusting plate was determined to be 0.021 (1/$\mu$m) so that an amplitude adjustment of 0.90 (<maximum amount of amplitude adjustment 0.92) could be obtained for a film thickness of 10 microns. The amounts of cuts in the absorption film were determined so that the amounts of the uncut portions, $W_i$, would satisfy the aforementioned equation (1). FIG. 57 shows the distribution of the determined amounts of cuts in the amplitude adjusting plate. The maximum amount of cut was 10 $\mu$m, a value giving minimum amount of adjustment.

Figure 58:
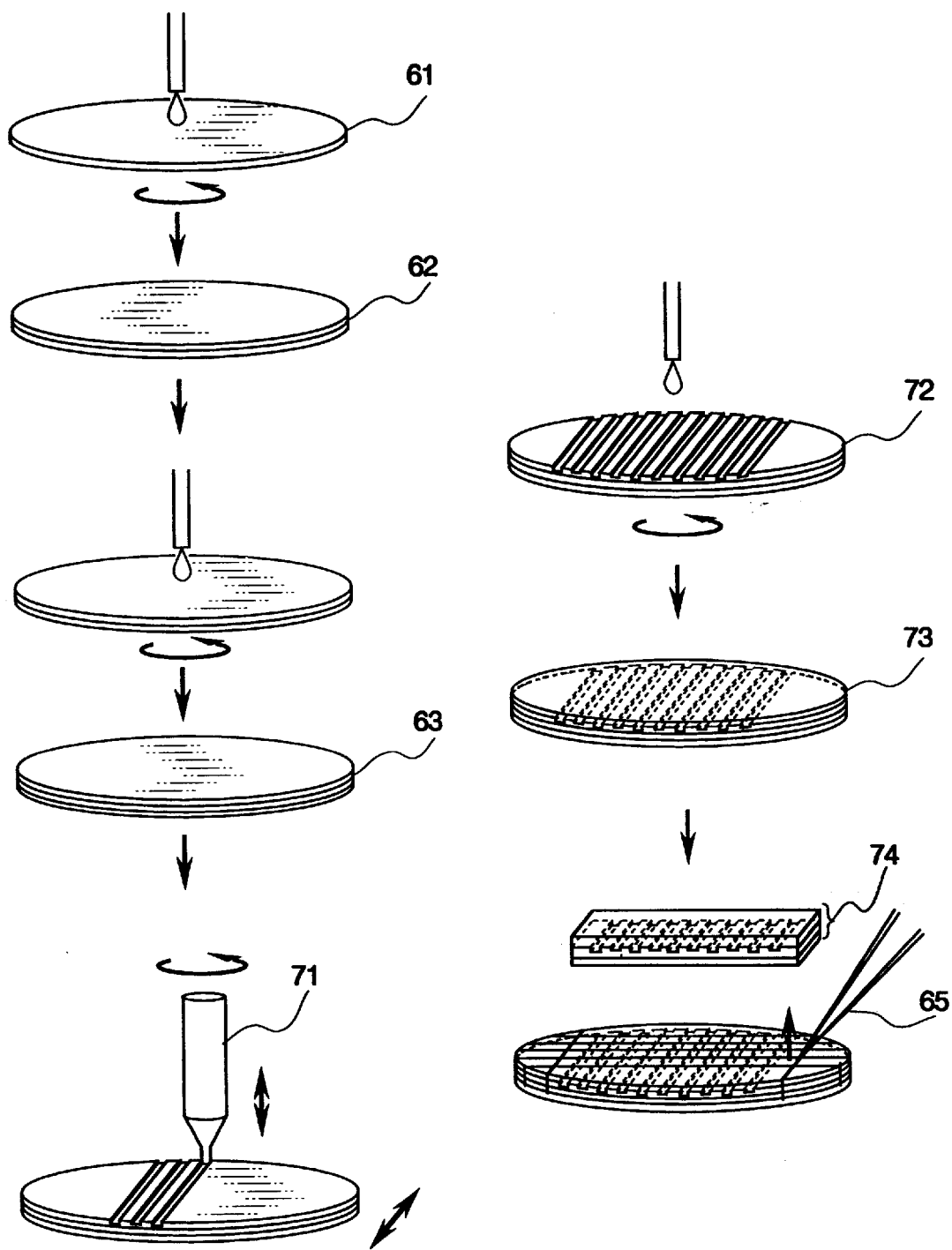
FIG. 58 is a view showing a step of preparing the amplitude adjusting plate in the eighth embodiment.

(vii) FIG. 58 shows a step of preparing the amplitude adjusting plate of the instant embodiment. First, a film 72 having depressions of the same constitution as in the Embodiment 6 was produced by milling. Then, a transparent material 73 was spin coated on the film to flatten its depressions. The thicknesses of the initial transparent film 62, absorption film 63, and the resulting amplitude adjusting plate 74 were 8, 10 and 22 $\mu$m, respectively.

(viii) The resulting amplitude adjusting plate 16-1 was inserted into the groove 16-1, and fixed there using an UV curable adhesive. The amplitude adjusting plate had been flattened so that it could adjust only the amplitude without involving phase errors. Thus, the refractive index of the adhesive did not need to be set strictly at the same value as the refractive index of the amplitude adjusting plate. Thus, the refractive index of the adhesive was set at 1.47, almost the same as the refractive index of the core. Setting the refractive index of the adhesive and the refractive index of the core at nearly the same value was useful for decreasing the diffraction loss in the groove, and for minimizing the effect of the distribution of the groove widths on phase errors.

Figure 59:
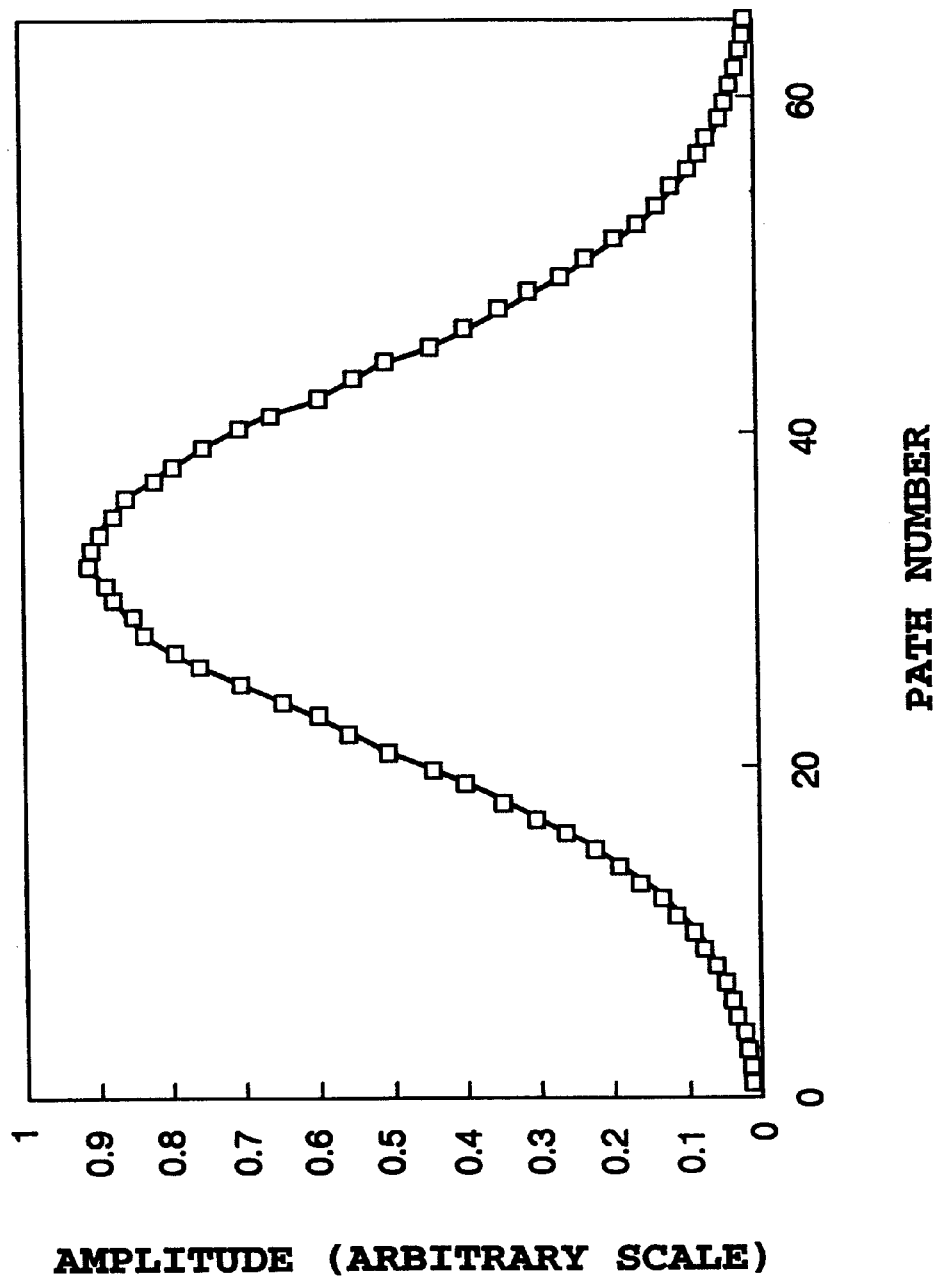
FIG. 59 is a graph showing the amplitude distribution in the TE mode of the wavelength division multi/demultiplexer after insertion of the amplitude adjusting plate in the eighth embodiment.
Figure 60:
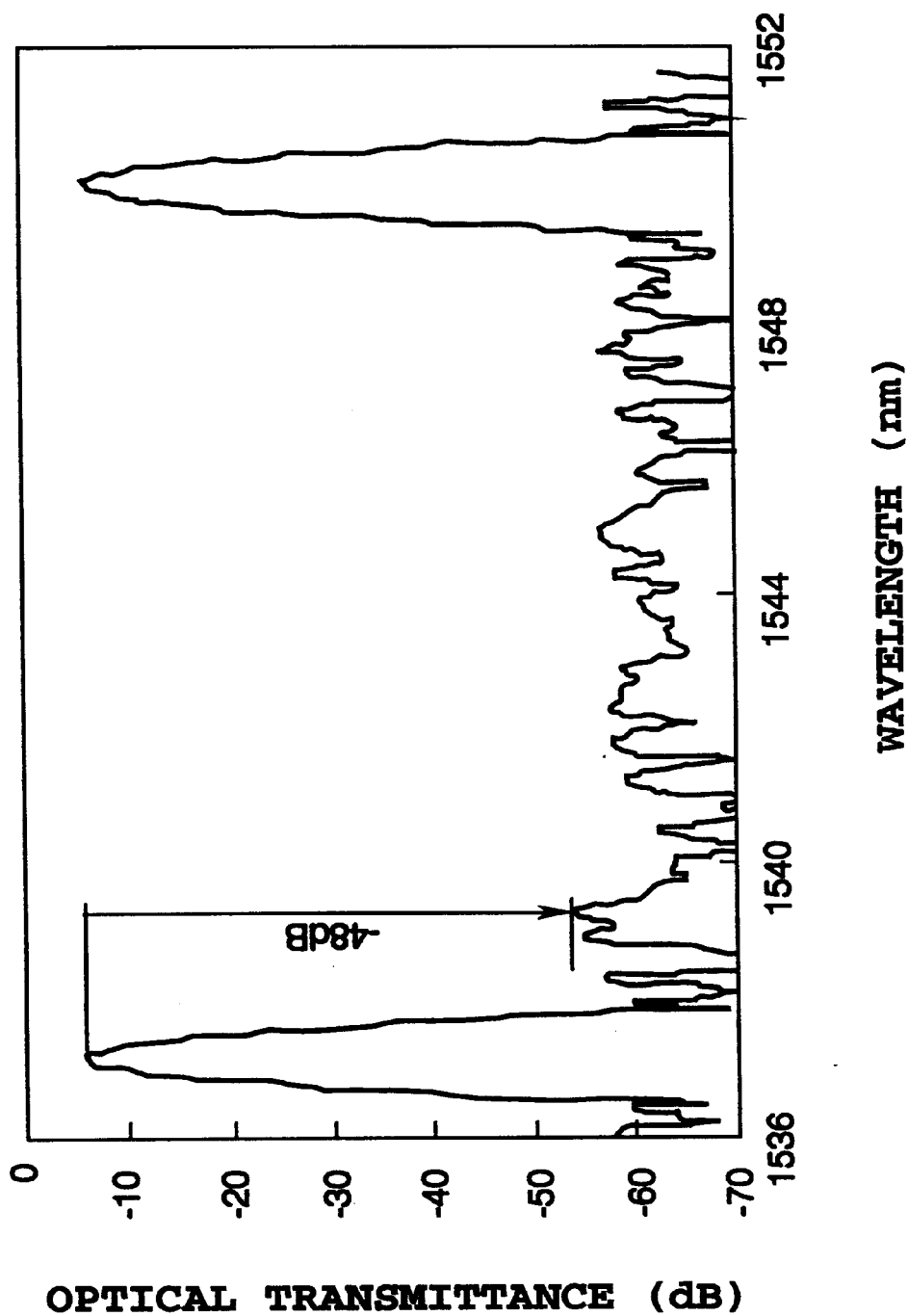
FIG. 60 is a graph showing the wavelength-transmission characteristics of transmitted light in the TE mode of the wavelength division multi/demultiplexer after insertion of the amplitude adjusting plate in the eighth embodiment.

FIGS. 59 and 60 show the amplitude distribution and the wavelength-transmission characteristics of transmitted light in the TE mode, respectively, after insertion of the amplitude adjusting plate.

The standard deviation for amplitude errors was decreased down to 0.02, and the crosstalk was diminished to −48 dB. Phase errors before and after insertion of the amplitude adjusting plate were not very different. Thus, only amplitudes were adjusted without influence on the phase characteristics. The characteristics in the TM mode were almost the same as those in the TE mode, and both the phase and amplitude could be adjusted without polarization dependency of their errors.

As described above, the installation of the phase and amplitude adjusting plates led to a marked decrease in the crosstalk of the arrayed waveguide grating wavelength division multi/demultiplexer from −29 dB to −48 dB. The excess loss due to the insertion of the phase and amplitude adjusting plates, including groove formation, was 1.7 dB.

Embodiment 9

Figure 61:
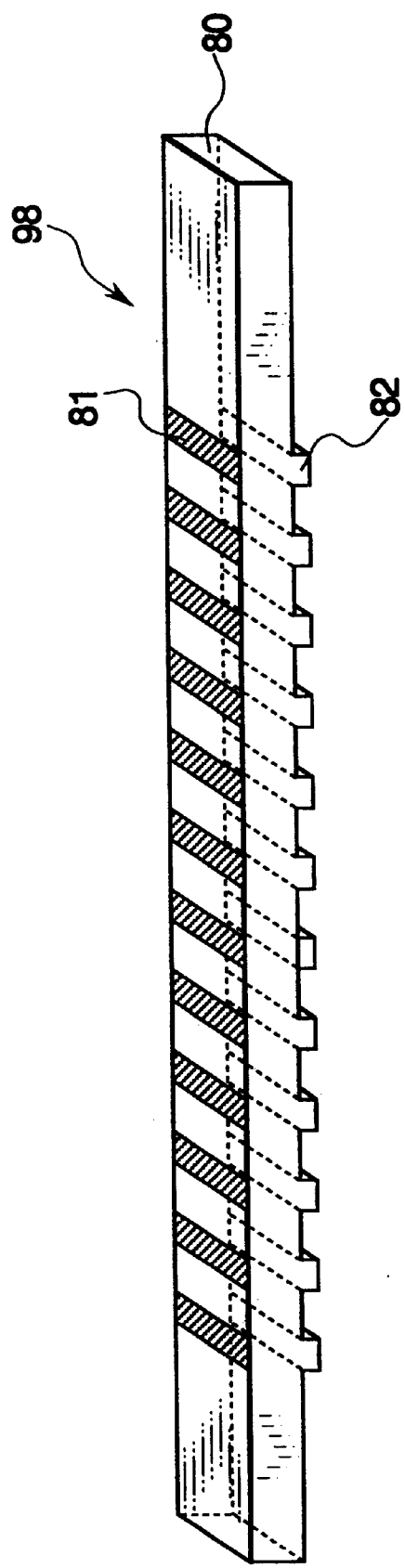
FIG. 61 is a perspective view of the amplitude/phase adjusting plate used in a ninth embodiment of the present invention.

The ninth embodiment of the present invention is an arrayed waveguide wavelength division multi/demultiplexer with an amplitude/phase adjusting plate. The construction of this embodiment was the same as the construction of the Embodiment 7, but was different in terms of the insertion of an amplitude/phase adjusting plate (optical characteristics adjusting plate) 98 as illustrated in FIG. 61 instead of the phase adjusting plate 27. In FIG. 61, the numeral 80 denotes a transparent film having a uniform refractive index, and 81 a metal film. The transparent film 80 had projections 82 whose thicknesses were changed to adjust the phase. The respective metal films 81 had thicknesses which were varied to give varying absorption and adjust the amplitude of light. The thickness of each metal film was determined by the absorption coefficient of the metal and the amount of amplitude adjustment. Since the metal film had a high absorption coefficient, it required a small film thickness, and the differences in the thicknesses of the metal film affected the phase minimally. That is, the thicknesses of the projections 82 for use in phase adjustment could be determined independently of the thickness of the metal film.

In an arrayed waveguide grating wavelength division multi/demultiplexer produced from silica-based optical waveguides according to the instant embodiment, the amplitude characteristics of light that can usually be approximated in a Gaussian form and that passes through each arrayed waveguide were adjusted to a sinc function. Phase adjustment was used to achieve negative values in the sinc function, namely, to shift the phase by 180 degrees.

In the instant embodiment, the amplitude/phase adjusting plate 98 was used to decrease phase errors and amplitude errors in the arrayed-waveguide grating wavelength division multi/demultiplexer produced from silica-based optical waveguides. The resulting arrayed-waveguide grating had 8 each of input and output ports, 64 arrayed waveguides, and a channel wavelength spacing of 0.8 nm.

Figure 62:
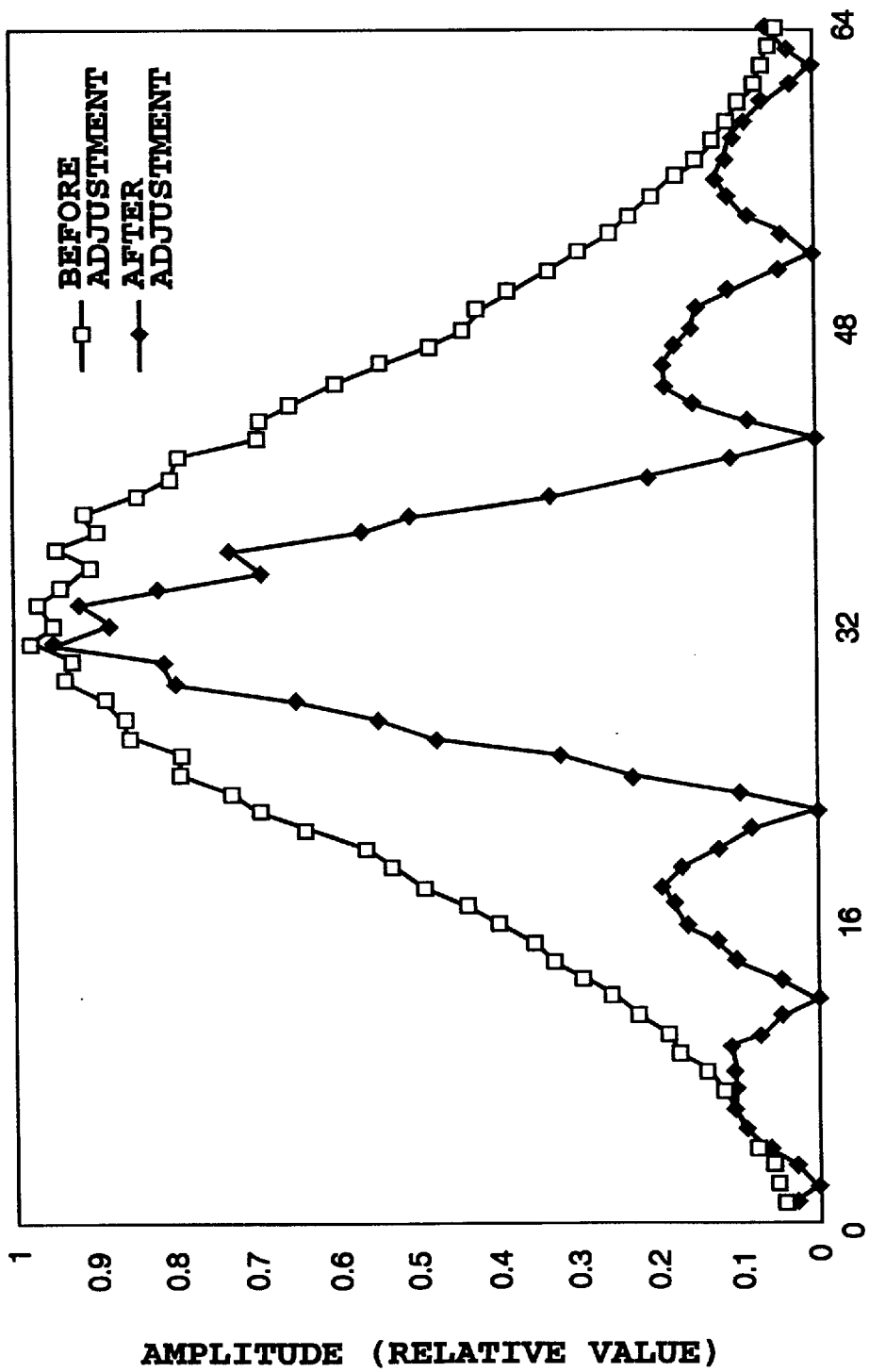
FIG. 62 is a graph showing the amplitude distributions of the multi/demultiplexer before and after insertion of the amplitude/phase adjusting plate into the multi/demultiplexer in the ninth embodiment.
Figure 63:
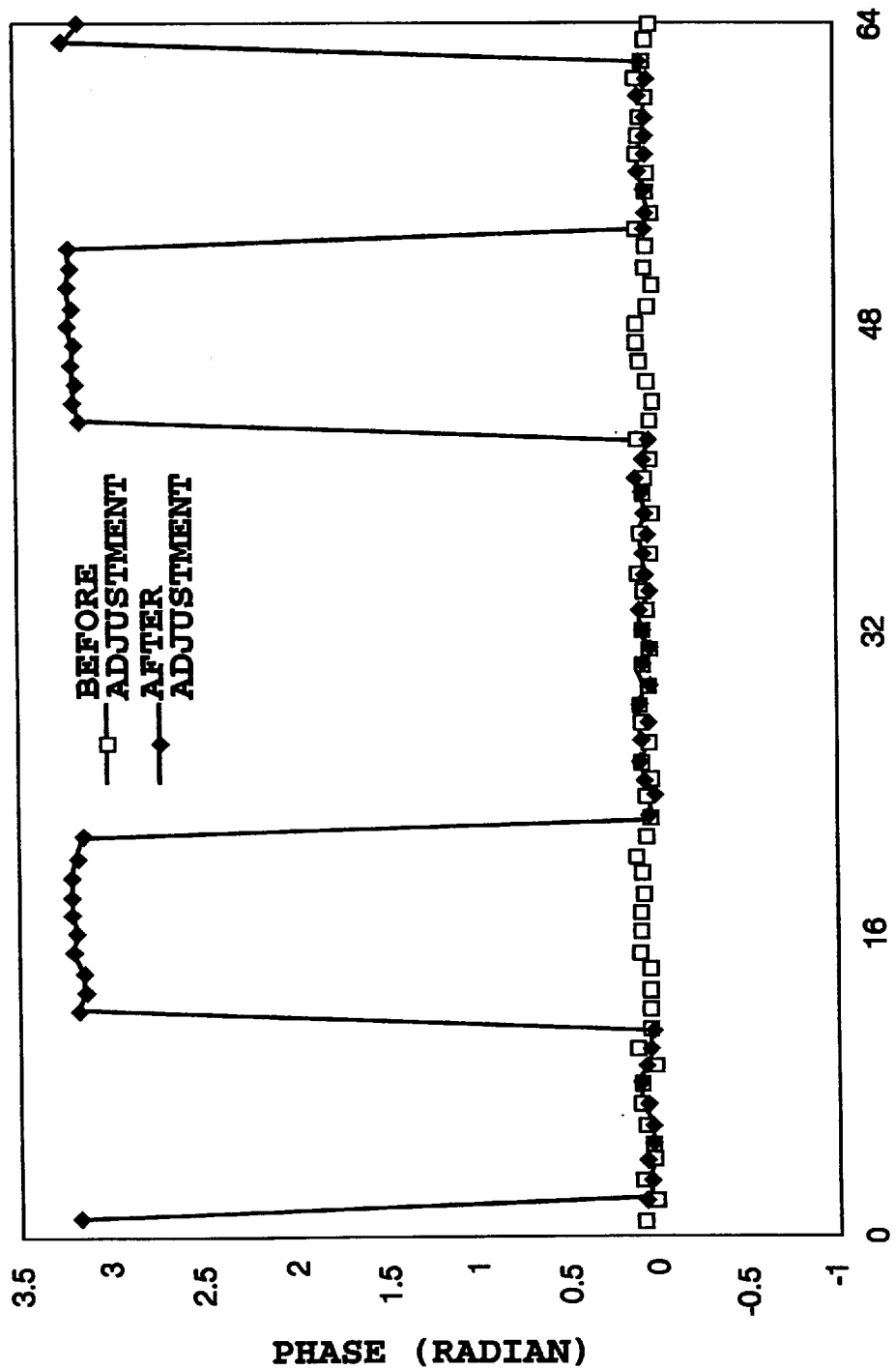
FIG. 63 is a graph showing the phase distributions of the multi/demultiplexer before and after insertion of the amplitude/phase adjusting plate into the multi/demultiplexer in the ninth embodiment.
Figure 64:
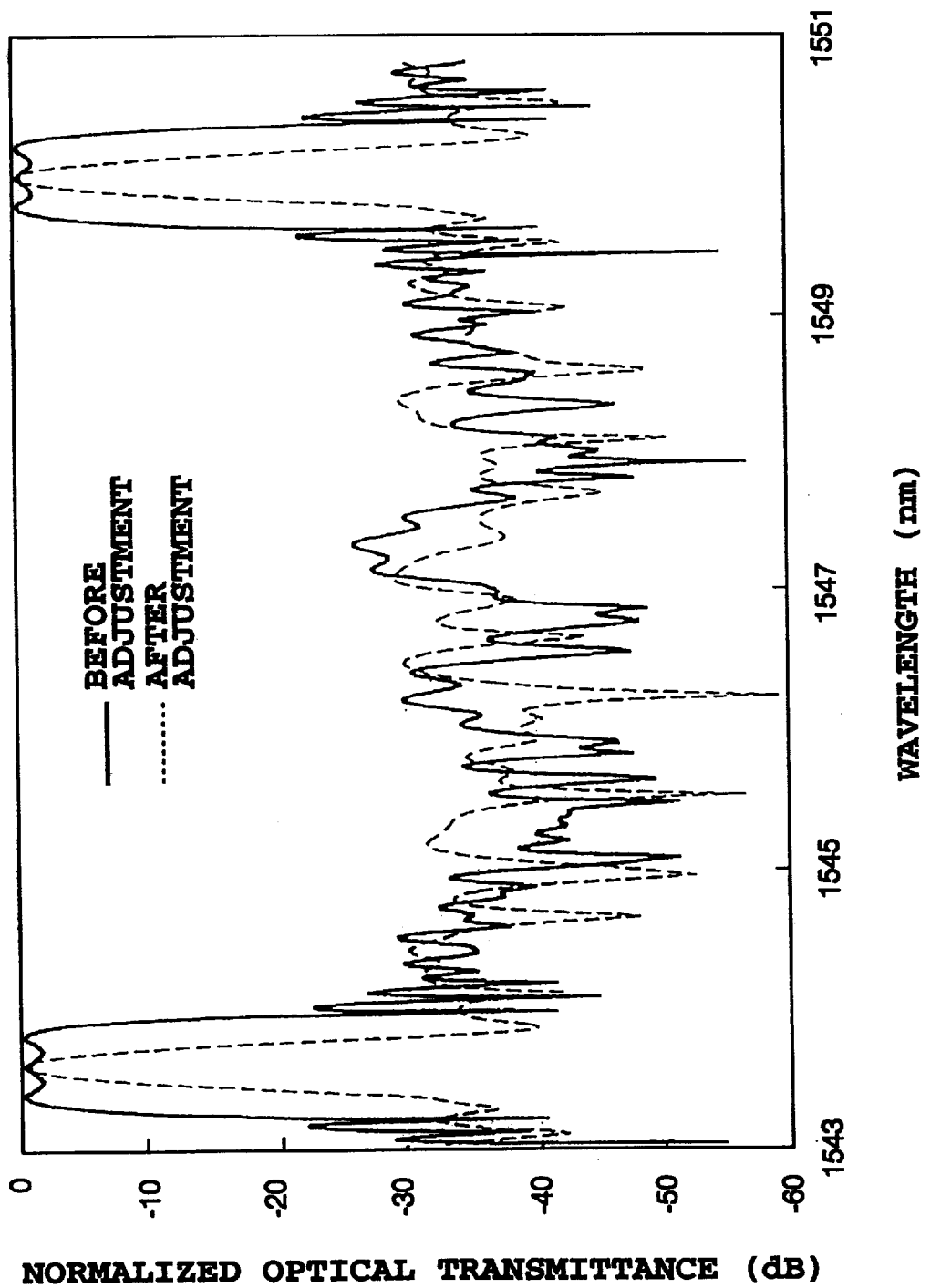
FIG. 64 is a graph showing the wavelength-transmission characteristics of transmitted light in the multi/demultiplexer before and after insertion of the amplitude/phase adjusting plate into the multi/demultiplexer in the ninth embodiment.

The wavelength division multi/demultiplexer according to the instant embodiment was prepared by the following procedure:

(i) A groove 25 μm wide and 120 μm deep and crossing all the arrayed waveguides was formed by reactive ion etching. Then, the distributions of phases and amplitudes were measured with a low coherence interferometer. FIGS. 62, 63 and 64 show the amplitude distribution, phase distribution, and wavelength-transmission characteristics before and after insertion of the amplitude/phase adjusting plate.

(ii) The amounts of amplitude/phase adjustment were determined which were necessary for adjusting the transmission characteristics of light passing through each arrayed waveguide to a sinc function. Based on the results, data on processing of the amplitude/phase adjusting plate were set. The thickness of the metal film, and the thicknesses of the projections of the transparent film were determined by the same methods as in the Embodiments 6 and 7.

Figure 65:
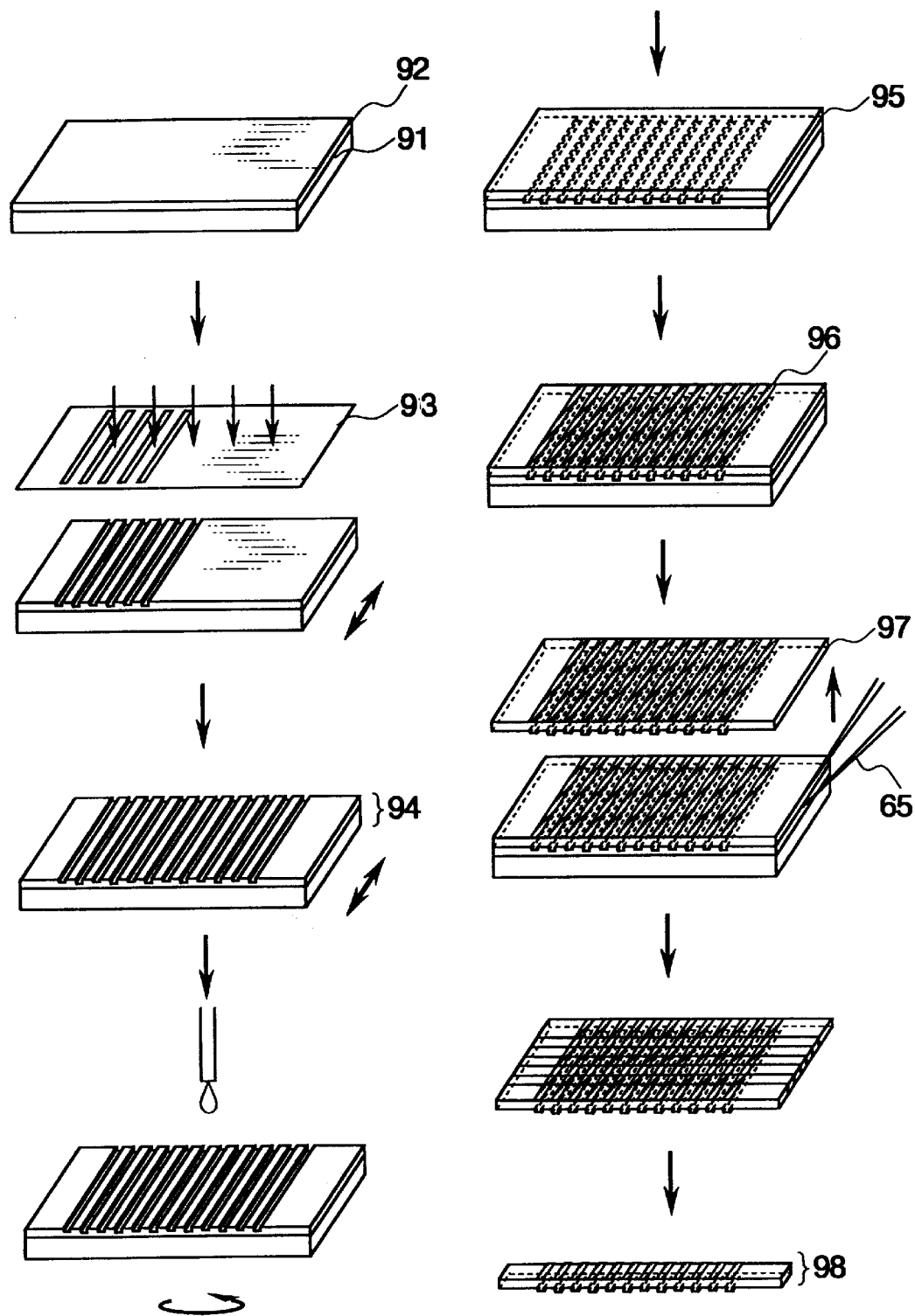
FIG. 65 is a view showing a step of preparing the amplitude/phase adjusting plate in the ninth embodiment.

(iii) Based on the processing data obtained, the amplitude/phase adjusting plate of the instant embodiment was prepared by a step as shown in FIG. 65. A metal film 92 with a thickness of 30 μm was formed on a substrate 91, and the metal film was processed by etching using a mask 93 to form a mold 94. The depths of processing were the same as the predetermined thicknesses of the projections of the transparent film. Then, a polyimide film 95 was formed on the mold by spin coating. On this film, a metallic Cr film 96 with locally varying thicknesses was formed by sputtering. The resulting transparent film 97 with metal film was stripped from the substrate 91 by means of a forceps, and cut to produce an amplitude/phase adjusting plate 98.

(iv) The resulting amplitude/phase adjusting plate 98 was inserted in a groove having a width crossing across arrayed waveguides as shown in FIG. 34. After positional alignment, the plate was fixed using an adhesive.

As seen from the amplitude distribution, phase distribution, and wavelength-transmission characteristics after insertion of the amplitude/phase adjusting plate (FIGS. 62, 63 and 64), the transmission characteristics in the form of a sinc function were achieved. As a result, the passband was flattened, and the 3 dB band width was broadened by about 280%. At this time, the excess loss due to insertion of the amplitude adjusting plate, including formation of the groove, was 3.5 dB.

The above results were indicated with regard to the TE mode, and adjustments were comparably successful in the TM mode as well.

Embodiment 10

Figure 66:
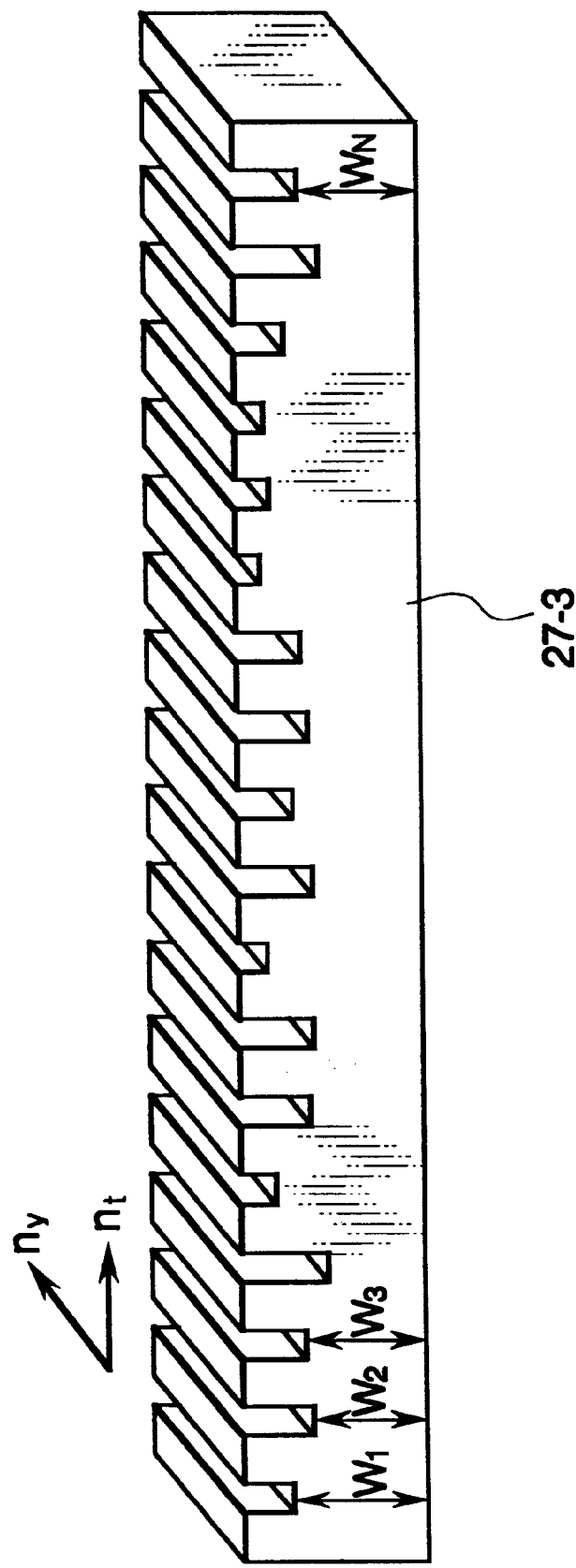
FIG. 66 is a perspective view of the phase adjusting plate used in a tenth embodiment of the present invention.

The tenth embodiment of the present invention is an arrayed waveguide wavelength division multi/demultiplexer with a phase adjusting plate and a birefringence adjusting plate. The construction of this embodiment was the same as the construction of the Embodiment 8, but was different in that a birefringence adjusting plate 27-3 as illustrated in FIG. 66 was inserted instead of the amplitude adjusting plate 27-2. The birefringence adjusting plate was used to give different phase changes to two polarizations of light in the TE mode and the TM mode that would propagate through the waveguides, the objects for adjustment, and to give the amounts of the changes different values for the respective waveguides.

As shown in FIG. 39 of the Embodiment 7, phase errors of an arrayed waveguide grating wavelength division multi/demultiplexer are generally polarization dependent. This dependency occurs because of variations in the birefringences of the respective waveguides. In the Embodiments 1 to 9, the polarization dependency of phase errors exerted a minor influence on the optical characteristics. In an optical circuit in which the waveguides occupy a large area and have great variations in birefringence, however, a phase adjusting plate alone cannot dissolve phase errors of both polarizations at the same time.

In the instant embodiment, a phase adjusting plate 27-1 was used to decrease phase errors of one of the polarizations in the arrayed-waveguide grating wavelength division multi/demultiplexer produced from silica-based optical waveguides, and the birefringence adjusting plate 27-3 was used to decrease phase errors of the other polarization. The resulting arrayed-waveguide grating had 16 input/output ports, 64 arrayed waveguides, and a channel wavelength spacing of 0.08 nm.

The wavelength division multi/demultiplexer according to the instant embodiment was prepared by the following procedure:

(i) A groove 25 μm wide and 120 μm deep and crossing all the arrayed waveguides was formed using a dicing saw. Then, the distributions of phases and amplitudes in the TE mode were measured with a low coherence interferometer. The phase errors were distributed over a 360-degree range, and the crosstalk was −5 dB. Then, only the phase errors in the TE mode were decreased using the phase adjusting plate by the same method as in the Embodiment 7. The transmission characteristics after phase adjustment were −32 dB in the TE mode and −20 dB in the TM mode.

(ii) To reduce only the phase errors in the TM mode, a birefringence adjusting plate was prepared. As shown in FIG. 66, the birefringence adjusting plate was a birefringence plate processed to have depressions so that the refractive index in the longitudinal direction of the plate and the refractive index in the direction perpendicular to this direction would take different values, $n_x$ and $n_y$ ($n_x \neq n_y$). First, the distributions of the phases and amplitudes in the TM mode were measured with a low coherence interferometer. Then, based on the difference in refractive index ($n_y - n_x$) and the phase errors in the TM mode, the depths of depressions to be formed in the birefringence adjusting plate were calculated. Further, a force was exerted in one direction on a polyimide film prepared by spin coating to form a birefringence film with $n_y - n_x = 0.035$ and a film thickness of 20 μm. Finally, cuts were formed in the birefringence film by means of a dicing saw to make a birefringence adjusting plate.

(iii) The resulting birefringence adjusting plate was inserted in the groove crossing across the arrayed waveguides. After positional alignment, the plate was fixed using an adhesive. The refractive index of the adhesive was equalized with $n_x$ so as not to cause phase change in the TE mode.

The crosstalks after insertion of the birefringence adjusting plate were −32 dB in both of the TE mode and the TM mode. Phase errors were comparable in the TE mode and the TM mode, and there were no changes in the phase errors in the TE mode. As seen from these findings, the birefringence adjusting plate of the instant embodiment was able to reduce the polarization dependency of phase errors in the arrayed-waveguide grating multi/demultiplexer.

As described above, the embodiments of the present invention exemplified the decrease of consumed electric power in a Mach-Zehnder interferometer type 2×2 switch, the reduction of variations in output light among ports in a 1×N splitter, the improvement of crosstalk by the reduction of phase errors or amplitude errors as well as the flattening of the passband by the adjustment of the transmission characteristics in an arrayed-waveguide grating multi/demultiplexer, and the reduction of the polarization dependency of phase errors by the decrease of birefringence variations.

However, the waveguide type optical circuit for adjustment of optical characteristics according to the present invention is not restricted to the 2×2 switch, 1×N splitter or arrayed-waveguide grating multi/demultiplexer disclosed in the Embodiments. It can be applied as any of optical circuits having a plurality of waveguides. Thus, it can be used to adjust the optical characteristics, such as phase, amplitude and birefringence, of optical circuits ranging from an optical circuit having no interference portion such as the 1×N splitter to a Mach-Zehnder type optical circuit and an interference optical circuit such as a transversal filter.

The present embodiments also showed amplitude, phase and birefringence as examples of the optical characteristics to be adjusted. However, the present invention is applicable to adjustment of other optical characteristics such as polarization state and nonlinear constants.

The present invention, moreover, is not restricted to the silica-based waveguides illustrated in the Embodiments, but is applicable to an optical circuit using LN or polymer.

The instant embodiments showed examples of processing using a dicing saw, or milling with a diamond tool, to form projections and depressions in the adjusting plate. However, other methods of processing, such as etching, may be used. The invention is not restricted to the direct processing of the film, but may employ indirect processing based on mold formation as shown in the Embodiment 9.

The method of film formation is not restricted to the aforementioned spin coating, but may be other methods such as physical vapor phase growth, chemical vapor phase growth, and liquid phase growth, including vacuum deposition or sputtering.

The adjusting plate may be one having depressions, one having projections, or one having these depressions or projections flattened.

As explained along with the Embodiments, the Mach-Zehnder interferometer type 2×2 switch compensating for optical path length errors according to the present invention decreases electric power consumption in comparison with the conventional switch. The inventive arrayed-waveguide grating wavelength division multi/demultiplexer compensating for optical path length errors decreases crosstalk by more than −10 dB as compared with the conventional system. The inventive arrayed-waveguide grating multi/demultiplexer compensating for amplitude errors decreases crosstalk by more than −10 dB as compared with the conventional system. The inventive arrayed-waveguide grating multi/demultiplexer adjusting the amplitude characteristics and phase characteristics in the form of sinc function can broaden the 3 dB width of the passband by about 280%.

What is claimed is:

1. A guided-wave circuit with an optical characteristics adjusting plate, comprising:
   a substrate with a groove;
   a plurality of optical waveguides on said substrate, said groove crossing all of the plurality of optical waveguides; and
   a plate for adjusting all the optical characteristics of the guided-wave circuit being mounted in said groove, wherein the optical characteristics of the optical waveguide is the phase of light propagating through the optical waveguide, and the optical characteristics adjusting plate is a phase adjusting plate.

2. The guided-wave circuit of claim 1, wherein the phase adjusting plate is a film having a uniform refractive index and processed to have projections and depressions in the longitudinal direction.

3. The guided-wave circuit of claim 2, wherein the depressions of the film constituting the phase adjusting plate are filled up with a transparent material.

4. The guided-wave circuit of claim 3, wherein the refractive index of the film and the refractive index of the transparent material filling up the depressions of the film are different from each other.

5. The guided-wave circuit of claim 1, wherein the refractive index of the phase adjusting plate is different from the refractive indices of the plurality of waveguides.

6. A guided-wave circuit with an optical characteristics adjusting plate, comprising:
a substrate with a groove;
a plurality of optical waveguides on said substrate, said groove crossing all of the plurality of optical waveguides; and
a plate for adjusting all the optical characteristics of the guided-wave circuit being mounted in said groove, wherein the optical characteristics of the optical waveguide is the amplitude of light propagating through the optical waveguide, and the optical characteristics adjusting plate is an amplitude adjusting plate.

7. The guided-wave circuit of claim 6, wherein the amplitude adjusting plate is a film having a uniform absorption coefficient and processed to have projections and depressions in the longitudinal direction.

8. The guided-wave circuit of claim 7, wherein the depressions of the film constituting the amplitude adjusting plate are filled up with a transparent material.

9. The guided-wave circuit of claim 8, wherein the refractive index of the film and the refractive index of the transparent material filling up the depressions of the film are the same.

10. The guided-wave circuit of claim 6, wherein the amplitude adjusting plate is composed of a film having a constant thickness, and a metal film formed on the film and varying in thickness in the longitudinal direction of the film.

11. A guided-wave circuit with an optical characteristics adjusting plate, comprising:
a substrate with a groove;
a plurality of optical waveguides on said substrate, said groove crossing all of the plurality of optical waveguides; and
a plate for adjusting all the optical characteristics of the guided-wave circuit being mounted in said groove, wherein the optical characteristics of the optical waveguide is at least one of the phase and amplitude of light propagating through the optical waveguide, and the optical characteristics adjusting plate is at least one of a phase adjusting plate and an amplitude adjusting plate.

12. The guided-wave circuit of claim 11, wherein the optical characteristics adjusting plate is mounted in said groove by an optically transparent adhesive and is a phase adjusting plate, and the refractive index of the phase adjusting plate and the refractive index of the adhesive are different from each other.

13. The guided-wave circuit of claim 11, wherein the optical characteristics adjusting plate is mounted in said groove by an optically transparent adhesive and is an amplitude adjusting plate, and the refractive index of the amplitude adjusting plate and the refractive index of the adhesive are the same.

14. The guided-wave circuit of claim 11, wherein the optical characteristics adjusting plate is mounted in said groove by an optically transparent adhesive and is a birefringence adjusting plate, and one of the refractive indices of the birefringence adjusting plate and the refractive index of the adhesive are the same.

15. A guided-wave circuit with an optical characteristics adjusting plate, comprising:
a substrate with at least two grooves;
a plurality of optical waveguides on said substrate, each said groove crossing all of the plurality of optical waveguides; and
at least two plates for adjusting all the optical characteristics of the guided-wave circuit, each plate being mounted in one of said grooves, wherein the optical characteristics adjusting plate disposed in one of the grooves is a phase adjusting plate, while the optical characteristics adjusting plate disposed in the other groove is an amplitude adjusting plate.

16. A method for producing a guided-wave circuit with an optical characteristics adjusting plate, comprising
a groove formation step for forming a groove in a guided-wave circuit, said guided-wave circuit having a plurality of optical waveguides on a substrate, each waveguide having an input side and an output side, said groove crossing all of the plurality of optical waveguides;
an optical characteristics adjustment amount determination step for measuring optical characteristics values on the input side and the output side of each optical waveguide when light propagates through the plurality of optical waveguides, and determining the amount of optical characteristics adjustment necessary for each optical waveguide based on an error between the optical characteristics value of the input side and the optical characteristics value on the output side;
an optical characteristics adjusting plate preparation step for preparing an optical characteristics adjusting plate by locally varying the optical characteristics value in response to each optical characteristics adjustment amount; and
an optical characteristics adjusting plate mounting step for mounting the optical characteristics adjusting plate in the groove.

17. The method for production of claim 16, wherein the optical characteristics value of the optical waveguide is the phase of light propagating through the optical waveguide, the optical characteristics adjusting plate is a phase adjusting plate, and the optical characteristics adjusting plate preparation step comprises a step of forming projections and depressions, adapted to the amount of phase adjustment of each optical waveguide, in the longitudinal direction of a film having a uniform refractive index.

18. The method for production of claim 17, wherein the optical characteristics adjusting plate preparation step for preparing the phase adjusting plate further includes a film flattening step for filling up the depressions of the film with a transparent material, said film having a uniform refractive index and having the projections and depressions formed therein, and said transparent material having a refractive index different from the refractive index of the film, thereby to flatten the film.

19. The method for production of claim 16, wherein the optical characteristics value of the optical waveguide is the amplitude of light propagating through the optical waveguide, the optical characteristics adjusting plate is an amplitude adjusting plate, and the optical characteristics adjusting plate preparation step comprises a step of forming projections and depressions, adapted to the amount of amplitude adjustment of each optical waveguide, in the longitudinal direction of a film having a uniform absorption coefficient.

20. The method for production of claim 19, wherein the optical characteristics adjusting plate preparation step for preparing the amplitude adjusting plate further includes a film flattening step for filling up the depressions of the film with a transparent material, said film having a uniform absorption coefficient and having the projections and depressions formed therein, and said transparent material having the same refractive index as the refractive index of the film, thereby to flatten the film.

21. The method for production of claim 16, wherein the optical characteristics value of the optical waveguide is the amplitude of light propagating through the optical waveguide, the optical characteristics adjusting plate is an amplitude adjusting plate, and the optical characteristics adjusting plate preparation step comprises a step of forming a metal film on a film having a constant thickness, said metal film having thickness changes in the longitudinal direction which are adapted to the amount of amplitude adjustment of each optical waveguide.

22. The method for production of claim 16, wherein the optical characteristics values of the optical waveguide are the phase and amplitude of light propagating through the optical waveguide, the optical characteristics adjusting plate is a phase/amplitude adjusting plate, and the optical characteristics adjusting plate preparation step comprises a step of forming projections and depressions, adapted to the amount of phase adjustment of each optical waveguide, in the longitudinal direction of a film having a uniform refractive index, and also forming a metal film on the film, said metal film having thickness changes in the longitudinal direction which are adapted to the amount of amplitude adjustment of each optical waveguide.

23. The method for production of claim 16, wherein an adhesive filling step for filling an optically transparent adhesive into a gap between an inner wall of the groove and the optical characteristics adjusting plate is provided after the optical characteristics adjusting plate mounting step.

24. The method for production of claim 23, wherein the optical characteristics adjusting plate is a phase adjusting plate, and the refractive index of the phase adjusting plate and the refractive index of the adhesive are different from each other.

25. The method for production of claim 23, wherein the optical characteristics adjusting plate is an amplitude adjusting plate, and the refractive index of the amplitude adjusting plate and the refractive index of the adhesive are the same.

26. The method for production of claim 16, wherein at least two grooves are formed by the groove formation step, a phase adjusting plate as the optical characteristics adjusting plate is mounted in one of the grooves, while an amplitude adjusting plate as the optical characteristics adjusting plate is mounted in the other groove.

27. An apparatus for producing an optical characteristics adjusting plate to be mounted in a groove of a guided-wave circuit, said guided-wave circuit having a plurality of optical waveguides on a substrate, each waveguide having an input side and an output side, said groove crossing all of the plurality of optical waveguides, and said optical characteristics adjusting plate being adapted to adjust an error between the optical characteristics value on the input side and the optical characteristics value on the output side of each of the plurality of optical waveguides; said apparatus including error measurement means for measuring errors between the optical characteristics values on the input side and the output side of the plurality of optical waveguides of the guided-wave circuit;

adjustment value calculation means for calculating an optical characteristics adjustment values on the basis of the error values obtained by the error measurement means; and optical characteristics adjusting plate preparation means for changing the optical characteristics distribution in the longitudinal direction of a plate material having optical characteristics on the basis of the adjustment values for the plurality of optical waveguides to obtain the optical characteristics adjusting plate.

\* \* \* \* \*